US012364904B2

(12) United States Patent
Ghiotto et al.

(10) Patent No.: US 12,364,904 B2
(45) Date of Patent: *Jul. 22, 2025

(54) GESTURE RECOGNITION DEVICE FOR FOOTWEAR MOTOR ACTUATION

(71) Applicant: NIKE, Inc., Beaverton, OR (US)

(72) Inventors: Shane Ghiotto, Portland, OR (US); Erin McAuliffe, Portland, OR (US); Marielle Morris, Portland, OR (US); Adam K. Tilton, Lake Bluff, IL (US); John B. Waldt, Jr., Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/665,890

(22) Filed: May 16, 2024

(65) Prior Publication Data

US 2024/0299804 A1 Sep. 12, 2024

Related U.S. Application Data

(63) Continuation of application No. 17/556,399, filed on Dec. 20, 2021, now Pat. No. 12,017,114.

(60) Provisional application No. 63/130,059, filed on Dec. 23, 2020.

(51) Int. Cl.
| | |
|---|---|
| *A63B 24/00* | (2006.01) |
| *A43B 3/44* | (2022.01) |
| *A43B 3/34* | (2022.01) |
| *G06F 3/03* | (2006.01) |

(52) U.S. Cl.
CPC ............ *A63B 24/0006* (2013.01); *A43B 3/44* (2022.01); *A63B 2024/0012* (2013.01)

(58) Field of Classification Search
CPC ........ A63B 24/0006; A63B 2024/0012; A43B 3/44; A43B 3/34; A43B 3/40; A43C 11/165; G06F 3/0346; G06F 3/017
USPC .......................................................... 36/136
See application file for complete search history.

(56) References Cited

U.S. PATENT DOCUMENTS

| | | | |
|---|---|---|---|
| 12,017,114 B2* | 6/2024 | Ghiotto .............. | A63B 24/0006 |
| 2014/0118246 A1 | 5/2014 | Park et al. | |
| 2018/0020764 A1* | 1/2018 | Walker .................. | A43B 7/088 |
| | | | 700/275 |

(Continued)

FOREIGN PATENT DOCUMENTS

| | | |
|---|---|---|
| JP | 2003235034 A | 8/2003 |
| JP | 2016221251 A | 12/2016 |

(Continued)

OTHER PUBLICATIONS

Apr. 5, 2022—(WO) ISR & WO—App. No. PCT/US21/073055.

*Primary Examiner* — Michael J Brown
(74) *Attorney, Agent, or Firm* — Banner & Witcoff, Ltd.

(57) ABSTRACT

A gesture recognition device configured to detect a gesture performed by a user to actuate a motor of a closure mechanism of an article of footwear. The gesture recognition device may include a sensor unit with an accelerometer sensor, and an analysis unit in operative communication with the sensor unit. The analysis unit may be configured to execute a gesture confirmation algorithm to confirm or reject possible gesture event data received from the sensor unit as a true gesture event. If the gesture confirmation algorithm confirms the possible gesture event data as a true gesture event, the analysis unit may output a signal to actuate the motor.

20 Claims, 33 Drawing Sheets

(56) References Cited

U.S. PATENT DOCUMENTS

2020/0352284 A1  11/2020  Walker et al.

FOREIGN PATENT DOCUMENTS

| JP | 2018535758 A | 12/2018 |
| JP | 2019513434 A | 5/2019 |

* cited by examiner

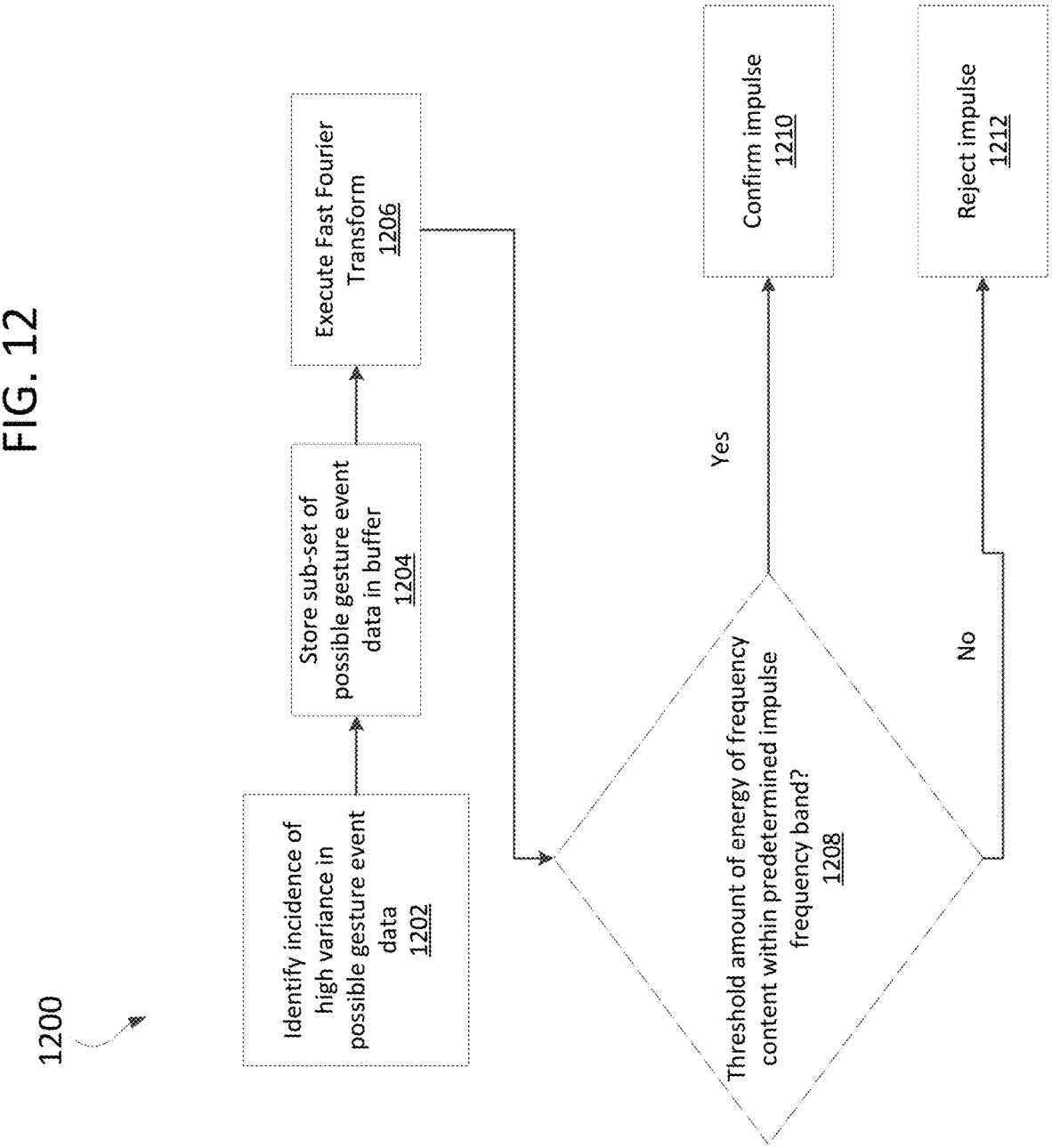

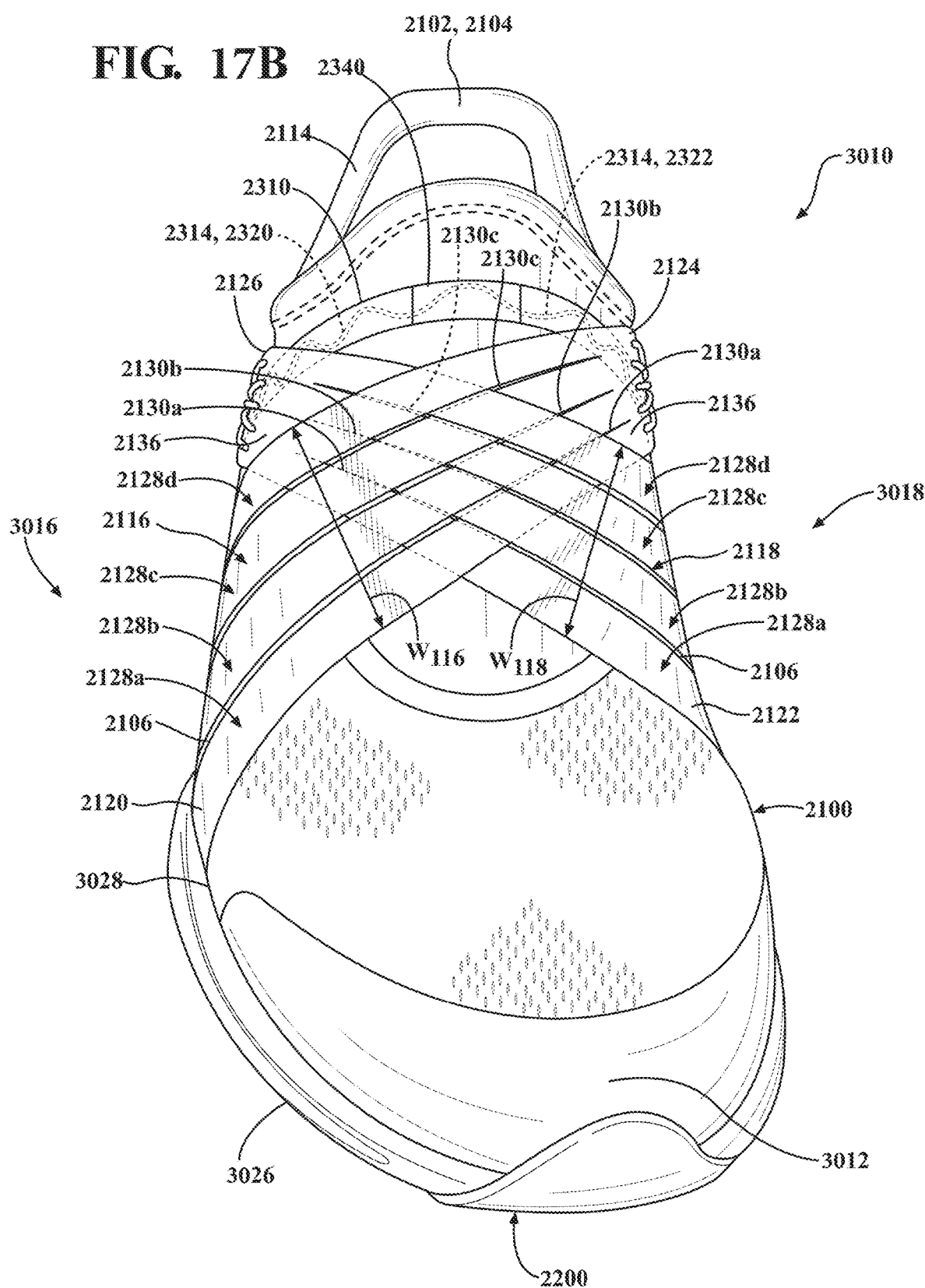

GESTURE RECOGNITION DEVICE FOR FOOTWEAR MOTOR ACTUATION

CROSS-REFERENCE TO RELATED APPLICATIONS

This application is a continuation of U.S. patent application Ser. No. 17/556,399, filed Dec. 20, 2021, which claims the benefit of priority from U.S. Provisional Patent Application No. 63/130,059 filed Dec. 23, 2020, entitled "Gesture Recognition Device for Footwear Motor Actuation" the contents of which are incorporated by reference in their entirety for any and all non-limiting purposes.

TECHNICAL FIELD

Aspects of this disclosure generally relate to circuitry configured to be integrated into articles of footwear and processes executed by said circuitry for enhanced gesture recognition in order to actuate a motor within said footwear.

BACKGROUND

The present embodiments relate generally to footwear and in particular to articles of footwear having gesture recognition devices for actuation of motor devices within said footwear.

Articles of footwear generally include two primary elements: an upper and a sole structure. The upper is often formed from a plurality of material elements (e.g., textiles, polymer sheet layers, foam layers, leather, synthetic leather) that are stitched or adhesively bonded together to form a void on the interior of the footwear for comfortably and securely receiving a foot. More particularly, the upper forms a structure that extends over instep and toe areas of the foot, along medial and lateral sides of the foot, and around a heel area of the foot. The upper may also incorporate a lacing system to adjust the fit of the footwear, as well as permitting entry and removal of the foot from the void within the upper. In addition, the upper may include a tongue that extends under the lacing system to enhance adjustability and comfort of the footwear, and the upper may incorporate a heel counter.

The sole structure is secured to a lower portion of the upper so as to be positioned between the foot and the ground. In athletic footwear, for example, the sole structure may include a midsole and an outsole. The midsole may be formed from a polymer foam material that attenuates ground reaction forces (i.e., provides cushioning) during walking, running, and other ambulatory activities. The midsole may also include fluid-filled chambers, plates, moderators, or other elements that further attenuate forces, enhance stability, or influence the motions of the foot, for example. The outsole forms a ground-contacting element of the footwear and is usually fashioned from a durable and wear-resistant rubber material that includes texturing to impart traction. The sole structure may also include a sockliner positioned within the upper and proximal a lower surface of the foot to enhance footwear comfort.

Electronically-actuated mechanisms for tightening/loosening an article of footwear on a user may be used to achieve improved fitting of the article of footwear on the foot of the user. In one example, the electronically-actuated mechanism may allow for fine adjustment of a tightness of fit as the user exercises throughout the day. The electronically-actuated mechanism may also enhance the speed with which a user can put on/take off the article of footwear. In addition, an electronically-actuated mechanism for tightening an article of footwear may allow a user with reduced hand motor skills or another disability to effectively tighten an article of footwear on their foot. However, existing mechanisms for controlling the actuation of such an electronically-actuated mechanism cannot effectively recognize gestures intended to actuate the mechanism and exclude signals that are not indicative of an intended gesture by a user.

Therefore, improved systems and methods to address at least one or more of these shortcomings in the art are desired.

BRIEF SUMMARY

The following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of this innovation relate to an article of footwear that may include a motor configured to actuate a lacing system of the article a footwear. The article of footwear may additionally include a gesture recognition device configured to detect a gesture performed by a user to actuate the motor. The gesture recognition device may include a sensor unit that has an accelerometer sensor and a buffer module, and an analysis unit in operative communication with the sensor unit. The analysis unit may be configured to execute a gesture confirmation algorithm to confirm or reject possible gesture event data received from the buffer module as a true gesture event. If the gesture confirmation algorithm confirms the possible gesture event data as a true gesture event, the analysis unit may output a signal to actuate the motor.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited in the accompanying figures in which like reference numerals indicate similar elements.

FIG. 12 is a flowchart diagram of one or more processes executed by an analysis unit to identify an impulse response within possible gesture event data received from the accelerometer of the sensor unit, according to one or more aspects described herein;

FIG. 17B is a top perspective view of the article of footwear of FIG. 17A, where the tensioning system is shown in a tightened state;

DETAILED DESCRIPTION

Figure 1:
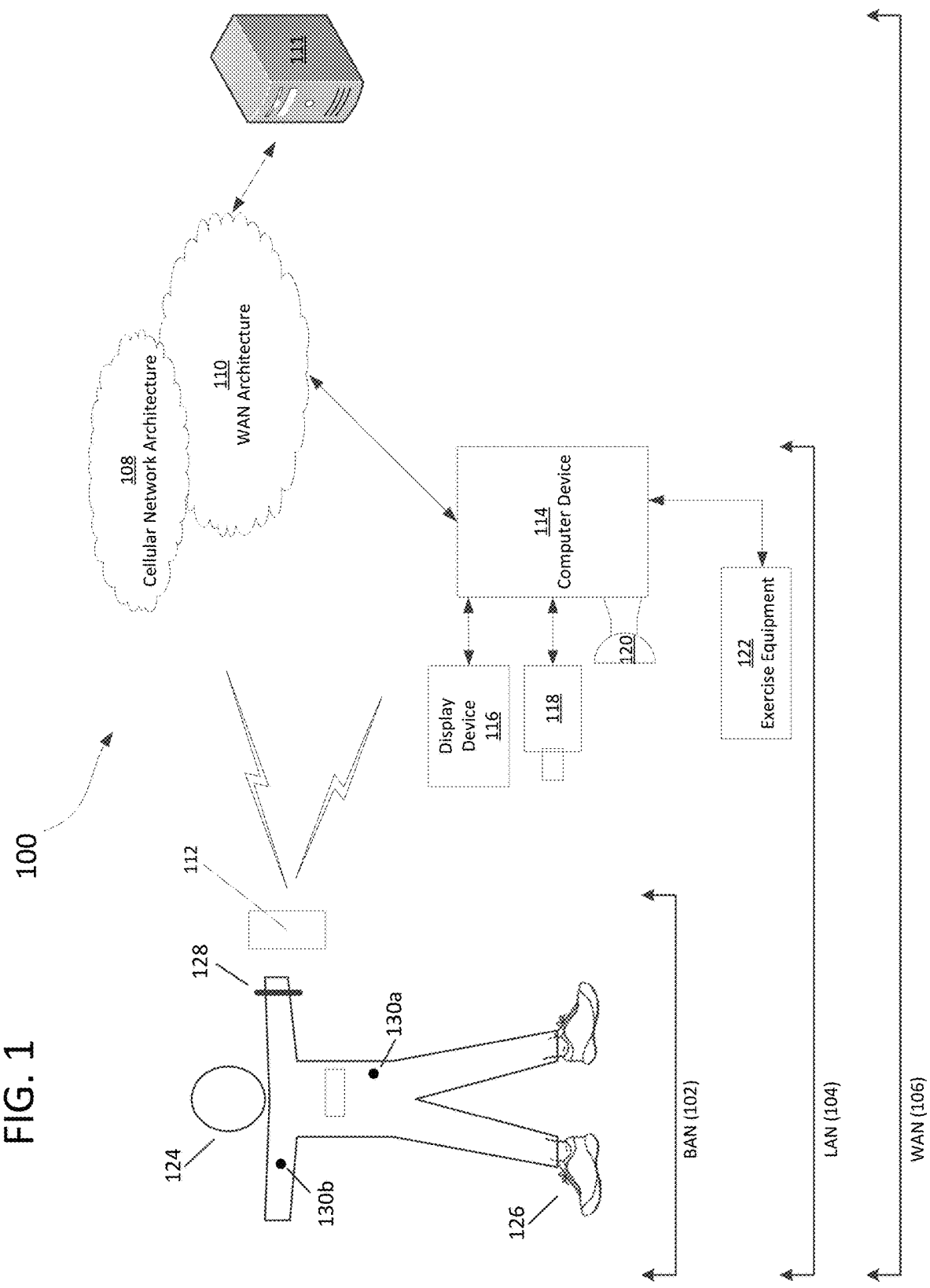
FIG. 1 illustrates an example system that may be configured to provide personal training and/or obtain data from the physical movements of a user in accordance with example embodiments.

Aspects of this disclosure involve obtaining, storing, and/or processing athletic data relating to the physical movements of an athlete. The athletic data may be actively or passively sensed and/or stored in one or more non-transitory storage mediums. Still further aspects relate to using athletic data to generate an output, such as for example, calculated athletic attributes, feedback signals to provide guidance, and/or other information. These and other aspects will be discussed in the context of the following illustrative examples of a personal training system.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope and spirit of the present disclosure. Further, headings within this disclosure should not be considered as limiting aspects of the disclosure and the example embodiments are not limited to the example headings.

The terminology used herein is for the purpose of describing particular exemplary configurations only and is not intended to be limiting. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/of" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

I. Example Personal Training System

A. Illustrative Networks

Aspects of this disclosure relate to systems and methods that may be utilized across a plurality of networks. In this regard, certain embodiments may be configured to adapt to dynamic network environments. Further embodiments may be operable in differing discrete network environments. FIG. 1 illustrates an example of a personal training system 100 in accordance with example embodiments. Example system 100 may include one or more interconnected networks, such as the illustrative body area network (BAN) 102, local area network (LAN) 104, and wide area network (WAN) 106. As shown in FIG. 1 (and described throughout this disclosure), one or more networks (e.g., BAN 102, LAN 104, and/or WAN 106), may overlap or otherwise be inclusive of each other. Those skilled in the art will appreciate that the illustrative networks 102-106 are logical networks that may each comprise one or more different communication protocols and/or network architectures and yet may be configured to have gateways to each other or other networks. For example, each of BAN 102, LAN 104 and/or WAN 106 may be operatively connected to the same physical network architecture, such as cellular network architecture 108 and/or WAN architecture 110. For example, portable electronic device 112, which may be considered a component of both BAN 102 and LAN 104, may comprise a network adapter or network interface card (NIC) configured to translate data and control signals into and from network messages according to one or more communication protocols, such as the Transmission Control Protocol (TCP), the Internet Protocol (IP), and the User Datagram Protocol (UDP) through one or more of architectures 108 and/or 110. These protocols are well known in the art, and thus will not be discussed here in more detail.

Network architectures 108 and 110 may include one or more information distribution network(s), of any type(s) or topology(s), alone or in combination(s), such as for example, cable, fiber, satellite, telephone, cellular, wireless, etc. and as such, may be variously configured such as having one or more wired or wireless communication channels (including but not limited to: WiFi®, Bluetooth®, Near-Field Communication (NFC) and/or ANT technologies). Thus, any device within a network of FIG. 1, (such as portable electronic device 112 or any other device described herein) may be considered inclusive to one or more of the different logical networks 102-106. With the foregoing in mind, example components of an illustrative BAN and LAN (which may be coupled to WAN 106) will be described.

1. Example Local Area Network

LAN 104 may include one or more electronic devices, such as for example, computer device 114. Computer device 114, or any other component of system 100, may comprise a mobile terminal, such as a telephone, music player, tablet, netbook or any portable device. In other embodiments, computer device 114 may comprise a media player or recorder, desktop computer, server(s), a gaming console, such as for example, a Microsoft® XBOX, Sony® Playstation, and/or a Nintendo® Wii gaming consoles. Those skilled in the art will appreciate that these are merely example devices for descriptive purposes and this disclosure is not limited to any console or computing device.

Figure 2:
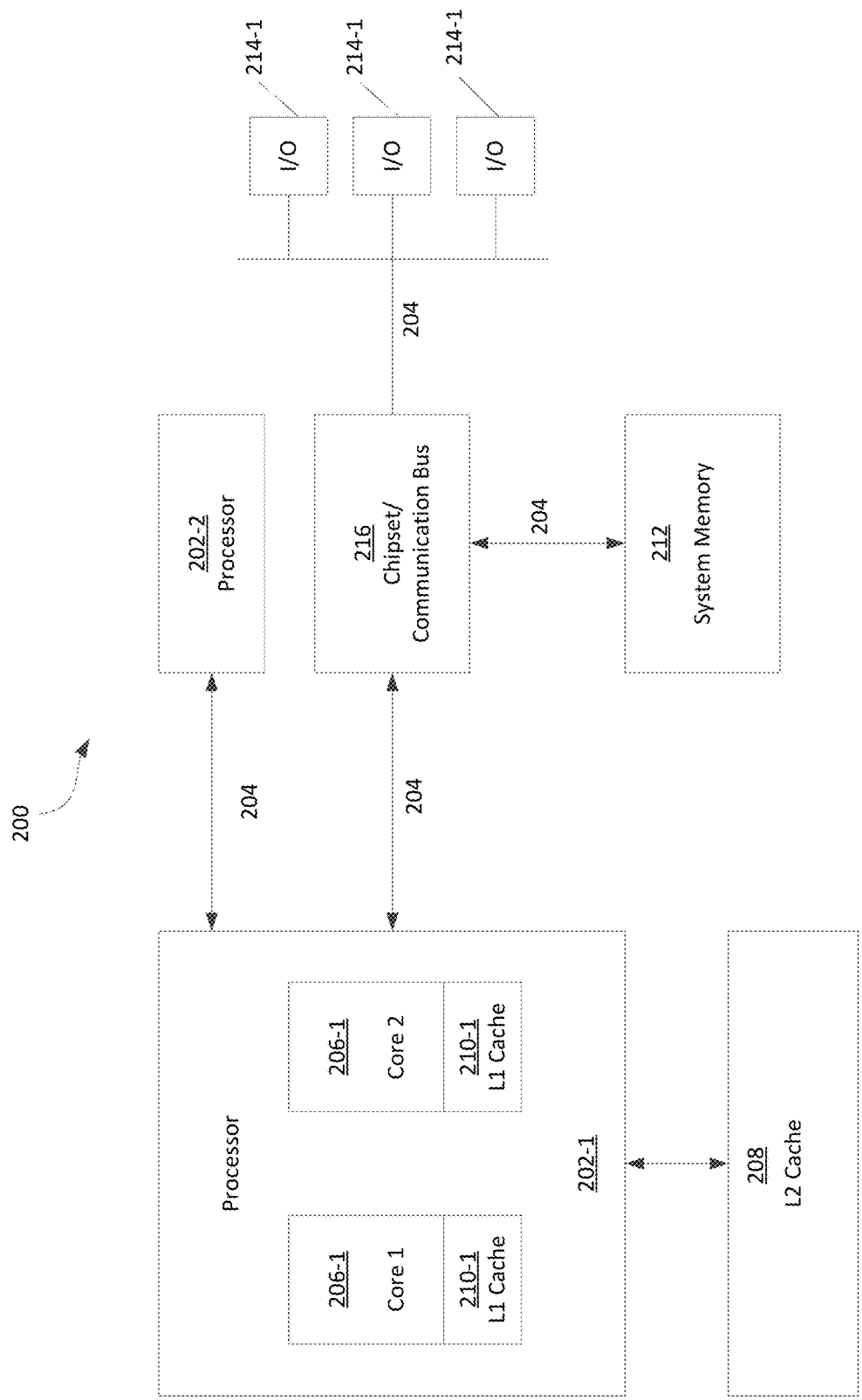
FIG. 2 illustrates an example computer device that may be part of or in communication with the system of FIG. 1.

Those skilled in the art will appreciate that the design and structure of computer device 114 may vary depending on several factors, such as its intended purpose. One example implementation of computer device 114 is provided in FIG. 2, which illustrates a block diagram of computing device 200. Those skilled in the art will appreciate that the disclosure of FIG. 2 may be applicable to any device disclosed herein. Device 200 may include one or more processors, such as processor 202-1 and 202-2 (generally referred to herein as "processors 202" or "processor 202"). Processors 202 may communicate with each other or other components via an interconnection network or bus 204. Processor 202 may include one or more processing cores, such as cores 206-1 and 206-2 (referred to herein as "cores 206" or more generally as "core 206"), which may be implemented on a single integrated circuit (IC) chip.

Cores 206 may comprise a shared cache 208 and/or a private cache (e.g., caches 210-1 and 210-2, respectively). One or more caches 208/210 may locally cache data stored in a system memory, such as memory 212, for faster access by components of the processor 202. Memory 212 may be in communication with the processors 202 via a chipset 216 or communication bus 216. Cache 208 may be part of system memory 212 in certain embodiments. Memory 212 may include, but is not limited to, random access memory (RAM), read only memory (ROM), and include one or more of solid-state memory, optical or magnetic storage, and/or any other medium that can be used to store electronic information. Yet other embodiments may omit system memory 212.

System 200 may include one or more I/O devices (e.g., I/O devices 214-1 through 214-3, each generally referred to as I/O device 214). I/O data from one or more I/O devices 214 may be stored at one or more caches 208, 210 and/or system memory 212. Each of I/O devices 214 may be permanently or temporarily configured to be in operative communication with a component of system 100 using any physical or wireless communication protocol.

Returning to FIG. 1, four example I/O devices (shown as elements 116-122) are shown as being in communication with computer device 114. Those skilled in the art will appreciate that one or more of devices 116-122 may be stand-alone devices or may be associated with another device besides computer device 114. For example, one or more I/O devices may be associated with or interact with a component of BAN 102 and/or WAN 106. I/O devices 116-122 may include, but are not limited to athletic data acquisition units, such as for example, sensors. One or more I/O devices may be configured to sense, detect, and/or measure an athletic parameter from a user, such as user 124. Examples include, but are not limited to: an accelerometer, a gyroscope, a location-determining device (e.g., GPS), light (including non-visible light) sensor, temperature sensor (including ambient temperature and/or body temperature), sleep pattern sensors, heart rate monitor, image-capturing sensor, moisture sensor, force sensor, compass, angular rate sensor, and/or combinations thereof among others.

In further embodiments, I/O devices 116-122 may be used to provide an output (e.g., audible, visual, or tactile cue) and/or receive an input, such as a user input from athlete 124. Example uses for these illustrative I/O devices are provided below, however, those skilled in the art will appreciate that such discussions are merely descriptive of some of the many options within the scope of this disclosure. Further, reference to any data acquisition unit, I/O device, or sensor is to be interpreted disclosing an embodiment that may have one or more I/O device, data acquisition unit, and/or sensor disclosed herein or known in the art (either individually or in combination).

Information from one or more devices (across one or more networks) may be used to provide (or be utilized in the formation of) a variety of different parameters, metrics or physiological characteristics including but not limited to: motion parameters, such as speed, acceleration, distance, steps taken, direction, relative movement of certain body portions or objects to others, or other motion parameters which may be expressed as angular rates, rectilinear rates or combinations thereof, physiological parameters, such as calories, heart rate, sweat detection, effort, oxygen consumed, oxygen kinetics, and other metrics which may fall within one or more categories, such as: pressure, impact forces, information regarding the athlete, such as height, weight, age, demographic information and combinations thereof.

System 100 may be configured to transmit and/or receive athletic data, including the parameters, metrics, or physiological characteristics collected within system 100 or otherwise provided to system 100. As one example, WAN 106 may comprise server 111. Server 111 may have one or more components of system 200 of FIG. 2. In one embodiment, server 111 comprises at least a processor and a memory, such as processor 206 and memory 212. Server 111 may be configured to store computer-executable instructions on a non-transitory computer-readable medium. The instructions may comprise athletic data, such as raw or processed data collected within system 100. System 100 may be configured to transmit data, such as energy expenditure points, to a social networking website or host such a site. Server 111 may be utilized to permit one or more users to access and/or compare athletic data. As such, server 111 may be configured to transmit and/or receive notifications based upon athletic data or other information.

Returning to LAN 104, computer device 114 is shown in operative communication with a display device 116, an image-capturing device 118, sensor 120 and exercise device 122, which are discussed in turn below with reference to example embodiments. In one embodiment, display device 116 may provide audio-visual cues to athlete 124 to perform a specific athletic movement. The audio-visual cues may be provided in response to computer-executable instruction executed on computer device 114 or any other device, including a device of BAN 102 and/or WAN. Display device 116 may be a touchscreen device or otherwise configured to receive a user-input.

In one embodiment, data may be obtained from image-capturing device 118 and/or other sensors, such as sensor 120, which may be used to detect (and/or measure) athletic parameters, either alone or in combination with other devices, or stored information. Image-capturing device 118 and/or sensor 120 may comprise a transceiver device. In one embodiment sensor 128 may comprise an infrared (IR), electromagnetic (EM) or acoustic transceiver. For example, image-capturing device 118, and/or sensor 120 may transmit waveforms into the environment, including towards the direction of athlete 124 and receive a "reflection" or otherwise detect alterations of those released waveforms. Those skilled in the art will readily appreciate that signals corresponding to a multitude of different data spectrums may be utilized in accordance with various embodiments. In this regard, devices 118 and/or 120 may detect waveforms emitted from external sources (e.g., not system 100). For example, devices 118 and/or 120 may detect heat being emitted from user 124 and/or the surrounding environment. Thus, image-capturing device 126 and/or sensor 128 may comprise one or more thermal imaging devices. In one embodiment, image-capturing device 126 and/or sensor 128 may comprise an IR device configured to perform range phenomenology.

In one embodiment, exercise device 122 may be any device configurable to permit or facilitate the athlete 124 performing a physical movement, such as for example a treadmill, step machine, etc. There is no requirement that the device be stationary. In this regard, wireless technologies permit portable devices to be utilized, thus a bicycle or other mobile exercising device may be utilized in accordance with certain embodiments. Those skilled in the art will appreciate that equipment 122 may be or comprise an interface for receiving an electronic device containing athletic data performed remotely from computer device 114. For example, a user may use a sporting device (described below in relation to BAN 102) and upon returning home or the location of equipment 122, download athletic data into element 122 or any other device of system 100. Any I/O device disclosed herein may be configured to receive activity data.

2. Body Area Network

BAN 102 may include two or more devices configured to receive, transmit, or otherwise facilitate the collection of athletic data (including passive devices). Exemplary devices may include one or more data acquisition units, sensors, or devices known in the art or disclosed herein, including but not limited to I/O devices 116-122. Two or more components of BAN 102 may communicate directly, yet in other embodiments, communication may be conducted via a third device, which may be part of BAN 102, LAN 104, and/or WAN 106. One or more components of LAN 104 or WAN 106 may form part of BAN 102. In certain implementations, whether a device, such as portable device 112, is part of BAN 102, LAN 104, and/or WAN 106, may depend on the athlete's proximity to an access point to permit communication with mobile cellular network architecture 108 and/or WAN architecture 110. User activity and/or preference may also influence whether one or more components are utilized as part of BAN 102. Example embodiments are provided below.

User 124 may be associated with (e.g., possess, carry, wear, and/or interact with) any number of devices, such as portable device 112, shoe-mounted device 126, wrist-worn device 128 and/or a sensing location, such as sensing location 130, which may comprise a physical device or a location that is used to collect information. One or more devices 112, 126, 128, and/or 130 may not be specially designed for fitness or athletic purposes. Indeed, aspects of this disclosure relate to utilizing data from a plurality of devices, some of which are not fitness devices, to collect, detect, and/or measure athletic data. In certain embodiments, one or more devices of BAN 102 (or any other network) may comprise a fitness or sporting device that is specifically designed for a particular sporting use. As used herein, the term "sporting device" includes any physical object that may be used or implicated during a specific sport or fitness activity. Exemplary sporting devices may include, but are not limited to: golf balls, basketballs, baseballs, soccer balls, footballs, powerballs, hockey pucks, weights, bats, clubs, sticks, paddles, mats, and combinations thereof. In further embodiments, exemplary fitness devices may include objects within a sporting environment where a specific sport occurs, including the environment itself, such as a goal net, hoop, backboard, portions of a field, such as a midline, outer boundary marker, base, and combinations thereof.

In this regard, those skilled in the art will appreciate that one or more sporting devices may also be part of (or form) a structure and vice-versa, a structure may comprise one or more sporting devices or be configured to interact with a sporting device. For example, a first structure may comprise a basketball hoop and a backboard, which may be removable and replaced with a goal post. In this regard, one or more sporting devices may comprise one or more sensors, such as one or more of the sensors discussed above in relation to FIGS. 1-3, that may provide information utilized, either independently or in conjunction with other sensors, such as one or more sensors associated with one or more structures. For example, a backboard may comprise a first sensor configured to measure a force and a direction of the force by a basketball upon the backboard and the hoop may comprise a second sensor to detect a force. Similarly, a golf club may comprise a first sensor configured to detect grip attributes on the shaft and a second sensor configured to measure impact with a golf ball.

Looking to the illustrative portable device 112, it may be a multi-purpose electronic device, that for example, includes a telephone or digital music player, including an IPOD®, IPAD®, or iPhone®, brand devices available from Apple, Inc. of Cupertino, California or Zune® or Microsoft® Windows devices available from Microsoft of Redmond, Washington. As known in the art, digital media players can serve as an output device, input device, and/or storage device for a computer. Device 112 may be configured as an input device for receiving raw or processed data collected from one or more devices in BAN 102, LAN 104, or WAN 106. In one or more embodiments, portable device 112 may comprise one or more components of computer device 114. For example, portable device 112 may be include a display 116, image-capturing device 118, and/or one or more data acquisition devices, such as any of the I/O devices 116-122 discussed above, with or without additional components, so as to comprise a mobile terminal.

a. Illustrative Apparel/Accessory Sensors

In certain embodiments, I/O devices may be formed within or otherwise associated with user's 124 clothing or accessories, including a watch, armband, wristband, necklace, shirt, shoe, or the like. These devices may be configured to monitor athletic movements of a user. It is to be understood that they may detect athletic movement during user's 124 interactions with computer device 114 and/or operate independently of computer device 114 (or any other device disclosed herein). For example, one or more devices in BAN 102 may be configured to function as an all-day activity monitor that measures activity regardless of the user's proximity or interactions with computer device 114. It is to be further understood that the sensory system 302 shown in FIG. 3 and the device assembly 400 shown in FIG. 4, each of which are described in the following paragraphs, are merely illustrative examples.

i. Shoe-Mounted Device

Figure 3:
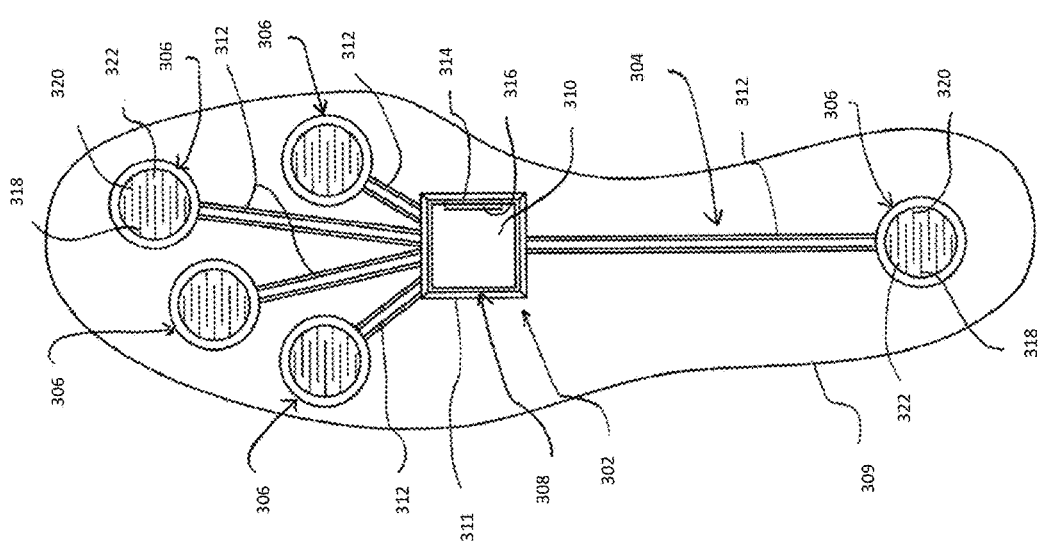
FIG. 3 shows an illustrative sensor assembly that may be worn by a user in accordance with example embodiments.

In certain embodiments, device 126 shown in FIG. 1, may comprise footwear which may include one or more sensors, including but not limited to those disclosed herein and/or known in the art. FIG. 3 illustrates one example embodiment of a sensor system 302 providing one or more sensor assemblies 304. Assembly 304 may comprise one or more sensors, such as for example, an accelerometer, gyroscope, location-determining components, force sensors and/or or any other sensor disclosed herein or known in the art. In the illustrated embodiment, assembly 304 incorporates a plurality of sensors, which may include force-sensitive resistor (FSR) sensors 306; however, other sensor(s) may be utilized. Port 308 may be positioned within a sole structure 309 of a shoe, and is generally configured for communication with one or more electronic devices. Port 308 may optionally be provided to be in communication with an electronic module 310, and the sole structure 309 may optionally include a housing 311 or other structure to receive the module 310. The sensor system 302 may also include a plurality of leads 312 connecting the FSR sensors 306 to the port 308, to enable communication with the module 310 and/or another electronic device through the port 308. Module 310 may be contained within a well or cavity in a sole structure of a shoe, and the housing 311 may be positioned within the well or cavity. In one embodiment, at least one gyroscope and at least one accelerometer are provided within a single housing, such as module 310 and/or housing 311. In at least a further embodiment, one or more sensors are provided that, when operational, are configured to provide directional information and angular rate data. The port 308 and the module 310 include complementary interfaces 314, 316 for connection and communication.

In certain embodiments, at least one force-sensitive resistor 306 shown in FIG. 3 may contain first and second electrodes or electrical contacts 318, 320 and a force-sensitive resistive material 322 disposed between the electrodes 318, 320 to electrically connect the electrodes 318, 320 together. When pressure is applied to the force-sensitive material 322, the resistivity and/or conductivity of the force-sensitive material 322 changes, which changes the electrical potential between the electrodes 318, 320. The change in resistance can be detected by the sensor system 302 to detect the force applied on the sensor 316. The force-sensitive resistive material 322 may change its resistance under pressure in a variety of ways. For example, the force-sensitive material 322 may have an internal resistance that decreases when the material is compressed. Further embodiments may utilize "volume-based resistance", which may be implemented through "smart materials." As another example, the material 322 may change the resistance by changing the degree of surface-to-surface contact, such as between two pieces of the force sensitive material 322 or between the force sensitive material 322 and one or both electrodes 318, 320. In some circumstances, this type of force-sensitive resistive behavior may be described as "contact-based resistance."

ii. Wrist-Worn Device

Figure 4:
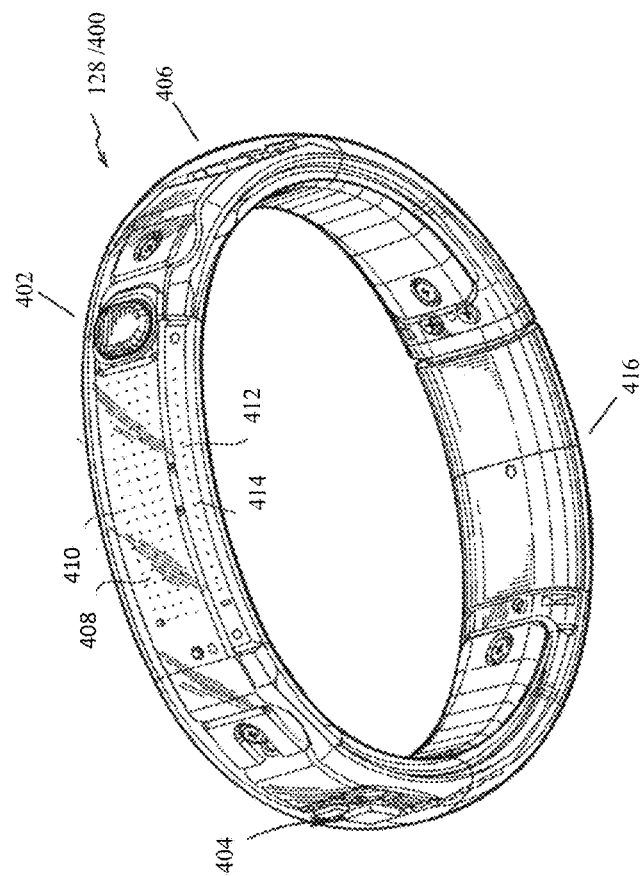
FIG. 4 shows another example sensor assembly that may be worn by a user in accordance with example embodiments.

As shown in FIG. 4, device 400 (which may resemble or comprise sensory device 128 shown in FIG. 1), may be configured to be worn by user 124, such as around a wrist, arm, ankle, neck or the like. Device 400 may include an input mechanism, such as a depressible input button 402 configured to be used during operation of the device 400. The input button 402 may be operably connected to a controller 404 and/or any other electronic components, such as one or more of the elements discussed in relation to computer device 114 shown in FIG. 1. Controller 404 may be embedded or otherwise part of housing 406. Housing 406 may be formed of one or more materials, including elastomeric components and comprise one or more displays, such as display 408. The display may be considered an illuminable portion of the device 400. The display 408 may include a series of individual lighting elements or light members such as LED lights 410. The lights may be formed in an array and operably connected to the controller 404. Device 400 may include an indicator system 412, which may also be considered a portion or component of the overall display 408. Indicator system 412 can operate and illuminate in conjunction with the display 408 (which may have pixel member 414) or completely separate from the display 408. The indicator system 412 may also include a plurality of additional lighting elements or light members, which may also take the form of LED lights in an exemplary embodiment. In certain embodiments, indicator system may provide a visual indication of goals, such as by illuminating a portion of lighting members of indicator system 412 to represent accomplishment towards one or more goals. Device 400 may be configured to display data expressed in terms of activity points or currency earned by the user based on the activity of the user, either through display 408 and/or indicator system 412.

A fastening mechanism 416 can be disengaged wherein the device 400 can be positioned around a wrist or portion of the user 124 and the fastening mechanism 416 can be subsequently placed in an engaged position. In one embodiment, fastening mechanism 416 may comprise an interface, including but not limited to a USB port, for operative interaction with computer device 114 and/or devices, such as devices 120 and/or 112. In certain embodiments, fastening member may comprise one or more magnets. In one embodiment, fastening member may be devoid of moving parts and rely entirely on magnetic forces.

In certain embodiments, device 400 may comprise a sensor assembly (not shown in FIG. 4). The sensor assembly may comprise a plurality of different sensors, including those disclosed herein and/or known in the art. In an example embodiment, the sensor assembly may comprise or permit operative connection to any sensor disclosed herein or known in the art. Device 400 and or its sensor assembly may be configured to receive data obtained from one or more external sensors.

iii. Apparel and/or Body Location Sensing

Element 130 of FIG. 1 shows an example sensory location which may be associated with a physical apparatus, such as a sensor, data acquisition unit, or other device. Yet in other embodiments, it may be a specific location of a body portion or region that is monitored, such as via an image capturing device (e.g., image capturing device 118). In certain embodiments, element 130 may comprise a sensor, such that elements 130a and 130b may be sensors integrated into apparel, such as athletic clothing/athletic apparel. Such sensors may be placed at any desired location of the body of user 124. Sensors 130a/b may communicate (e.g., wirelessly) with one or more devices (including other sensors) of BAN 102, LAN 104, and/or WAN 106. In certain embodiments, passive sensing surfaces may reflect waveforms, such as infrared light, emitted by image-capturing device 118 and/or sensor 120. In one embodiment, passive sensors located on user's 124 apparel may comprise generally spherical structures made of glass or other transparent or translucent surfaces which may reflect waveforms. Different classes of apparel may be utilized in which a given class of apparel has specific sensors configured to be located proximate to a specific portion of the user's 124 body when properly worn. For example, golf apparel may include one or more sensors positioned on the apparel in a first configuration and yet soccer apparel may include one or more sensors positioned on apparel in a second configuration.

Figure 5:
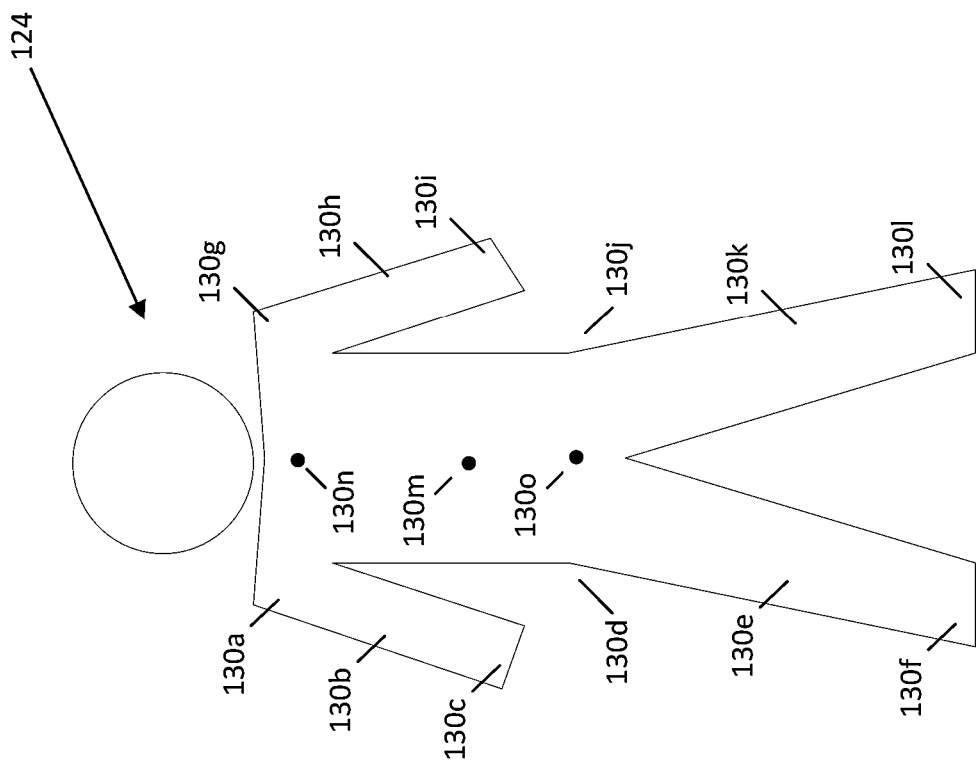
FIG. 5 shows illustrative locations for sensory input which may include physical sensors located on/in a user's clothing and/or be based upon identification of relationships between two moving body parts of the user.

FIG. 5 shows illustrative locations for sensory input (see, e.g., sensory locations 130a-130o). In this regard, sensors may be physical sensors located on/in a user's clothing, yet in other embodiments, sensor locations 130a-130o may be based upon identification of relationships between two moving body parts. For example, sensor location 130a may be determined by identifying motions of user 124 with an image-capturing device, such as image-capturing device 118. Thus, in certain embodiments, a sensor may not physically be located at a specific location (such as one or more of sensor locations 130a-130o), but is configured to sense properties of that location, such as with image-capturing device 118 or other sensor data gathered from other locations. In this regard, the overall shape or portion of a user's body may permit identification of certain body parts. Regardless of whether an image-capturing device is utilized and/or a physical sensor located on the user 124, and/or using data from other devices, (such as sensory system 302), device assembly 400 and/or any other device or sensor disclosed herein or known in the art is utilized, the sensors may sense a current location of a body part and/or track movement of the body part. In one embodiment, sensory data relating to location 130m may be utilized in a determination of the user's center of gravity (a.k.a., center of mass). For example, relationships between location 130a and location(s) 130f/130l with respect to one or more of location(s) 130m-130o may be utilized to determine if a user's center of gravity has been elevated along the vertical axis (such as during a jump) or if a user is attempting to "fake" a jump by bending and flexing their knees. In one embodiment, sensor location 1306n may be located at about the sternum of user 124. Likewise, sensor location 130o may be located approximate to the naval of user 124. In certain embodiments, data from sensor locations 130m-130o may be utilized (alone or in combination with other data) to determine the center of gravity for user 124. In further embodiments, relationships between multiple sensor locations, such as sensors 130m-130o, may be utilized in determining orientation of the user 124 and/or rotational forces, such as twisting of user's 124 torso. Further, one or more locations, such as location(s), may be utilized as (or approximate) a center of moment location. For example, in one embodiment, one or more of location(s) 130m-130o may serve as a point for a center of moment location of user 124. In another embodiment, one or more locations may serve as a center of moment of specific body parts or regions.

Aspects of the innovation relate to energy harvesting devices (otherwise referred to as energy capture devices, or energy capture and storage devices), and novel methods of utilizing one or more energy harvesting devices. Advantageously, aspects of the innovations described herein relate to using a thermoelectric generator to provide electrical energy to one or more electronic components of an athletic activity monitoring device (e.g. devices 128, 400), among others. In this way, one or more electronic components (e.g. processor, memory, transceiver, among others) may be provided with electrical energy without requiring a user to provide an energy storage device/medium, such as a battery, with a wired source of electrical energy, such as from an electrical outlet (i.e. a wired connected may not be required for recharging of one or more on-board batteries of an athletic activity monitoring device). In one implementation, one or more thermoelectric generator modules configured to be utilized within an energy harvesting device may generate electrical energy in response to a thermal gradient, and without using an energy storage device or medium (i.e. without a body, or a store of phase change material, among others). In one example, one or more energy harvesting devices may be incorporated into an item of athletic apparel of a user, and such that heat energy may be stored as the item of athletic apparel is laundered. This heat energy may subsequently be used to generate electrical energy using one or more thermoelectric generator modules, as described in the following disclosures. As such, a device incorporating a thermoelectric generator module, as described herein, may not include additional elements for energy storage (i.e. may not include a battery, otherwise referred to as an axillary energy storage medium). In another example, a device that incorporates a thermoelectric generator module, such as those described herein, may utilize a hybrid of, among others, battery storage, in additional to generating electrical energy using a thermoelectric generator module.

Figure 6:
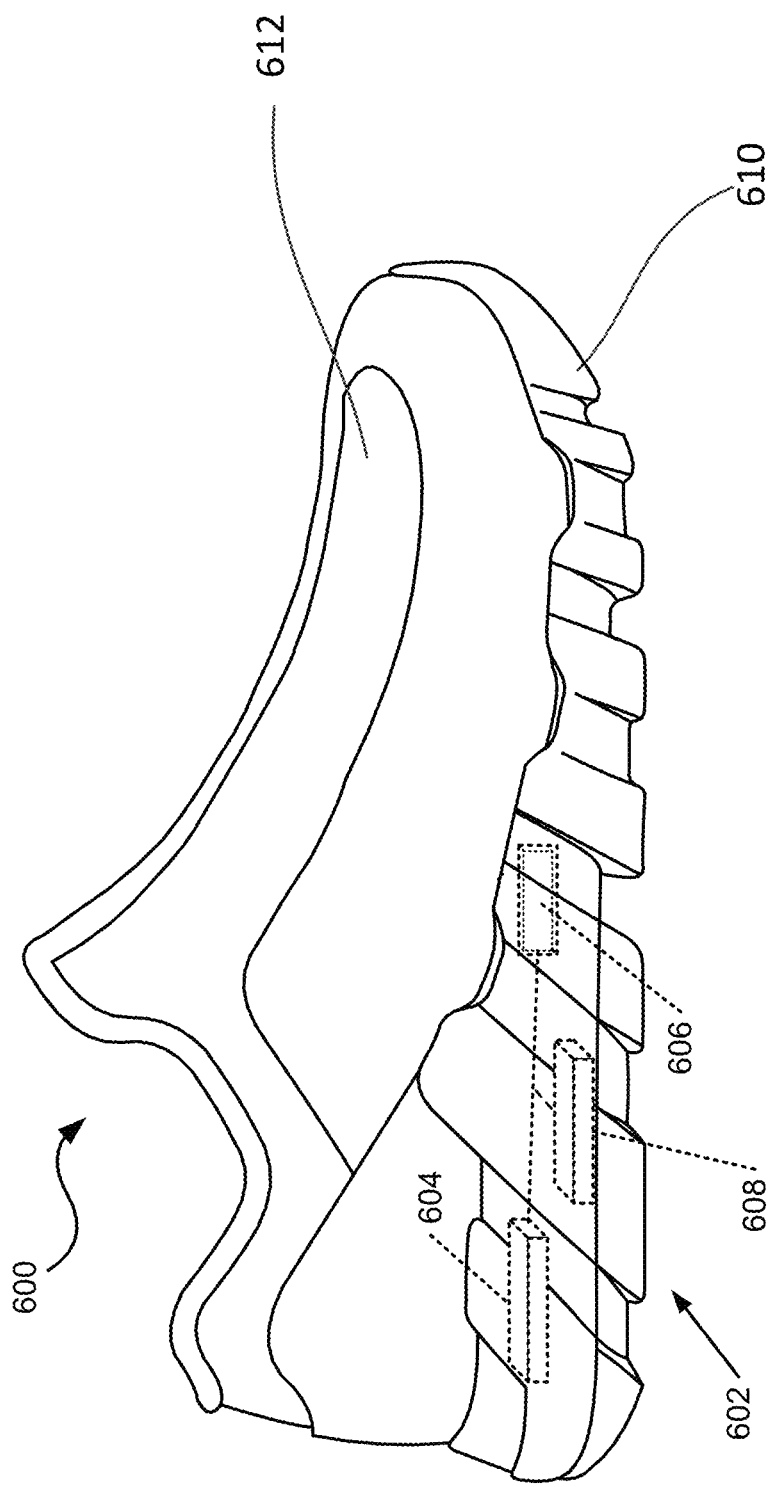
FIG. 6 schematically depicts an article of footwear, according to one or more aspects described herein.

FIG. 6 schematically depicts an article of footwear according to example embodiments disclosed herein. The article of footwear 600 may include any type of footwear configured to be worn while participating in an athletic activity or for other casual or formal occasions. The article footwear 600 may be referred to as a shoe 600, and may not be limited to enclosed footwear embodiments. The article of footwear 600 is schematically depicted as including a motor 606, a gesture recognition device 604, and a power supply 608. It is contemplated that the motor 606 may be configured to actuate a lacing system, a closure system, or a closure mechanism of the article of footwear 600, such that the motor 606 may tighten, or may tighten and/or loosen the article of footwear 600 on a user's foot. While not depicted in FIG. 6, it is contemplated that the motor 606 may have any electromechanical implementation, and may be configured to actuate a variety of closure mechanisms within the article of footwear 600, without departing from the scope of these disclosures. The actuation of the motor 606 may be based upon a signal received from the gesture recognition device 604. Both the gesture recognition device 604 and the motor 606 may receive electrical energy from the power supply 608. The power supply 608 may include one or more chemical cells configured as a battery. In addition or alternatively, the power supply 608 may include elements configured to store energy in a phase change material, and generate electrical energy using a thermoelectric generator. The power supply 608 may additionally or alternatively include elements configured to convert kinetic energy of the user's movement into electrical energy that can be distributed to the gesture recognition device 604 and motor 606. The article of footwear 600 and the various assemblies thereof and associated processes described throughout this disclosure, including processes for gesture recognition may additionally or alternatively include elements of the disclosure of U.S. Pat. No. 10,568,381, titled "Motorized shoe with gesture control" and the disclosure of U.S. Patent Publication No. 2015/0046886 (U.S. patent application Ser. No. 14/453,997 filed Aug. 7, 2014, and titled "Gesture Recognition"), the entirety of both disclosures being hereby incorporated by reference for any and all non-limiting purposes.

It is contemplated that the relative positioning of the gesture recognition device 604, the motor 606, and the power supply 608 may differ to that schematically depicted in FIG. 6. In one example, gesture recognition device 604, the motor 606, power supply 608, may be encapsulated within a sole structure 610 of the article of footwear 600. In alternative implementations, one or more of the gesture recognition device 604, motor 606, and power supply 608 may be positioned within one or more structures of an upper 612 of the article of footwear 600. It is contemplated that elements 604, 606, and 608 may be in operative communication with each other using wired connections. However, it is contemplated that one or more of the elements 604, 606, 608 may be wirelessly connected to one another, using wireless data transmission protocols and/or wireless power transfer. In another example, two or more of the elements 604, 606, and 608 may be implemented as an integrated unit within the article of footwear 600 such that the two or more of the elements 604, 606, 608 may be encapsulated within a single structure and/or implemented on a single integrated circuit device. In one example, the power supply 608 may be configured with an interface for receiving electrical energy from an external source. This interface may include a connection port configured to receive a wired connection, or may be an interface configured for wireless charging when the article of footwear 600 is placed in proximity with an external wireless charging dock or source. In addition, the gesture recognition device 604 and/or the motor 606 may be configured to receive data from one or more sources external to the article of footwear 600. As such, the gesture recognition device 604 and/or the motor 606 may include an interface configured to receive and transmit wired or wireless data from and to an external data source, such an external computing device. This external data source may be configured to receive activity data from the gesture recognition device 604, or may be configured to update firmware on one or more of the gesture recognition device 604 and motor 606, among other functions. It is contemplated that each of the elements 604, 606, and 608 may be configured to be encapsulated within the article of footwear 600 such that each element is shielded from contaminants such as dust, dirt, or water, among others.

Figure 7:
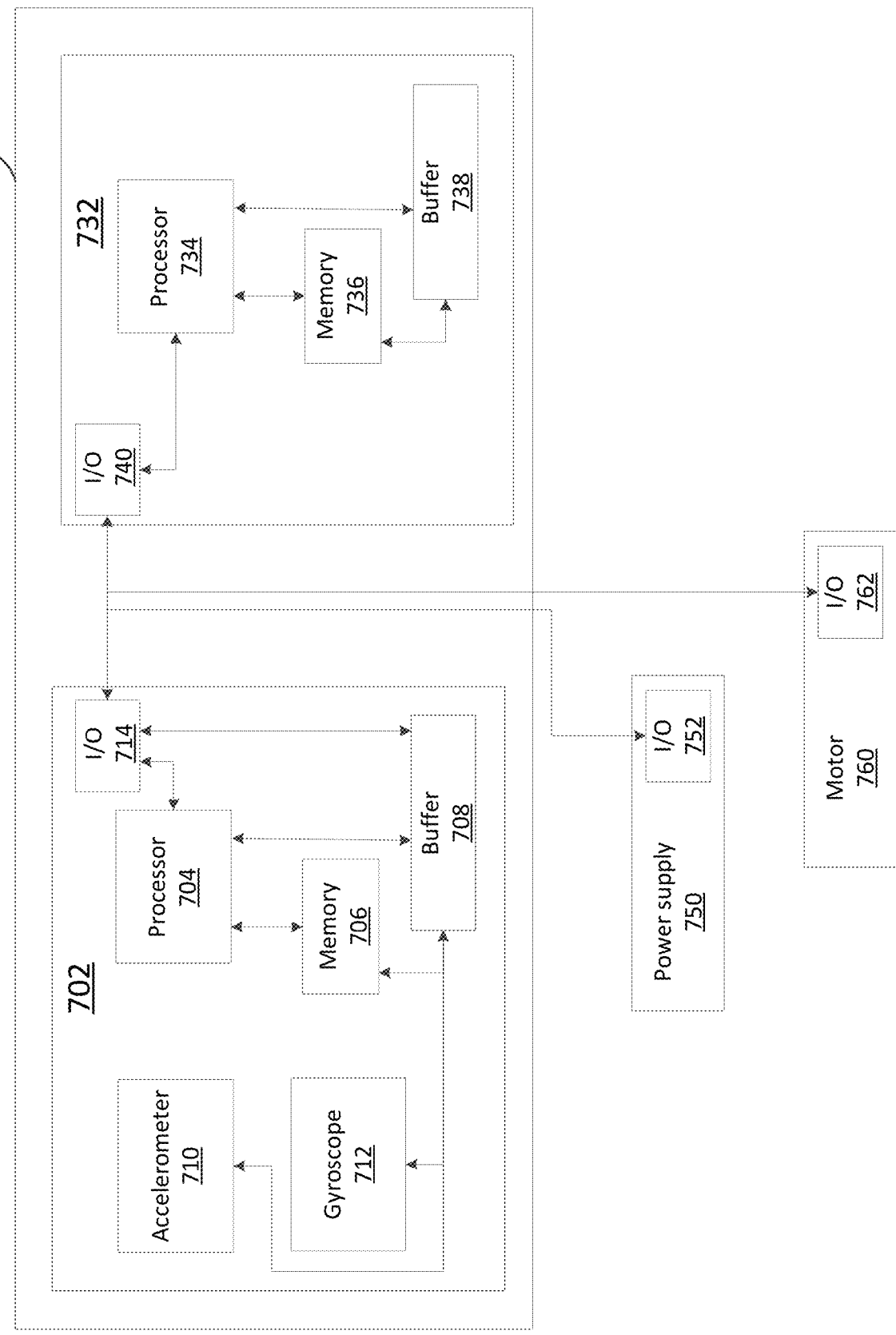
FIG. 7 schematically depicts a gesture recognition device operatively connected to a power supply and a motor, according to one or more aspects described herein.

FIG. 7 schematically depicts a gesture recognition device 700 operatively connected to a power supply 750 and a motor 760, according to one or more aspects described herein. In one example, the gesture recognition device 700 may be similar to the gesture recognition device 604, the power supply 750 may be similar to the power supply 608, and the motor 760 may be similar to the motor 606 described in relation to FIG. 6. The gesture recognition device 700 includes a sensor unit 702 and an analysis unit 732. Each of the sensor unit 702, analysis unit 732, power supply 750, and motor 760 may be in operative communication with one another for transfer of electrical energy/power and/or data. This transfer of electrical energy and/or data may be facilitated by wired or wireless transmission. As schematically depicted in FIG. 7, each of the elements 702, 732, 750, and 760 may be configured with an input/output (I/O) interface. Specifically, sensor unit 702 includes I/O interface 714, analysis unit 702 includes I/O interface 740, power supply 750 includes I/O interface 752, and motor 760 includes I/O interface 762. It is contemplated that these I/O interfaces 714, 740, 752, and 762 are configured with the hardware, firmware, and/or software configured to receive wired or wireless data transmissions and/or electrical power transmissions using any applicable transmission protocol and/or methodology. It is also contemplated that these I/O interfaces 714, 740, 752, and 762 comprise different interface types, using differing transfer protocols or media, without departing from the scope of these disclosures.

The gesture recognition device 700 is schematically depicted in FIG. 7 as a single structure that includes the sensor unit 702 and the analysis unit 732. Further, the power supply 750 and motor 760 are schematically depicted in FIG. 7 as separate elements to the gesture recognition device 700. However, it is contemplated that each of the elements 702, 732, 750, and/or 760 may be combined within/on a single physical structure/chip, or may be implemented as separate elements, without departing from the scope of these disclosures.

The sensor unit 702 additionally includes a processor 704. This processor 704 may include one or more of a central processing unit (CPU), a microprocessor, or a graphics processing unit (GPU). In another example, the processor 704 may represent a microcontroller. In yet another example, the sensor unit 702 may be configured as an integrated microcontroller. The processor 704 may be implemented with any processing speed, one or more processing cores, and may utilize any chip architecture. The sensor unit 702 additionally includes memory 706, which may otherwise be referred to as a non-transitory computer-readable medium that stores computer-executable instructions that may be executed by the processor 704 and/or additional elements of the sensor unit 702. It is contemplated that the memory 706 may have any memory hardware chip design and any memory storage capacity. The memory 706 may be a form of persistent memory and/or may include volatile memory. Firmware associated with the operation of any of the elements of the sensor unit 702 may be stored by the memory 706, or may be stored on hardware within each of the schematically depicted elements of the sensor unit 702. The sensor unit 702 may additionally include a buffer 708, which may otherwise be referred to as buffer module 708 or sensor unit buffer module 702. This buffer 708 may be a form of volatile memory that may be configured to temporarily store data received from one or more of an accelerometer 710 and a gyroscope 712.

The buffer 708 may be implemented with any hardware configuration, and may include one or more memory register circuits. In addition, the buffer 708 may be configured to execute differing memory storage operations/algorithms in response to an operational mode signal received from the processor 704. This operational mode signal may include a data signal containing instructions that switches the operational mode of the buffer 708 between multiple different operational modes. In one example, the buffer 708 may be set to operate in a continuous mode or in a first-in first-out (FIFO) mode. When set to operate in the continuous mode, the buffer 708 may receive sensor data from one or more of the accelerometer 710 and the gyroscope 712, and store a most recent data point, otherwise referred to as a datum, of the received sensor data in a vacant memory unit in the buffer 708, or replace an oldest datum stored in the buffer 708 if no vacant memory unit is available in the buffer 708. When set to operate in the first-in first-out mode, the sensor data received from one or more of the accelerometer 710 and/or gyroscope 712 is stored in empty memory units in the buffer 708 until the buffer 708 is full. Data stored within the buffer 708 may be communicated to the processor 704 and/or a device or element external to the sensor unit 702 through the interface 714. In one example, an analysis unit 732 will communicate a signal requesting data stored within the buffer 708 to be sent to the interface 740 of the analysis unit 732.

In one example, the buffer 708 may be configured to store between 500 and 1,000 samples data generated by the accelerometer 710. These samples may include acceleration values for each of the three axes of the accelerometer 710. In certain examples, the accelerometer is configured to store 670, 678, 679, 680, 681, 682, 683, 684, 685, 690, 692 or 700 samples of the acceleration data received from the accelerometer 710. In one example, the buffer 708 may have between 2 and 10 kB of storage capacity. In certain examples, the buffer 708 may have a storage capacity of 4 kB.

The accelerometer 710 of the sensor unit 702 may include a three axis accelerometer. It is contemplated that the accelerometer 710 may utilize any hardware implementation, such as MEMS elements, among others. The gyroscope 712 of the sensor unit 702 may include a three axis gyroscope. Similarly, the gyroscope 712 may be implemented using any hardware implementation, such as MEMS elements, among others. In one example, the accelerometer 710 is sampled at a frequency between 350 and 450 Hz. In certain examples, the accelerometer 710 is sampled at a frequency of 409, 410, 413, 414, 415, 416, 417, 418, 420, or 421 Hz. In yet other examples, the accelerometer 710 is sampled at one or more frequencies ranging between 0.1 Hz and 10 MHz.

The analysis unit 732 may include a memory 734, which may be similar to memory 706, and a buffer 738 (otherwise referred to as analysis unit buffer module 738), which may be similar to buffer 708. Additionally, the analysis unit 732 may include a processor 734. The processor 734 may include one or more of a central processing unit (CPU), a microprocessor, or a graphics processing unit (GPU). The processor 734 may be implemented with any processing speed, one or more processing cores, and may utilize any chip architecture. The processor 734 may be similar to processor 704, or may be a different type of processor that is configured to operate at different processing speeds and/or power consumption values. In one specific example, the processor 734 may be configured with comparatively higher processing power and/or power consumption than the processor 704. As such, the processor 734 may be configured to be set to operate in a low power configuration, which may otherwise be referred to as an idle, sleep, standby or low power configuration. Additionally, the processor 734 may be set to operate in a high power configuration, which may otherwise be referred to as a wake configuration. In one example, the processor 734 may execute one or more algorithms to transition between the high power configuration and the low power configuration, or between the low power configuration and the high power configuration. In one example, this transition may be prompted by a signal received from an external source through the interface 740. In another example, the processor 734 may transition between a high power configuration and a low power configuration in response to detecting that one or more processing tasks have been completed, or in response to the elapse of one or more timers. As such, the processor 734 may transition between a low power configuration and a high power configuration periodically, or in response to timeout durations of differing lengths. In one specific example, an interrupt signal may be received by the processor 734, which may cause the processor 734 to execute an interrupt algorithm. This interrupt algorithm may transition an operational mode of the processor 734 from a low power configuration into a high power configuration, in addition to causing the processor 734 to execute additional algorithms or tasks. In one example, the interrupt signal received by the processor 734 may be referred to as a hardware interrupt signal. The hardware interrupt signal may be received at a specific hardware interrupt input of the processor 734, and from the interface 740.

For the sake of clarity, in some instances the processor 704 may be referred to as a first processor 704, and the processor 734 may be referred to as a second processor 734. Similarly, the memory 706 may be referred to as a first memory 706, and the memory 736 may be referred to as a second memory 736. The buffer 708 may be referred to as a first buffer 708, and the buffer 738 may be referred to as a second buffer 738.

Figure 8:
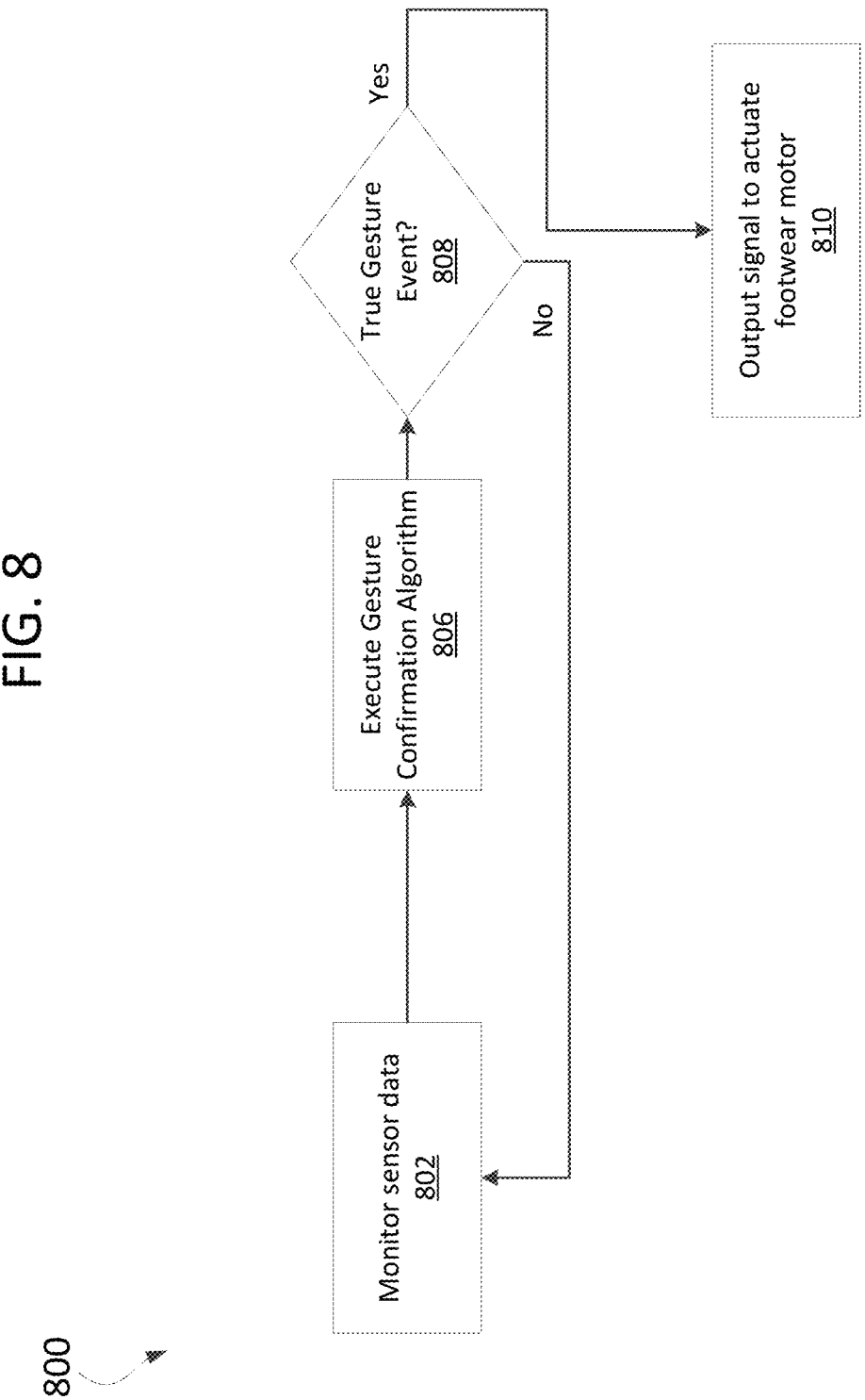
FIG. 8 is a flowchart diagram of one or more processes for recognizing a gesture event, according to one or more aspects described herein.

FIG. 8 is a flowchart diagram 800 of one or more processes to recognize a gesture event, according to one or more aspects described herein. More particularly, the flowchart diagram 800 describes one or more processes configured to recognize a gesture event in order to actuate a motor of an article of footwear. As such, the flowchart diagram 800 may be executed by the gesture recognition device 700 in order to actuate the motor 760. Block 802 represents one or more processes or algorithms executed by the gesture recognition device 700 to monitor sensor data. In one example, block 802 may represent processes executed by the sensor unit 702 to monitor data outputted from/generated by the accelerometer 710. In one example, the sensor unit 702 may continuously monitor data from the accelerometer 710. This accelerometer data may be received into the buffer 708 and/or the memory 706. In one example, the buffer 708 may be configured to receive and store data at a higher rate than may be possible using the memory 706. The processor 704 may be configured to analyze the accelerometer data received into the buffer 708 and/or memory 706. It is contemplated that the memory 706, buffer 708 and processor 704 may operate at any operational speed or frequency.

Block 806 of flowchart 800 represents one or more processes or algorithms executed by the gesture recognition device 700 in order to execute a gesture confirmation algorithm. In one example, block 806 may represent processes executed by the analysis unit 732 to receive possible gesture event data from the sensor unit 702 and determine whether the received possible gesture event data represents a true gesture event. In one example, a possible gesture event may be detected by the sensor unit 702 as a possible double tap by a user of the sensor unit 702, or a structure to which the sensor unit 702 is coupled. In additional or alternative implementations, the possible gesture event may be a single tap, triple tap, quadruple tap, quintuple tap etc. of the sensor unit 702 by a user. The tapping gesture may be executed by a user by imparting a force upon the sensor unit 702 using an appendage of said user (a leg or arm or part thereof, including a foot, a hand, a finger, among others). Block 808 of flowchart 800 represents a decision point in the one or more processes configured to identify a true gesture event from received possible gesture event data. If the analysis unit 732 determines that the received possible gesture event data does not represent a true gesture event, flowchart 800 proceeds to block 802. If, however, the analysis unit 732 determines that the received possible gesture event data represents a true gesture event, flowchart 800 proceeds to block 810. Accordingly, block 810 represents one or more processes or algorithms executed by the gesture recognition device 700 to output a signal to actuate a footwear motor, such as motor 760. This motor actuation, in turn, may be configured to selectively tighten or loosen a closure or lacing system of an article a footwear worn by a user.

Figure 9:
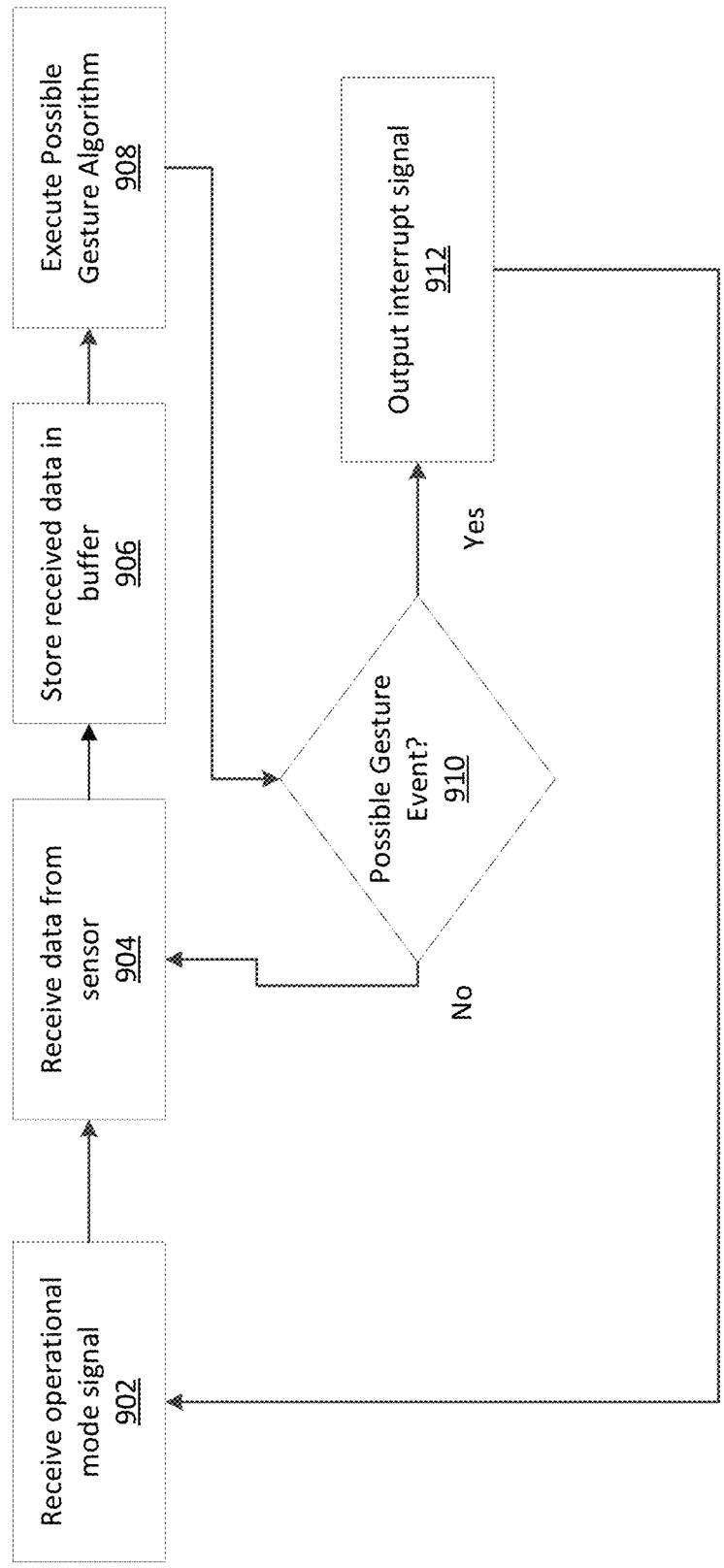
FIG. 9 is a flowchart diagram of one or more processes executed by a gesture recognition device to monitor sensor data for a possible gesture event, according to one or more aspects described herein.

FIG. 9 is a flowchart diagram 900 of one or more processes executed by the gesture recognition device 700 to monitor sensor data for a possible gesture event. In one example, the flowchart 900 describes in further detail those processes executed at block 802 of flowchart 800. Accordingly, in one example, flowchart 900 may be executed by the sensor unit 702 of the gesture recognition device 700. Block 902 of flowchart 900 represents one or more processes or algorithms executed by the sensor unit 702 to receive an operational mode signal. The operational mode signal may be received from an external source, or from the analysis unit 732. The operational mode signal may be received by the processor 704 through the interface 714. In response to receipt of the operational mode signal, the processor 704 may selectively set an operational mode of the sensor unit 702. The operational mode of the sensor unit 702 may be selectively set as a continuous mode or a first-in first-out mode. In one example, an operational mode of the sensor unit 702 may be set to be the continuous mode unless a possible gesture event is detected.

Block 904 of flowchart 900 represents one or more processes or algorithms executed by the sensor unit 702 to receive data from the accelerometer sensor 710. Block 906 of flowchart 900 represents one or more processes or algorithms executed by the sensor unit 702 to store the received sensor data in buffer 708. In one example, the accelerometer 710 may be continuously generating data that is stored in the buffer 708. Further, the processor 704 may continuously analyze the generated sensor data. Block 908 of flowchart 900 represents one or more processes or algorithms executed by the sensor unit 702 to analyze the generated sensor data to determine whether the generated sensor data represents a possible gesture. Accordingly, in one example, the processes or algorithms executed at block 908 represent a coarse, or high-level analysis of the data generated by the accelerometer sensor 710 to identify a possible gesture. In one example, the possible gestures identified at block 908 may include a double tap by a user of the sensor unit 702, or a structure to which the sensor unit 702 is coupled. In additional or alternative implementations, the possible gesture event may be a single tap, triple tap, quadruple tap, quintuple tap etc. the possible gesture event identified at block 900 and a may be subsequently confirmed as a true gesture event by the analysis unit 732.

Decision block 910 represents one or more processes or algorithms executed by the sensor unit 702 in response to the execution of the possible gesture algorithm at block 908. It is determined that the received sensor data represents a possible gesture event, then flowchart 900 proceeds to block 912. If, however, it is determined that the received sensor data does not represent a possible gesture event, flowchart 900 proceeds to block 904.

Block 912 of flowchart 900 represents one or more processes executed by the sensor unit 702 to output an interrupt signal. This interrupt signal may be outputted through the interface 714 and received by the interface 740 of the analysis unit 732. In one example, the interrupt signal may be a hardware interrupt signal configured to be communicated to a specific hardware port of the processor 734.

Figure 10:
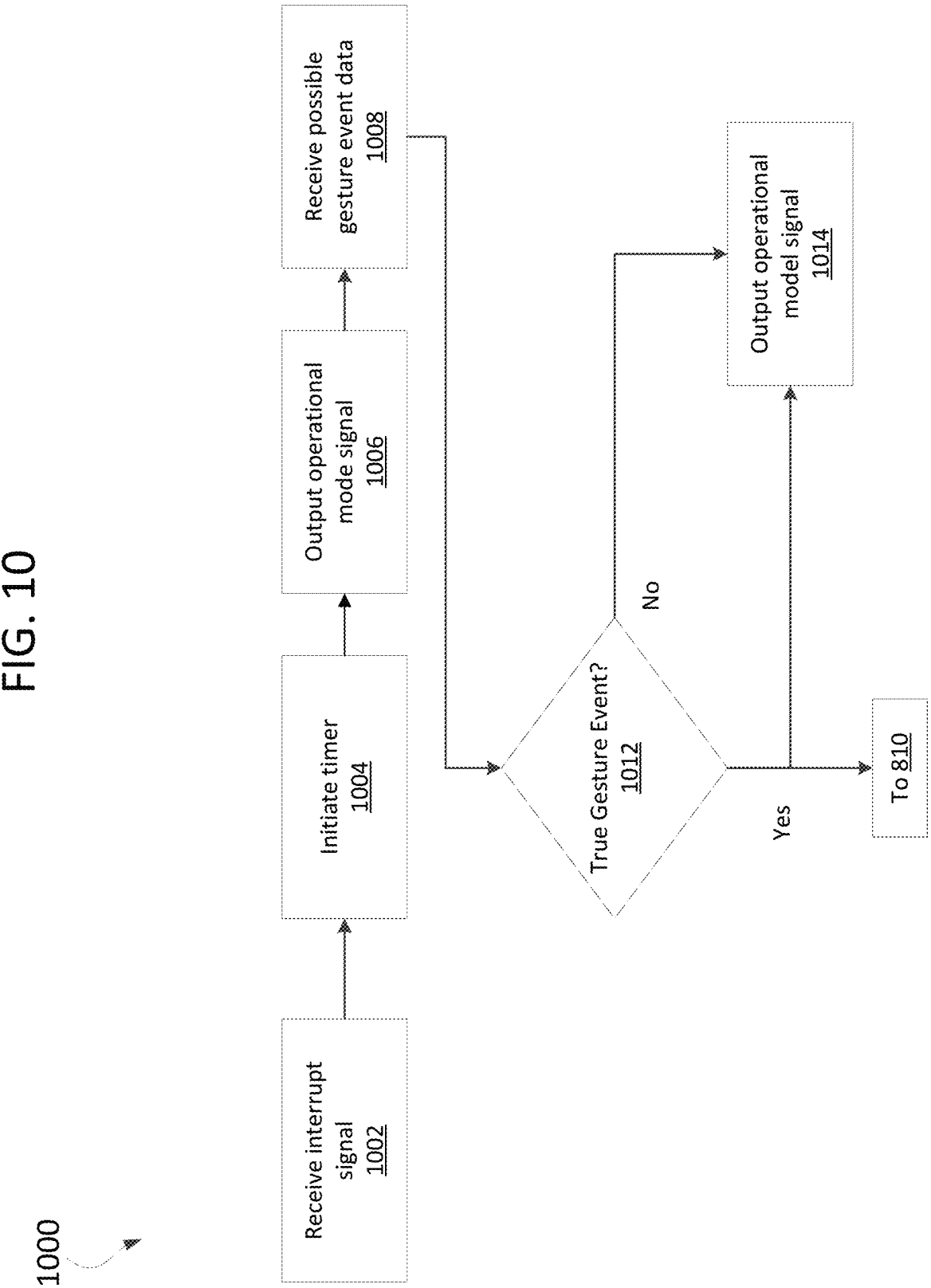
FIG. 10 is a flowchart diagram of one or more processes executed by an analysis unit to execute a gesture confirmation algorithm, according to one or more aspects described herein.

FIG. 10 is a flowchart diagram 1000 of one or more processes executed by the analysis unit 732 to execute a gesture confirmation algorithm. In one example the flowchart 1000 described in further detail those processes executed at block 806 of flowchart 800. Block 1002 represents one or more processes or algorithms executed in response to the receipt of an interrupt signal by the processor 734, from the sensor unit 702. In one example, the receipt of the interrupt signal causes the processor 734 to execute an interrupt algorithm that transitions the processor 734 from a low power mode to a high power mode. Block 1004 represents one or more processes or algorithms executed by the processor 734 to initiate a timer. This timer may have a predetermined timer duration. Once that predetermined timer duration has elapsed, the processor 734 may execute subsequent processes. It is contemplated that the predetermined timer duration may have any value. In one specific example, the predetermined timer duration may be between 10 ms and 100 ms, among others. In certain examples, the predetermined timer duration may be 35, 40, or 45 ms. Once the timer has elapsed, the analysis unit 732 may output an operational mode signal to the sensor unit 702. Advantageously, the timer associated with block 1004 may be utilized to ensure that the buffer 708 captures enough accelerometer data from the accelerometer sensor 710 to facilitate an accurate determination of whether the possible gesture event data represents a true gesture event. Absent the use of the timer associated with block 1004, the buffer may be set to operate in the first-in first-out mode and be filled with accelerometer data before all of the data necessary to confirm that the possible gesture event is a true gesture event has had time to enter into the buffer 708. The timer associated with block 1004 may include one or more timers, and may be implemented by the processor 734, and/or may be implemented by a dedicated timer circuit. One or more processes or algorithms executed to output this operational mode signal may be executed at block 1006. In one example, the operational mode signal sent from the analysis unit 732 to the sensor unit 702 may instruct the sensor unit to set its operational mode to be the first-in first-out mode. Accordingly, the timer of block 1004 and the operational mode signal of block 1006 may be used to extend the saving history of the sensor unit 702 by delaying a transition to a first-in first-out mode that adds data to buffer 708 until buffer 708 is full. This extension of the saving history allows for data to be captured in the buffer 708 that would otherwise not be saved and not be processed by the analysis unit 732. As such, the extension of the saving history of the sensor unit 702 may allow for more accurate identification of a true gesture event from detected sensor data received from the sensors 710 and/or 712.

Block 1008 of flowchart 1000 represents one or more processes to receive possible gesture event data from the sensor unit 702. In one example, upon setting the operational mode of the sensor unit 702 to be the first-in first-out mode, the buffer 708 will store data from the accelerometer 710 until the buffer 708 is full. When full, the buffer 708 and/or processor 704 may generate a signal that may be received by the analysis unit 732. Upon receipt of the signal indicating that the buffer 708 is full, the analysis unit 732 may execute one or more processes or algorithms to receive the data stored within the buffer 708.

Decision block 1012 represents one or more processes or algorithms executed by the analysis unit 732 to determine whether the received possible gesture event data is a true gesture event. Accordingly, decision block 1012 may represent one or more processes or algorithms configured to execute a gesture confirmation algorithm to confirm or reject the possible gesture event data as a true gesture event. If, at decision block 1012, it is determined that the possible gesture event data does not represent a true gesture event, flowchart 1000 proceeds to block 1014. If, at decision block 1012, it is determined that the possible gesture event data does represent a true gesture event, flowchart 1000 proceeds to block 810 of flowchart 800 whereby the analysis unit 732 outputs a signal to actuate a footwear motor. In addition, upon determining that the possible gesture event data represents a true gesture event, flowchart 1000 also proceeds to block 1014. At block 1014, one or more processes may be executed by the analysis unit 732 to set an operational mode of the sensor unit 702 to be the continuous mode corresponding to the buffer 708 storing a most recent datum of sensor data received from the accelerometer 710 in a vacant memory unit in the buffer 708 or replacing an oldest datum stored in the buffer 708.

Figure 11:
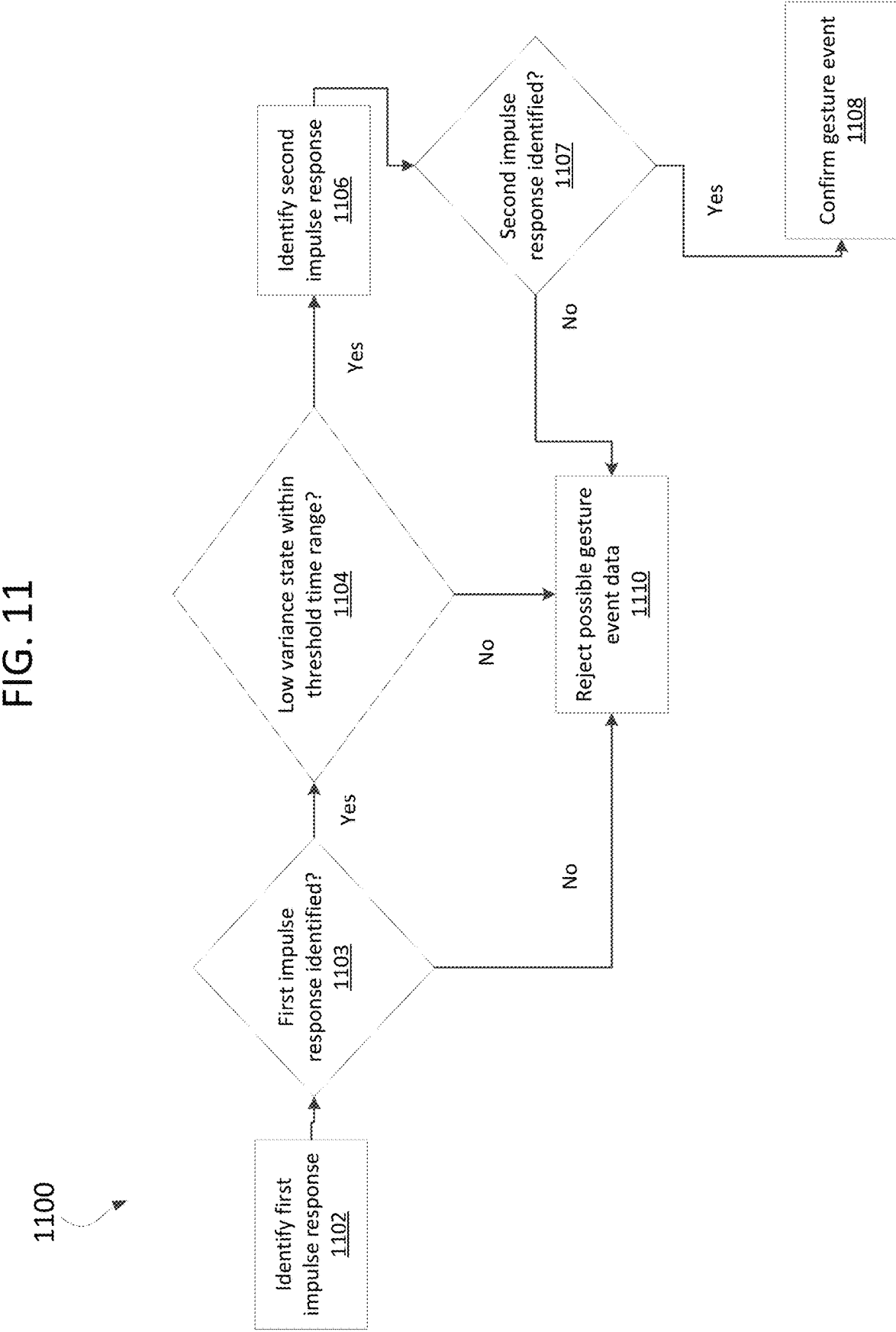
FIG. 11 is a flowchart diagram of a gesture confirmation algorithm according to one or more aspects described herein.

FIG. 11 is a flowchart diagram 1100 of a gesture confirmation algorithm. Flowchart 1100 describes in further detail those processes executed at block 1012 of flowchart 1000. The gesture confirmation algorithm of flowchart 1100 may be executed by the analysis unit 732 on the possible gesture event data received from the sensor unit 702. Block 1102 corresponds to one or more processes or algorithms executed using the received possible gesture event data to identify a first impulse response within the data. It is contemplated that this first impulse response may be based upon a magnitude of an acceleration signal identified on one specific axis of the three axes of the accelerometer 710. In another example, the first impulse response may be identified based upon a magnitude of an acceleration signal identified on any one of the three axes of the accelerometer 710. In yet another example, the first impulse response may be identified based upon an average, a maximum, or a minimum acceleration value of two or more of the three axes of the accelerometer 710. It is contemplated that the first impulse response may be based upon an acceleration value above a threshold, and/or an acceleration value that persists for a threshold duration, and/or an acceleration value that has an energy or power value above a threshold value.

In certain examples, the one or more impulse response processes or algorithms executed at block 1102 (and block 1106) may further include passing of the possible gesture event data received from the sensor unit 702 through a low-pass filter. The output from the low-pass filter may be used to estimate a DC offset preset within the acceleration data received from the accelerometer 710. In one example, this DC offset may be used as a baseline to which the rest of the accelerometer data from the accelerometer 710 is compared. In certain examples, the processes or algorithms executed at block 1102 may include analyzing the input data in a rolling window, and such that the rolling window analyzes a subset of the received possible gesture event data. The size of this subset of the received possible gesture event data may range between one data point and all of the data received from the sensor unit 702. In one example, the one or more processes executed at block 1102 may analyze a variance in a signal on one or more of the axes of the accelerometer data, and flag a data point or multiple consecutive data points as being indicative of an impulse when an acceleration signal deviates by a predetermined amount from a mean value. In one example, this predetermined amount may be between 0.05 and 0.15 g (g=acceleration due to gravity). In certain examples, this predetermined deviation amount may be at least 0.1 g from the mean.

Decision block 1103 corresponds to one or more processes or algorithms executed by the analysis unit 732 to determine if the first impulse response has been successfully identified. If the first impulse response has been successfully identified, flowchart 1100 proceeds to decision block 1104. If the first impulse response has not been successfully identified, flowchart 1100 proceeds to block 1110, and the received data is rejected. Decision block 1104 corresponds to one or more processes or algorithms executed by the analysis unit 732 to identify a low variance state following the identification of the first impulse response in the received possible gesture event data. In one example, the first impulse response identified at block 1102 should return to a low variance (quiet) state within a threshold quieting time following the high variance impulse state. This threshold quieting time may be less than 0.2 seconds, or less than 0.15 seconds. However, alternative quieting time threshold values may be used, such as less than 1.0 seconds, less than 0.9 seconds, less than 0.7 seconds, among others. In one example, this threshold amount of time may be based upon a sampling rate of the accelerometer 710, and may be expressed as a number of samples of the data received from the accelerometer 710. As such, in one example, the quieting time may correspond to between 10 and 100 samples of data received from the accelerometer 710. In certain examples, if the accelerometer data does not return from the high variance data identified at block 1102 to a quiet state within the threshold quieting time, the possible gesture event data may be rejected as a non-event. Further, the low variance state may be identified based upon a magnitude of acceleration in a similar manner to the identification described in relation to block 1102. Further, the low variance state associated with decision block 1104 may be identified based upon the acceleration data received from the accelerometer 710 being below a threshold acceleration magnitude, energy or power that persists for a low variance duration between a lower time threshold and an upper time threshold. In one example, the lower time threshold of the low variance duration may be 0.05 seconds, and the upper time threshold of the low variance duration may be 1.0 seconds. In certain examples, the lower time threshold of the low variance duration may be 0.1 seconds, and the upper time threshold of the low variance duration may be 0.7 seconds. However, it is contemplated that any lower and upper time threshold may be utilized for the low variance duration, without departing from the scope of these disclosures. It is also contemplated that the low variance duration may correspond to a number of samples of the data from the accelerometer 710, rather than a specific number of/fraction of seconds. In one example, the low variance duration range may correspond to a number of samples ranging between 10 and 300, or 30 and 280, among many others. As such, the one or more processes or algorithms executed at decision block 1104 may analyze the data to determine whether the signal returns to a low variance duration lasting between, in one example, 30 and 280 samples in length. If a low variance state persists for a duration outside of the range between the lower time threshold and the upper time threshold, the analysis unit 732 will reject the possible gesture event data as a non-event. This rejection of the possible gesture event data is described in relation to block 1110 of flowchart 1100.

If a low variance state is identified at decision block 1104, flowchart 1100 proceeds to block 1106. Block 1106 corresponds to one or more processes or algorithms executed by the analysis unit 732 to identify a second impulse response within the received possible gesture event data. Accordingly, the processes executed at block 1106 may be similar to those executed at block 1102. Decision block 1107 corresponds to one or more processes or algorithms executed by the analysis unit 732 to determine if the second impulse response has been successfully identified. If the second impulse response has been successfully identified, flowchart 1100 proceeds to decision block 1108. If the second impulse response has not been successfully identified, flowchart 1100 proceeds to block 1110, and the received data is rejected. Block 1108 corresponds to one or more processes or algorithms to confirm that the possible gesture event data corresponds to a true gesture event. Once the possible gesture event data is confirmed as a true gesture event at block 1108, the one or more processes associated with block 810 of flowchart 800 may be executed.

FIG. 12 is a flowchart diagram 1200 of one or more processes executed by the analysis unit 732 to identify an impulse response within possible gesture event data received from the accelerometer 710 of the sensor unit 702. Flowchart 1200 describes in further detail those one or more processes or algorithms executed at blocks 1102 and/or 1106 of flowchart 1100. Block 1202 corresponds to one or more processes or algorithms executed by the analysis unit 732 identify an incidence of high variance in possible gesture event data. This incidence of high variance in the possible gesture event data may be identified based upon a magnitude of an acceleration signal identified on one specific axis of the three axes of the accelerometer 710. In another example, the incidence of high variance response may be identified based upon a magnitude of an acceleration signal identified on any one of the three axes of the accelerometer 710. In yet another example, the incidence of high variance may be identified based upon an average, a maximum, or a minimum acceleration value of two or more of the three axes of the accelerometer 710. It is contemplated that the incidence of high variance response may be based upon an acceleration value above a threshold, and/or an acceleration value that persists for a threshold duration, and/or an acceleration value that has an energy or power value above a threshold value.

In response to identification of an incidence of high variance in the possible gesture event data, flowchart 1200 may proceed to block 1204, and the analysis unit 732 may store a subset of the possible gesture event data in the buffer 738. It is contemplated that the subset of the possible gesture event data stored in the buffer 738 may have any size. In one example, the subset of possible gesture event data stored in the buffer 738 is a moving window upon which an analysis of the data may be executed by the analysis unit 732. In certain examples, buffer 738 may be configured to store between 20, 25, 30, 35 or 40 samples of accelerometer data received as part of the possible gesture event data. In one example, 30 samples of accelerometer data may make up the subset of possible gesture event data as a moving window. As such, all of the possible gesture event data received from the sensor unit 702 may be fed through the buffer 738, and 30 consecutive samples may be analyzed at a time as a moving window analysis. In certain examples, between 5 and 200 samples may be analyzed within the buffer 738, or between 1 and a maximum number of samples received from the sensor unit 702 may be analyzed within the buffer 738. In one example, the buffer 738 may have a similar hardware configuration to the buffer 708. In another example, the buffers 708 and 738 may have different storage capacities and/or hardware configurations.

Block 1206 of flowchart 1200 corresponds to one or more processes or algorithms executed by the analysis unit 732 to execute a Fast Fourier Transform on the subset of data stored within the buffer 738. It is contemplated that any Fast Fourier Transform processes may be utilized, without departing from the scope of these disclosures. In one example, the Fast Fourier Transform is configured to determine a frequency content of the subset of possible gesture event data in the buffer module 738. Decision block 1208 corresponds to one or more processes or algorithms that may be executed by the analysis unit 732 to identify a threshold amount of energy of the frequency content identified using the Fast Fourier Transform. The frequency content is analyzed to determine whether the threshold amount of energy is within a predetermined impulse frequency band. For example, the analysis unit 732 is concerned with identification of an intentional gesture made by a user, and excludes frequency content that does not represent an intentional gesture made by the user. In one example, the one or more processes executed at decision block 1208 may analyze the possible gesture event data across a frequency range of 0-100 Hz. In another example the analysis may consider the frequency range of 0-60 Hz. However, it is contemplated that any frequency range may be utilized with the described analysis, without departing from the scope of these disclosures. In one example, the one or more processes executed at block 1208 may be configured to analyze a subset of the frequency range (a subset of the frequency ranges of 0-100 Hz, 0-60 Hz, among others). This analysis of a subset of the frequency content of the received possible gesture event data is configured to analyze frequency content close to a natural frequency of the sensor unit 702. Accordingly, those of ordinary skill in the art will recognize that all structures vibrate at a natural frequency/state when subjected to an impulse from being hit/tapped. In this instance, the analysis unit 732 is configured to identify when the user has tapped the sensor unit 702. The natural frequency/damped natural frequency of the sensor unit 702 or the combined sensor unit 702 and one or more structures to which it is coupled may be measured. In one example, this natural frequency may be in the range of 30-45 Hz. In another example, the natural frequency may be approximately 36 Hz. However, it is contemplated that the methodology described herein may be utilized with any natural frequency structure, without departing from the scope of these disclosures. Accordingly, when hit/tapped by the user, the sensor unit 702/the combined sensor unit 702 and one or more structures to which the sensor unit 702 is coupled may vibrate at the natural frequency. The frequency response will also include energy in a range around the natural frequency. In order to identify an impulse response, the analysis unit 732 may search for a frequency response with a threshold amount of energy within a predetermined impulse frequency band that is a subset of the full frequency range analyzed by the Fast Fourier Transform of block 1206. For example, at block 1208, the analysis unit 732 may determine that the subset of the possible gesture event data is an impulse if at least 70% of the energy of the acceleration signal is within an impulse frequency band of 10-100 Hz. In another example, the threshold amount of energy may be at least 80%. However, it is contemplated that any threshold energy amount may be utilized, without departing from the scope of these disclosures. In another example, the impulse frequency band may be 14-56 Hz. However, it is contemplated that any impulse frequency band may be utilized, without departing from the scope of these disclosures.

As previously described, the total frequency range analyzed by the Fast Fourier Transform at block 1206 may range from 0-100 Hz, or 0-60 Hz, among others. This represents a partial Fast Fourier Transform, and does not include higher frequencies, since those are not considered to be relevant to the identification of an impulse response indicative of a gesture executed by a user. In one example, a full Fast Fourier Transform would consider frequencies in the range of 0 Hz to half of the sampling frequency of the accelerometer 710. In certain examples, the sampling frequency of the accelerometer 710 may be between 350 and 450 Hz. In certain examples, a sampling frequency of the accelerometer may be 410 Hz of 416 Hz. Advantageously, this partial Fast Fourier Transform may be executed by the analysis unit 732 more quickly and using less energy than a full Fast Fourier Transform. This, in turn, allows the gesture recognition device 700 to recognize a gesture implemented by a user quickly and with higher energy efficiency than conventional devices. In certain examples, it is assumed that energy within the range of 0 to 10 Hz is associated with human motion not indicative of a gesture attempt. As previously described, the Fast Fourier Transform may be executed on a subset of possible gesture event data, with this subset being a moving window of a certain number of samples of data from the accelerometer 710. In one example, this subset may contain 30 samples, and the Fast Fourier Transform may utilize a frequency resolution of approximately 14 Hz per band. Accordingly, the energy contained within the 0 to 14 Hz may be determined to be human motion not indicative of a gesture event. Energy contained within the 14-28 Hz, 28-42 Hz, and 42-56 Hz band may be attributed to an impulse response from a tap associated with a gesture attempt on the sensor device 702. In certain examples, an impulse is detected at block 1208 if at least 70%, or at least 80% of the energy of the signal of those samples used to generate Fast Fourier Transform is contained within the 14-56 Hz band. In one example, a Taylor Series approximation of basis functions of a Fast Fourier Transform executed at block 1206 may be utilized in order to improve the memory efficiency of the Fast Fourier Transform.

The flowchart 1200 may proceed to block 1210 upon confirming that a threshold amount of energy of the frequency content is within a predetermined impulse frequency band. At block 1210 the analysis unit 732 may output a signal confirming that the subset of data stored within the buffer 732 corresponds to an impulse. If, however, the one or more processes executed at block 1208 determined that there is not a threshold amount of energy within the predetermined impulse frequency band, flowchart 1200 may proceed to block 1212 and data stored within the buffer 738 is rejected as an impulse.

Referring to FIGS. 13-16, an example of an article of footwear 3010 including a system providing for variable tension is disclosed. In some implementations, the article of footwear 3010 includes an upper 2100 and a sole structure 2200 attached to the upper 2100. The article of footwear 3010 further includes a tensioning system 2300 and a tensioning device 2400 each integrated into at least one of the upper 2100 and the sole structure 2200. The tensioning system 2300 includes a cable 2302 and a series of cable routing elements 2304, 2306, 2308 configured to manage the tension of the upper 2100. The upper 2100, the tensioning system 2300, and the tensioning device 2400 cooperate to move the article of footwear 3010 between a relaxed state and a tightened state. Particularly, the cable 2302 is movable in a tightening direction $D_T$ to move the article of footwear 3010 into the tightened state. In some implementations, the upper 2100 and the sole structure 2200 cooperate to provide passages and guides for routing portions of the cable 2302 through the tensioning device 2400. The tensioning device 2400 is configured to selectively move and secure the cable 2302 in the tightened state.

The article of footwear 3010, and components thereof, may be described as including an anterior end 3012 associated with a forward-most point of the footwear 3010, and a posterior end 3014 corresponding to a rearward-most point of the footwear 3010. As shown in the bottom view of FIG. 16, a longitudinal axis $A_{10}$ of the footwear 3010 extends along a length of the footwear 3010 from the anterior end 3012 to the posterior end 3014, and generally divides the footwear 3010 into a lateral side 3016 and a medial side 3018. Accordingly, the lateral side 3016 and the medial side 3018 respectively correspond with opposite sides of the footwear 3010 and extend from the anterior end 3012 to the posterior end 3014.

The article of footwear 3010 may be divided into one or more regions along the longitudinal axis $A_{10}$. The regions may include a forefoot region 3020, a mid-foot region 3022, and a heel region 3024. The forefoot region 3020 may correspond with toes and joints connecting metatarsal bones with phalanx bones of a foot. The mid-foot region 3022 may correspond with an arch area of the foot, and the heel region 3024 may correspond with rear regions of the foot, including a calcaneus bone.

The upper 2100 forms an enclosure having a plurality of components that cooperate to define an interior void 2102 and an ankle opening 2104, which cooperate to receive and secure a foot for support on the sole structure 2200. For example, the upper 2100 includes a pair of quarter panels 2106 in the mid-foot region 3022 on opposite sides of the interior void 2102. A throat 2108 extends across the top of the upper 2100 and defines an instep region extending between the quarter panels 2106 from the ankle opening 2104 to the forefoot region 3020. In the illustrated example, the throat 2108 is enclosed with a material panel extending between the opposing quarter panels in the instep region to cover the interior void 2102. Here, the material panel covering the throat 2108 may be formed of a material having a higher modulus of elasticity than the material forming the quarter panels 2106.

The upper 2100 of the article of footwear 3010 may be further described as including heel side panels 2110 extending through the heel region 3024 along the lateral and medial sides 3016, 3018 of the ankle opening 2104. A heel counter 2112 wraps around the posterior end 3014 of the footwear 3010 and connects the heel side panels 2110. Uppermost edges of the throat 108, the heel side panels 2110, and the heel counter 2112 cooperate to form a collar 2114, which defines the ankle opening 2104 of the interior void 2102.

The upper 2100 may be formed from one or more materials that are stitched or adhesively bonded together to define the interior void 2102. Suitable materials of the upper 2100 may include, but are not limited to, textiles, foam, leather, and synthetic leather. The example upper 2100 may be formed from a combination of one or more substantially inelastic or non-stretchable materials and one or more substantially elastic or stretchable materials disposed in different regions of the upper 2100 to facilitate movement of the article of footwear 3010 between the tightened state and the loosened state. The one or more elastic materials may include any combination of one or more elastic fabrics such as, without limitation, spandex, elastane, rubber or neoprene. The one or more inelastic materials may include any combination of one or more of thermoplastic polyurethanes, nylon, leather, vinyl, or another material/fabric that does not impart properties of elasticity.

As provided above, the sole structure 2200 is attached to the upper 2100 and defines a ground-engaging surface 3026 of the footwear 3010. The sole structure 2200 includes a top surface 2202 and a bottom surface 2204 formed on an opposite side of the sole structure 2200 from the top surface 2202. The bottom surface 2204 of the sole structure 2200 may define the ground-engaging surface 3026 of the footwear 3010. The sole structure 2200 further includes a peripheral side surface 2206 extending between the top surface 2202 and the bottom surface 2204, such that the peripheral side surface 2206 defines an outer perimeter of the sole structure 2200. The sole structure 2200 extends continuously from a first end 2208 at the anterior end 3012 of the footwear 3010 to a second end 2210 at the posterior end 3014 of the footwear 3010.

The sole structure 2200 may also include one or more engagement features 2212 formed on the peripheral side surface 2206. In the illustrated example, the sole structure 2200 includes an arcuate lip 2212 extending from the second end 2210 of the sole structure 2200. Here, the lip 2212 extends along an arcuate path and forms a concave upper surface configured to receive an anterior end 3012 of another one of the articles of footwear 3010. Thus, the anterior end 3012 of a first article of footwear 3010 can be engaged with the lip 2212 of a second article of footwear 3010 to facilitate removal of the second article of footwear 3010. Particularly, the posterior end 3014 of the second article of footwear 3010 may be held down at the lip 2212 so that a user can step out of the article of footwear 3010. Alternatively, a bare foot or hand of the wearer may be used to pull the article of footwear 3010 from the foot using the lip 2212.

As referred to throughout the application and the accompanying claims, the sole structure 2200 and the upper 2100 define a 'bite line' 3028 where the peripheral side surface 2206 and the upper 2100 intersect when the footwear 3010 is assembled. The bite line 3028 can extend along the footwear 3010 entirely from the first end 2208 to the second end 2210 on either or both of the lateral side and the medial side, and can also extend around the first end 2208, the second end 2210, or both.

The sole structure 2200 is configured to receive the tensioning device 2400 and a portion of the tensioning system 2300, and may include one or more cavities or conduits formed therein. In the illustrated example, the sole structure 2200 includes an aperture or cavity 2214 formed between the top surface 2202 and the bottom surface 2204. The cavity 2214 is configured to receive the tensioning device 2400 within the sole structure 2200. In some examples, the tensioning device 2400 may be encapsulated within the sole structure 2200.

Figure 13A:
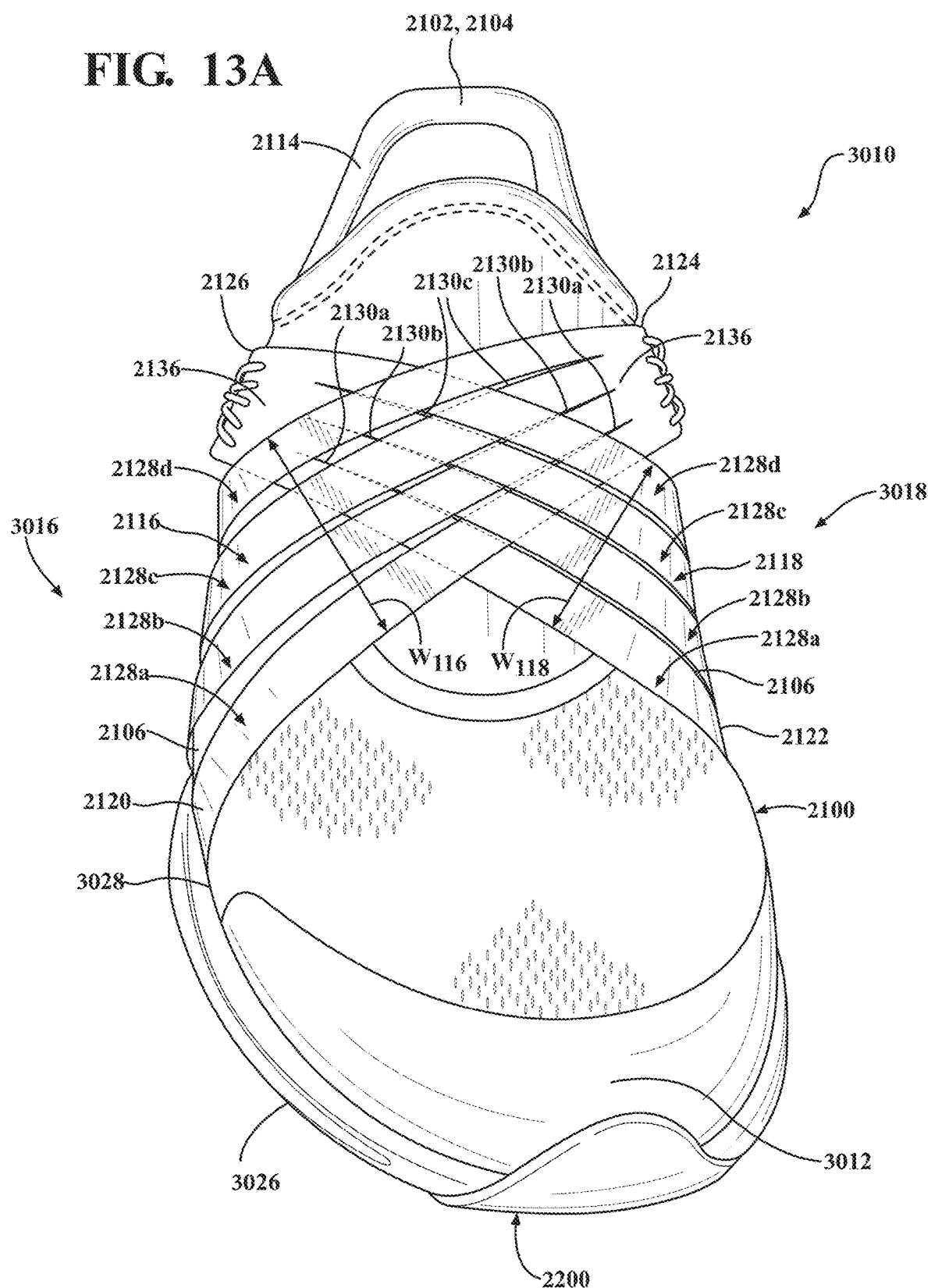
FIG. 13A is a top perspective view of an article of footwear including a tensioning system in accordance with principles of the present disclosure, where the tensioning system is shown in a loosened state.
Figure 13B:
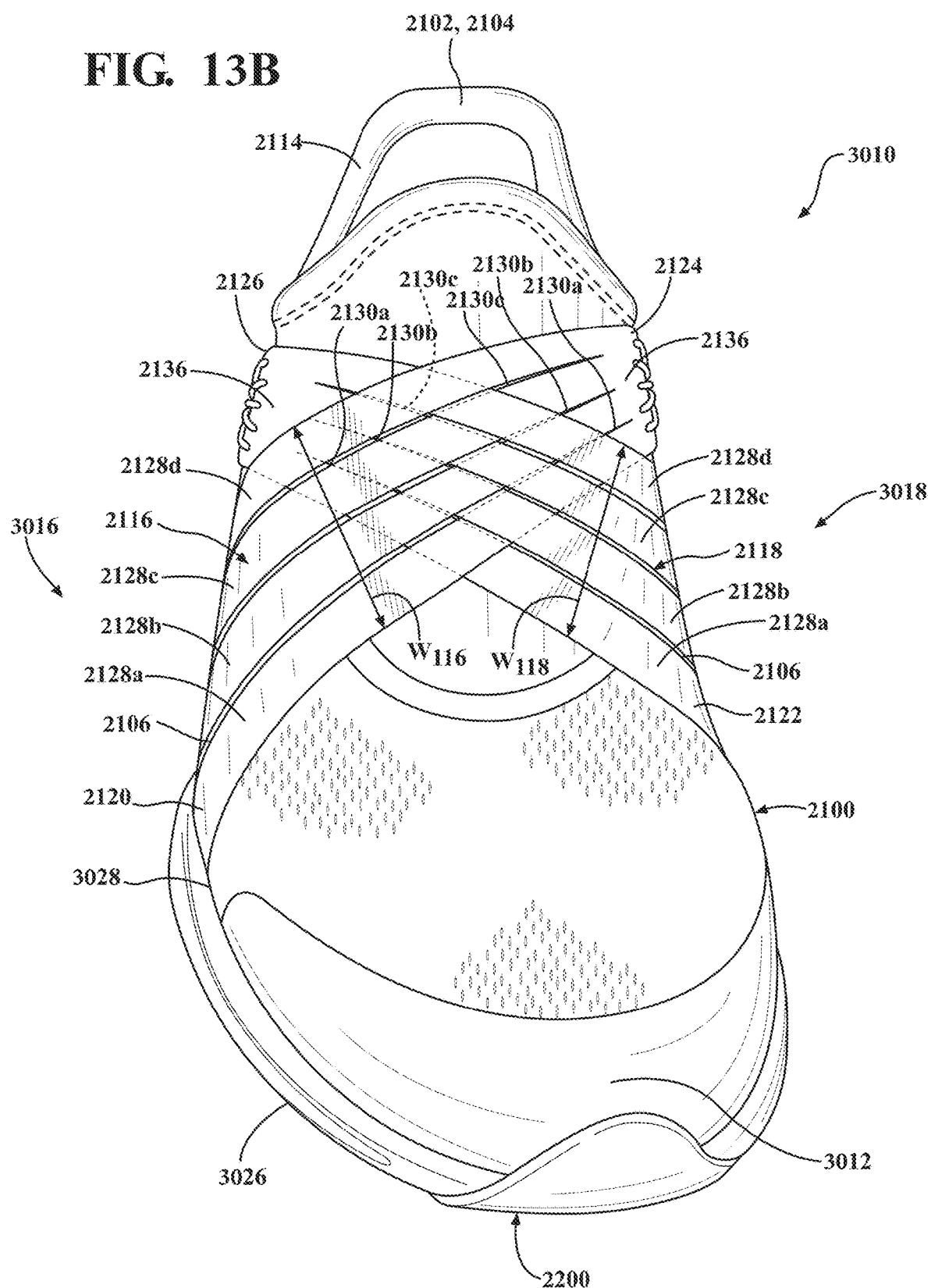
FIG. 13B is a top perspective view of the article of footwear of FIG. 13A, where the tensioning system is shown in a tightened state.
Figure 17A:
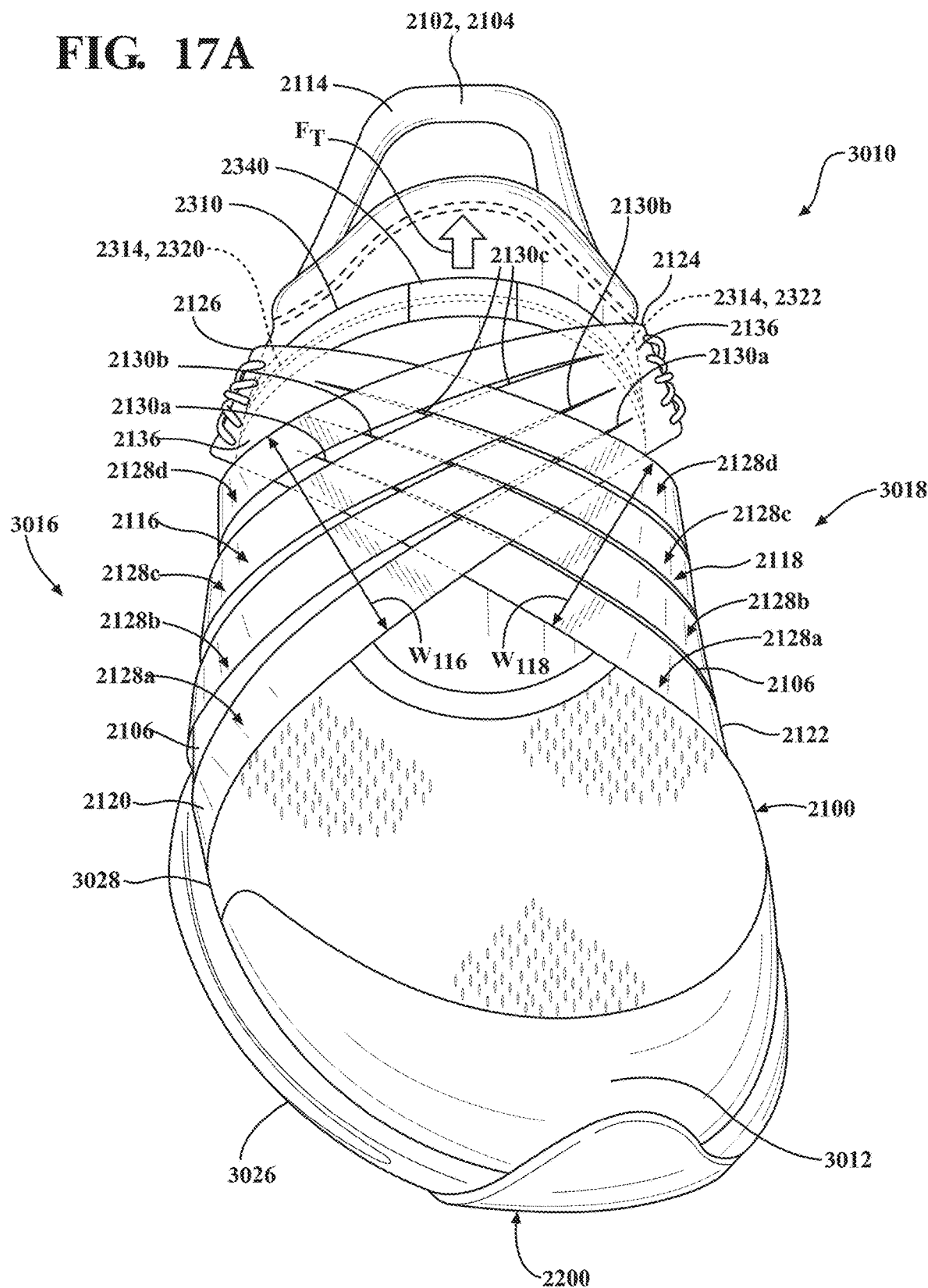
FIG. 17A is a top perspective view of an article of footwear including a tensioning system in accordance with principles of the present disclosure, where the tensioning system is shown in a loosened state.

As introduced above, a pair of interweaved straps 2116, 2118 may be attached to the upper 2100, which are operable for moving the upper 2100 between a relaxed or loosened state (FIGS. 13A 17A), and a constricted or tightened state (FIGS. 13B and 17B). While described here as being part of the upper 2100, the straps 2116, 2118 may also be described as being included in the tensioning system 2300, described below. For instance, the straps 2116, 2118 cooperate with the cable 2302 of the tensioning system 2300 to move the article of footwear 3010 between the constricted or tightened state and the relaxed state.

Each of the straps 2116, 2118 extends across the throat 2108 of the upper 2100. As described in greater detail below, each of the straps 2116, 2118 is connected to a respective tensioning strand 2316, 2318 of a tensioning element 2312 of a cable 2302, which cooperate with each other via the tensioning device 2400 to selectively transition the upper 2100 between the tightened state and the relaxed state. The cable 2302 is routed from the tensioning device 2400 in the sole structure 2200 to the straps 2116, 2118 through a plurality of guides 2304 and loops 2306. In some examples, the tensioning system 2300 may include a heel strap 2308 extending around the posterior end 3014 of the upper 2100 and including one or more of the guides 2304 or loops 306 for routing the tensioning strands 2316, 2318 of the tensioning element 2312.

Figure 14:
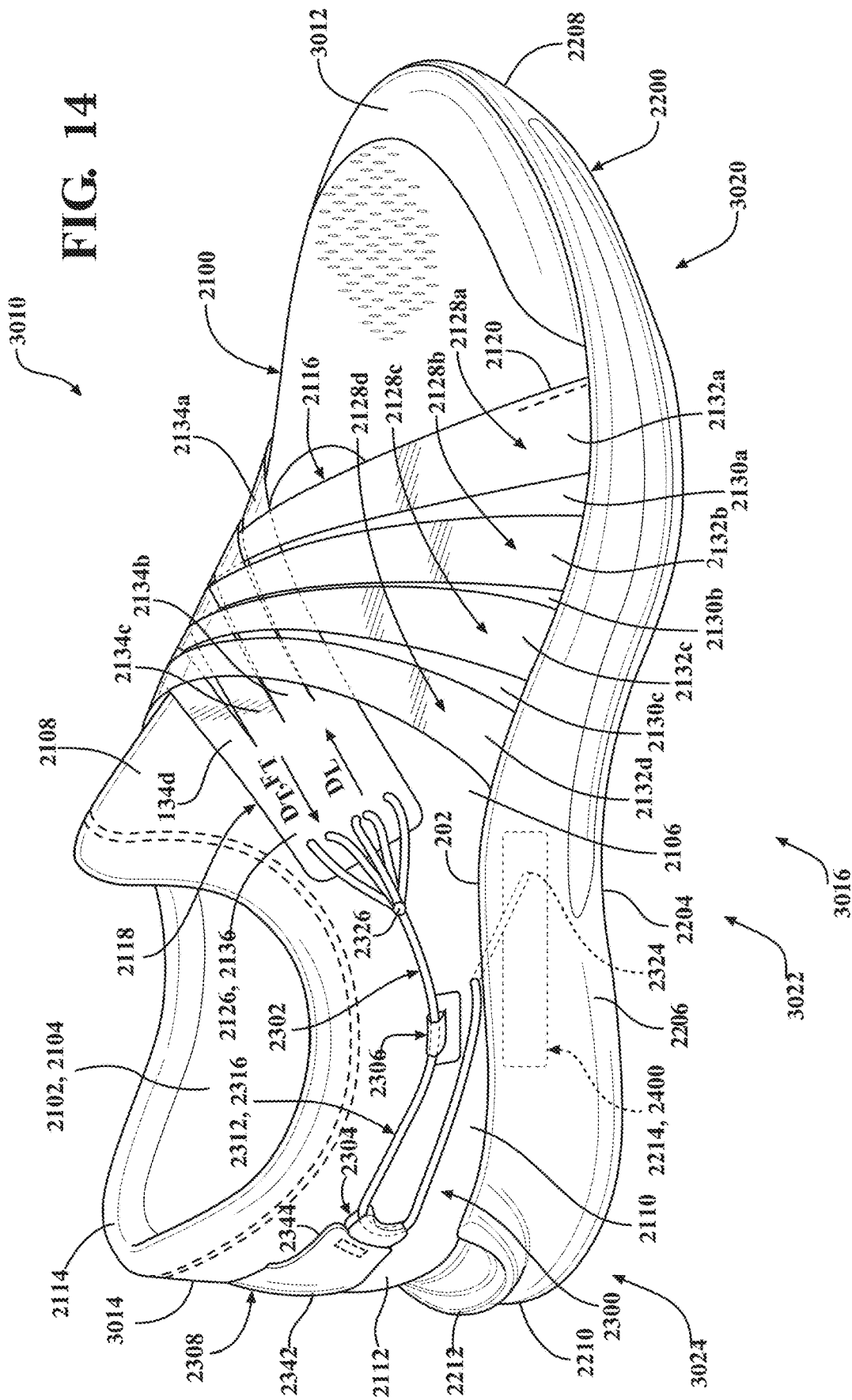
FIG. 14 is a lateral-side perspective view of the article of footwear of FIG. 13A.
Figure 15:
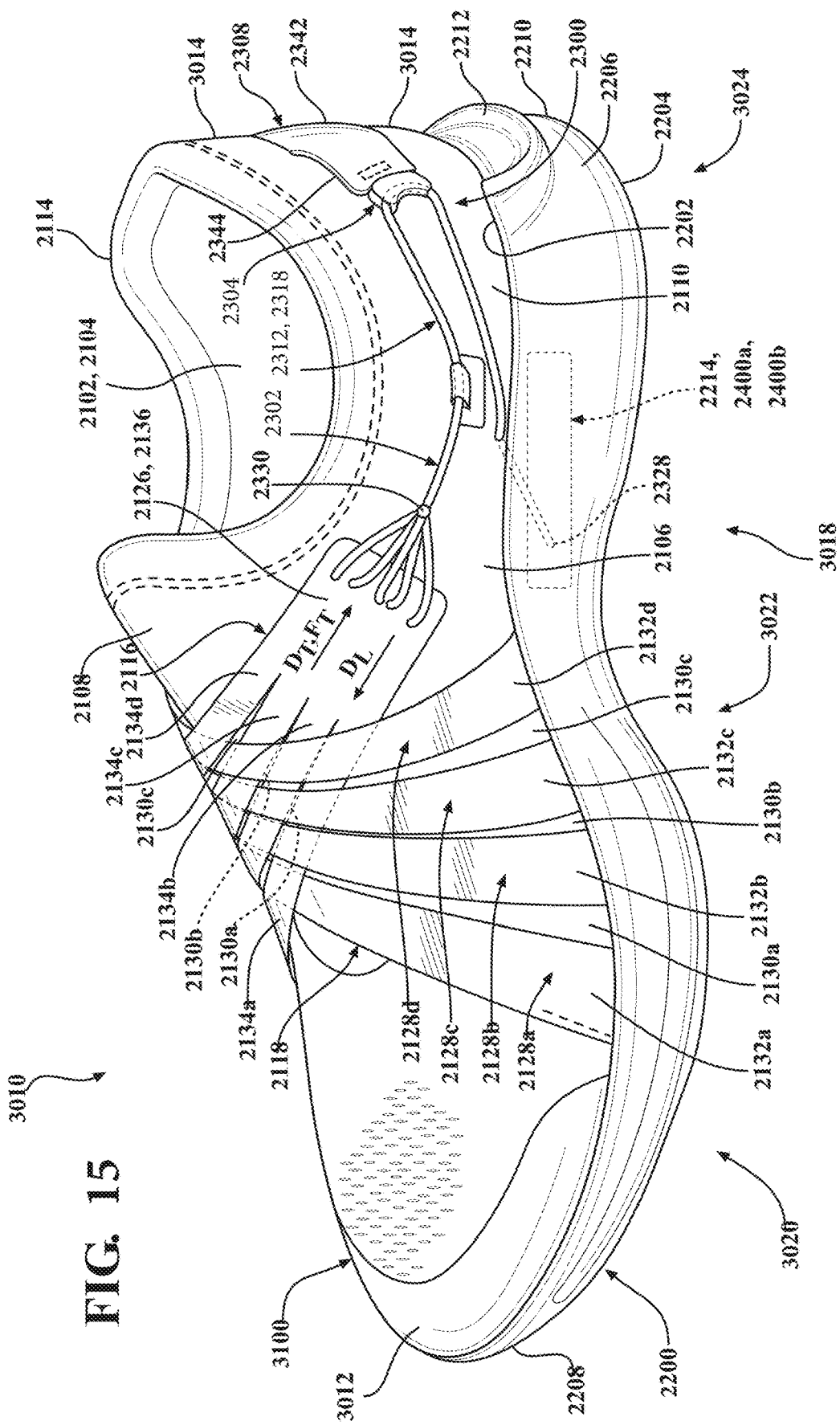
FIG. 15 is a medial-side perspective view of the article of footwear of FIG. 13A.
Figure 16:
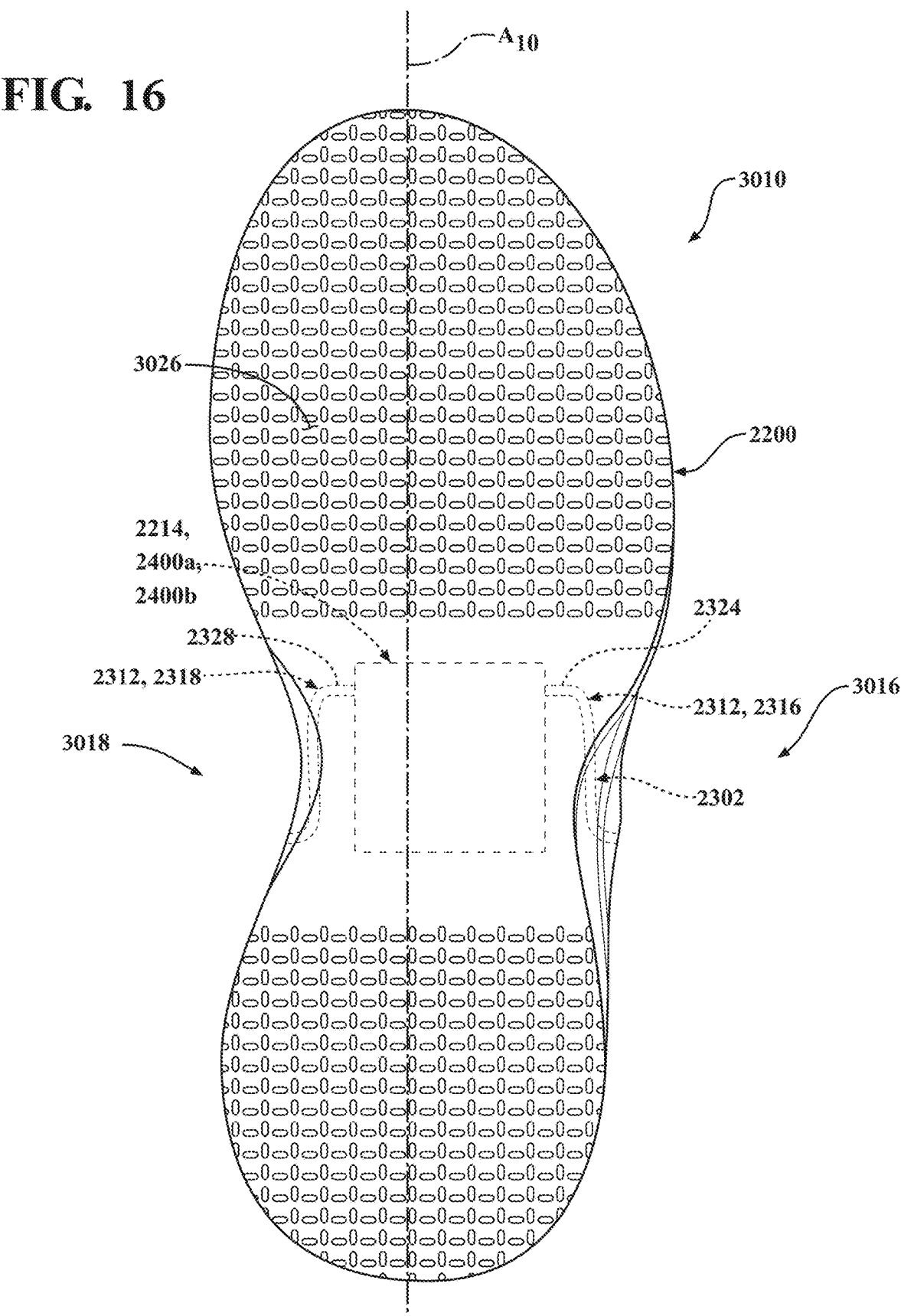
FIG. 16 is a bottom plan view of the article of footwear of FIG. 13A.

With reference to FIGS. 13-15, the straps 2116, 2118 of the footwear 3010 include a first strap 2116 extending over the throat 2108 from the lateral side 3016 of the upper 2100, and second strap 2118 extending over the throat 2108 from the medial side 3018 of the upper 2100. Particularly, the first strap 2116 extends over the throat 2108 from a fixed end 2122 attached to the article of footwear 3010 on the lateral side 3016 to a free end 2124 on the medial side 3018 of the upper 2100. Similarly, the second strap 2118 extends over the throat 2108 from a fixed end 2122 attached to the article of footwear 3010 on the medial side 3018 to a free end 2126 on the lateral side 3016 of the upper 2100. In the illustrated example, each of the fixed ends 2120, 2122 is attached to the article of footwear 3010 at the bite line 3028 formed between the upper 2100 and the sole structure 2200. Thus, the straps 2116, 2118 cooperate to completely encompass the upper 2100 in the mid-foot region 3022.

As shown, each of the straps 2116, 2118 is flared in a direction from the free end 2124, 2126 to the fixed end 2120, 2122, such that a width $W_{116}$, $W_{118}$ of each strap 2116, 2118 increases along a direction from the free end 2124, 2126 to the fixed end 2120, 2122. In other words, the straps 2116, 2118 may be described as tapering along the direction from the fixed end 2120, 2122 to the free end 2124, 2126. The fixed end 2120, 2122 of each strap 2116, 2118 is positioned closer to the anterior end 3012 than the respective free end 2124, 2126 of the strap 2116, 2118. Thus, each strap 2116, 2118 may be described as extending at an oblique angle relative to the longitudinal axis $A_{10}$ of the article of footwear 3010. As shown, this arrangement results in the straps 2116, 2118 intersecting and overlapping each other across the throat 2108 to form an X-shaped closure over the upper 2100.

Each of the straps 2116, 2118 includes a plurality of bands 2128 extending in parallel (i.e., not intersecting) along a direction from the free end 2124, 2126 to the fixed end 2120, 2122. In the illustrated example, each band 2128a-2128d extends from a first end 2132a-2132d at the fixed end 2120, 2122 of the strap 2116, 2118 to a second end 2134a-2134d at the free end 2124, 2126 of the strap 2116, 2118. Here, the first ends 2132a-2132d of the bands 2128 are individually attached at the bite line 3028 and collectively form the fixed end 2120, 2122 of each strap 2116, 2118. Thus, the bands 2128a-2128d are separated from each other at the fixed ends 2120, 2122. Conversely, the second ends 2134a-2134d of the bands 2128a-2128d are connected to each other at the free end 2124, 2126 of each strap 2116, 2118. Adjacent ones of the bands 2128a-2128d of each strap 2116, 2118 define slots 2130a-2130c that extend continuously from the first ends 2132a-2132d to the second ends 2134a-2134d.

As shown, the free ends 2124, 2126 of the straps 2116, 2118 may include a header 2136 attaching the second ends 2134a-2134d of the bands 2128a-2128d together. In the illustrated example, the header 2136 and the bands 2128a-2128d are integrally formed of the same piece of material. However, in other examples, the header 2136 may be a separate component to which the second ends 2134a-2134d are attached. In some instances, the header 2136 may be formed of a different material than the bands 2128. For example, the header 2136 may be formed of a rigid material, such as a plastic, a composite, or a metal. As described in greater detail below, the header 2136 serves as a connection interface between the plurality of bands 2128a-2128d of each strap 2116, 2118 and a respective one the tensioning strands 2316, 2318 of the tensioning element 2312.

In the illustrated example, each of the straps 116, 118 includes four of the bands 2128a-2128d extending in parallel. For the sake of clarity, the bands 2128a-2128d of each strap 2116, 2118 will be described as a first band 2128a closest to the anterior end 3012, a second band 2128b, a third band 2128c, and a fourth band 2128d arranged in series from the first band 2128a. However, more or less of the bands 2128a-2128d may be included on each of the straps 2116, 2118. For instance, each of the straps 2116, 2118 could include two of the bands 2128a, 2128b.

As set forth above, the straps 2116, 2118 may be described as being a first strap 2116 extending from the lateral side 3016 and a second strap 2118 extending from the medial side 3018. Generally, when the article of footwear 3010 is assembled, at least one of the bands 2128a-2128d of the first strap 2116 includes a first portion that overlaps at least one of the bands 128a-2128d of the second strap 2118 and a second portion that is overlapped by at least one of the other bands 2128a-2128d of the second strap 2118. Likewise, at least one of the bands 2128a-2128d of the second strap 2118 includes a first portion that overlaps at least one of the bands 2128a-2128d of the first strap 2116 and a second portion that is overlapped by at least one of the other bands 2128a-2128d of the first strap 2116. Accordingly, the bands 2128a-2128d of the straps 2116, 2118 are configured in a weaved configuration.

In the illustrated example, each of the bands 2128a-2128d of the first strap 2116 is routed beneath one or more of the bands 2128a-2128d of the second strap 2118. Generally, each of the bands 2128a-2128d of the first strap 2116 is routed beneath the bands 2128a-2128d of the second strap that correspond with and precede the respective band 2128a-2128d of the first strap 2128a-2128d. For example, the first band 2128a of the first strap 2116 is routed beneath the first band 2128a of the second strap 2118 and above the subsequent bands 2128b-2128d of the second strap 2118. The second band 2128b of the first strap 2116 is routed beneath the first and second bands 2128a, 2128b and above the subsequent bands 2128c, 2128d of the second strap 2118. The third band 2128c of the first strap 2116c is routed beneath the first three bands 2128a-2128c and above the fourth band 2128d. The fourth band 2128d of the first strap 2116 is routed beneath all four of the bands 2128a-2128d of the second strap 2118.

Alternatively, the routing of the bands 2128a-2128d of each strap 2116, 2118 may be described with respect to the slots 2130a-2130c of the other strap 2116, 2118. For example, the first band 2128a of the first strap 2116 is routed through the first slot 2130a of the second strap 2118, while the second band 2128b is routed through the second slot 2130b and the third band 2128c is routed through the third slot 2130c. While the illustrated example shows the first strap 2116 on the lateral side 3016 and the second strap 2118 on the medial side 3018, the arrangement of the straps 2116, 2118 could be swapped such that the first strap 2116 is on the medial side 3018 and the second strap 2118 is on the lateral side 3016. Additionally, while the straps 2116, 2118 are described and shown as being interwoven, the straps 2116, 2118 could alternatively be layered such that one of the straps 2116, 2118 extends completely over the other strap 2116, 2118.

Referring to FIGS. 13-15, the tensioning system 2300 includes the cable 2302 and a plurality of cable routing elements 2304, 2306, 2308 configured to route the cable 2302 through the sole structure 2200 and along the upper 2100. Here, the tensioning system 2300 includes one or more cable guides 2304 or loops 2306 attached to the upper 2100 for routing the cable 2302 and distributing a tension of the cable 2302 along the upper 2100. A heel strap 2308 extends around the heel counter 2112 and includes one or more of the cable guides 2304 or loops 2306.

The cable 2302 may be highly lubricous and/or may be formed from one or more fibers having a low modulus of elasticity and a high tensile strength. For instance, the fibers may include high modulus polyethylene fibers having a high strength-to-weight ratio and a low elasticity. Additionally or alternatively, the cable 2302 may be formed from a molded monofilament polymer and/or a woven steel with or without other lubrication coating. In some examples, the cable 2302 includes multiple strands of material woven together.

With reference to FIGS. 13-16, the cable 2302 includes a tensioning element 2312 that cooperates with the cable routing elements 2304, 2306, 2308 and the tensioning device 2400 to move the article of footwear 3010 between the tightened state and the relaxed state. The tensioning element 2312 is movable in a tightening direction $D_T$ to move the article of footwear 3010 into the tightened state, and in a loosening direction $D_L$ to allow the article of footwear 3010 to transition to a relaxed state. In the illustrated example, the tightening force $F_T$ may be applied to the tensioning element 2312 by a tensioning device 2400 disposed in the sole structure.

As best shown in FIGS. 13-16, the tensioning element 2312 may be described as including a lateral tensioning strand 2316 and a medial tensioning strand 2318. With reference to FIG. 14, the lateral tensioning strand 316 of the tensioning element 2312 extends from a first end 2324 at the tensioning device 2400 and is routed along the lateral side 3016 of the upper 2100, through the heel strap 2308, and to a second end 2326 attached to the free end 2124 of the second strap 2118. Referring to FIG. 15, the medial tensioning strand 2318 of the tensioning element 2312 extends from a first end 2328 at the tensioning device 2400 and is routed along the medial side 3018 of the upper 2100, through the heel strap 2308, and to a second end 2330 attached to the free end 2126 of the second strap 2118.

In some examples, the tensioning system 2300 may include one or more cable guides 2304. The cable guides 2304 may be formed of a rigid, low-friction material (e.g., high density polyethylene, etc.) and have an arcuate inner surface for receiving the tensioning element 2312. In some examples, the inner (i.e., cable contacting) surfaces of the cable guides 2304 are lined or coated with a low friction material, such as a lubricous polymer (e.g., polytetrafluoroethylene, etc.), that facilitates movement of the tensioning element 2312 therein. By coating the cable guides 2304 with a low friction material, the number of turns taken by each lacing pattern can be increased without incurring a detrimentally high (e.g., function impairing) level of friction throughout the cable path.

In addition, or as an alternative to the rigid cable guides 2304, the tensioning system may include fabric loops 2306 attached to various points of the upper 2100 for routing the tensioning element along the exterior of the upper 2100. The loops 2306 can be formed of a mesh or fabric material, and define a passage for slidably receiving the tensioning element 2312 therethrough. In the illustrated example, the tensioning system 2300 includes one of the loops 2306 disposed on each of the lateral and medial side panels 2110.

The tensioning system 2300 further includes the heel strap 2308 extending around the heel counter 2112 of the upper 2100. As shown, the heel strap 2308 includes a central portion 2342 attached to the upper 2100 at the posterior end 3014, and a pair of ends 2344 extending in opposite directions from the central portion 2342 and around the heel counter 2112. Accordingly, a first one of the ends 2344 is disposed at the lateral side 3016 of the heel counter 2112 and a second one of the ends 2344 is disposed at the medial side 18 of the heel counter 2112. Each end 2344 of the heel strap 2308 includes one of the cable guides 2304 for routing one of the tensioning strands 2316, 2318 of the tensioning element 2312 therethrough.

Referring now to FIGS. 14 and 15, the routing of the tensioning element 2312 along each of the lateral and medial sides 3016, 3018 is shown. Generally, each of the lateral and medial tensioning strands 2316, 2318 of the tensioning element 2312 is routed from the tensioning device 2400 in the sole structure 2200 and along one of the lateral or medial sides 3016, 3018 to one of the headers 2136 of a respective one of the straps 2116, 2118. In some instances, the lateral and medial tensioning strands 2316, 2318 may be connected to each other within the tensioning device 2400.

As shown in FIG. 14, on the lateral side 3016 of the article of footwear 3010, the lateral tensioning strand 2316 includes a first end 2324 received by the tensioning device 2400 and a second end 2326 attached to the free end 2126 of the second strap 2118. Here, the lateral tensioning strand 2316 is routed through the sole structure 2200 from the tensioning device 2400 to a portion of the bite line 3028 in the heel region 3024 on the lateral side 3016. A first segment of the lateral tensioning strand 2316 extends along the lateral side panel 2110 from the bite line 3028 to the cable guide 2304 attached to the lateral end 2344 of the heel strap 2308. Here, the lateral tensioning strand 2316 is routed through the cable guide 2304 such that a second segment of the lateral tensioning strand 2316 returns along the lateral side panel 2110 and attaches to the free end 2126 of the second strap 2118. Accordingly, the lateral tensioning strand 2316 is configured to control a tension of the second strap 2118 across the upper 2100.

As shown in FIG. 15, on the medial side 3018 of the article of footwear 3010, the medial tensioning strand 2318 includes a first end 2328 received by the tensioning device 2400 and a second end 2330 attached to the free end 2124 of the first strap 2116. Here, the medial tensioning strand 2318 is routed through the sole structure 2200 from the tensioning device 2400 to a portion of the bite line 3028 in the heel region 224 on the medial side 3018. A first segment of the medial tensioning strand 2318 extends along the medial side panel 2110 from the bite line 3028 to the cable guide 2304 attached to the medial end 2344 of the heel strap 2308. Here, the medial tensioning strand 2318 is routed through the cable guide 2304 such that a second segment of the medial tensioning strand 2318 returns along the medial side panel 2110 and attaches to the free end 2124 of the first strap 2116. Accordingly, the medial tensioning strand 2318 is configured to control a tension of the first strap 2116 across the upper 2100.

In the illustrated example, the tensioning device 2400 may be a motorized lacing system, whereby the tensioning element 2312 is moved in the loosening direction $D_L$ and the tightening direction $D_T$ by extending and retracting the tensioning element 2312 from the tensioning device 2400. Accordingly, the tensioning device 2400 may include a motorized spool for simultaneously winding and unwinding each of the lateral tensioning strand 2316 and the medial tensioning strand 2318. With reference to FIG. 13A, the article of footwear 3010 is shown in a loosened state, where the straps 2116, 2118 are in a slacked state over the upper 100 to allow the upper 2100 to stretch around the foot of the wearer.

Referring to FIG. 13B, the article of footwear 3010 is moved to a tightened state by retracting the tensioning element 2312 into the tensioning device 2400, thereby causing the tensioning strands 2316, 2318 to move in the tightening direction $D_T$. As each tensioning strand 2316, 2318 moves in the tightening direction, the tightening force $F_T$ in each tensioning strand 2316, 318 causes the free end 2126, 2124 of a respective one of the straps 2118, 2116 to be pulled towards the bite line 3028, thereby moving the upper 2100 to a constricted or tightened state. As the straps 2116, 2118 are drawn over the throat 2108 and towards the bite line 3028, the respective bands 2128a-2128d of each strap 2116, 2118 pass through the corresponding slots 2130a-

2130c formed through the other one of the straps 2116, 2118, as discussed above. This interweaved relationship between the bands 2128a-2128d of the straps 2116, 2118 provides an enhanced frictional interface between the straps 2116, 2118, which maintains the straps in the tightened position during use.

To move the upper 2100 and the article of footwear 3010 back to the loosened or relaxed state, the tensioning device 2400 operates in an opposite direction to unwind or extend the tensioning strands 2316, 2318 from the tensioning device 2400. Thus, the tensioning strands 2316, 2318 are allowed to move in the loosening direction $D_L$ along the upper 2100 such that the free ends 2124, 2126 of the straps 2116, 2118 can move away from the bite line 3028 and the throat 2108 can expand.

With particular reference to FIGS. 17A-17B, an article of footwear 3010a is provided and includes the upper 2100, the sole structure 2200, and a tensioning system 2300a configured to work with an unpowered or manual tensioning device 2400a, 2400b. In view of the substantial similarity in structure and function of the components associated with the article of footwear 3010 with respect to the article of footwear 3010a, like reference numerals are used hereinafter and in the drawings to identify like components while like reference numerals containing letter extensions are used to identify those components that have been modified.

Referring to FIGS. 17A-17B, the tensioning system 2300a includes a cable 2302a and a plurality of cable routing elements 2304, 2306, 2308, 2310 configured to route the cable 2302a through the sole structure 2200 and along the upper 2100. In addition to the cable guides 2304, loops 2306, and heel strap 2308 discussed above with respect to the tensioning system 2300, the tensioning system 2300a may include one or more sheaths 2310 for managing slack in the cable 2302a. As discussed below, the sheath 2310 maintains the cable 2302a in a retracted state against the upper 2100 when the upper 2100 is in the tightened state (FIG. 17B).

With reference to FIGS. 17A-17B, the cable 2302a includes the tensioning element 2312 and a control element 2314 that cooperate with the cable routing elements 2304, 2306, 2308, 2310 and the tensioning device 2400a, 2400b to move the article of footwear 3010a between the tightened state and the relaxed state. Here, the tensioning element 2312 and the control element 2314 may be collectively referred to as adjustment elements 2312, 2314. The adjustment elements 2312, 2314 are movable in a tightening direction $D_T$ to move the article of footwear 3010a into the tightened state, and in a loosening direction $D_L$ to allow the article of footwear 3010a to transition to a relaxed state. In some examples, a tightening force $F_T$ applied to the control element 2314 is transmitted to at least a portion of the tensioning element 2312 through the tensioning device 2400a, 2400b to move the tensioning element 2312 in the tightening direction $D_T$.

Figure 18:
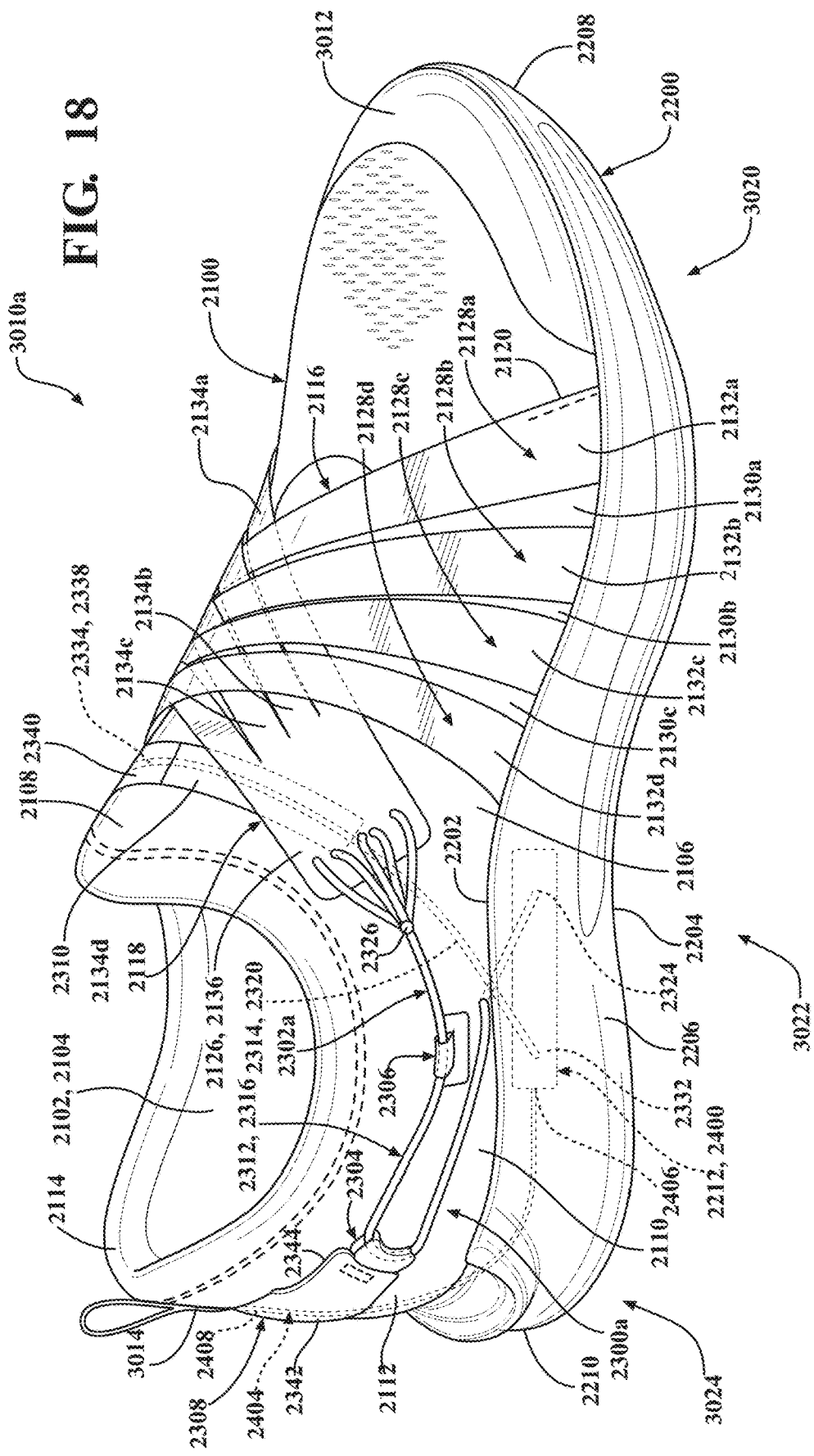
FIG. 18 is a lateral-side perspective view of the article of footwear of FIG. 17A.
Figure 19:
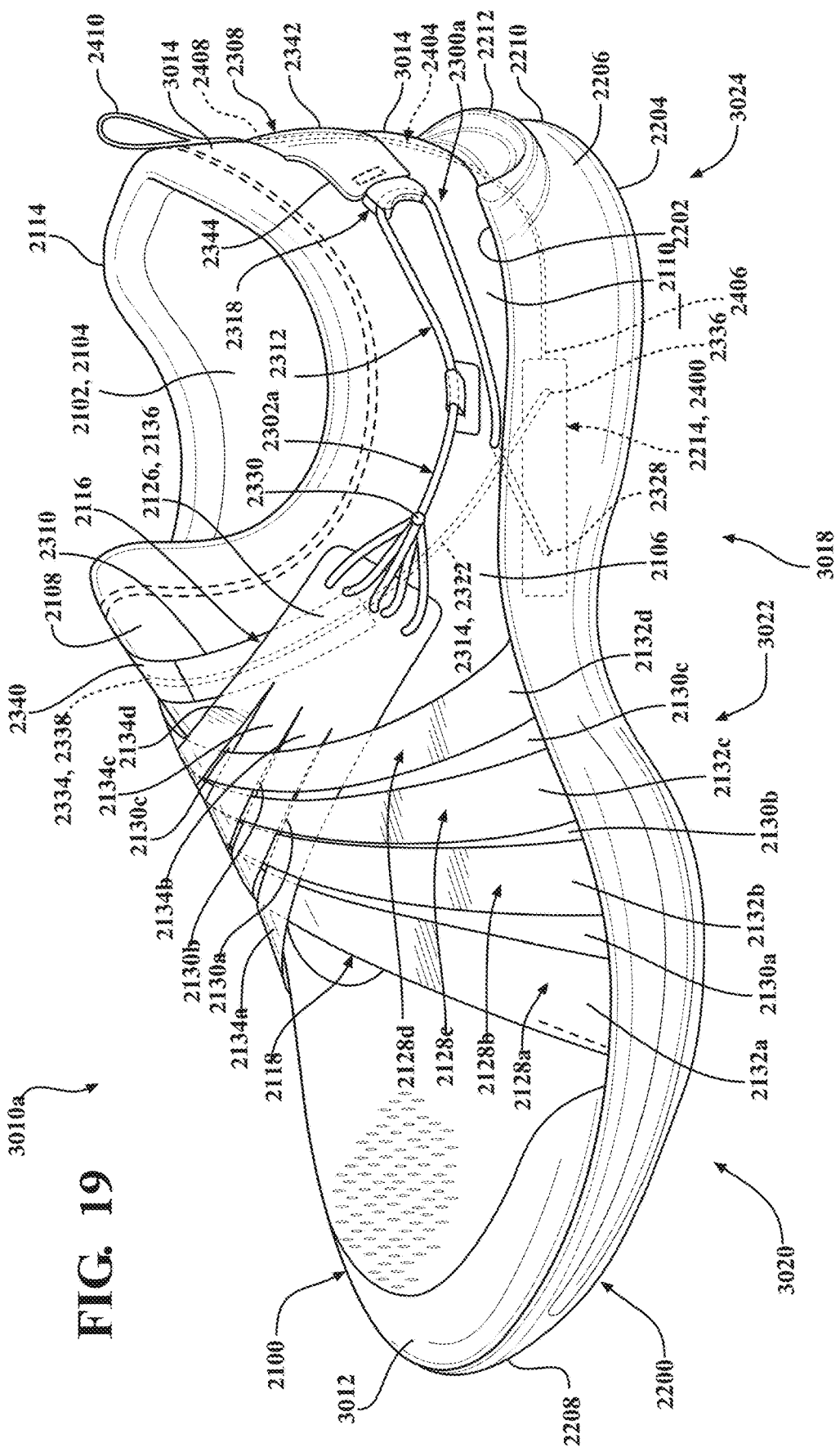
FIG. 19 is a medial-side perspective view of the article of footwear of FIG. 17A.
Figure 20:
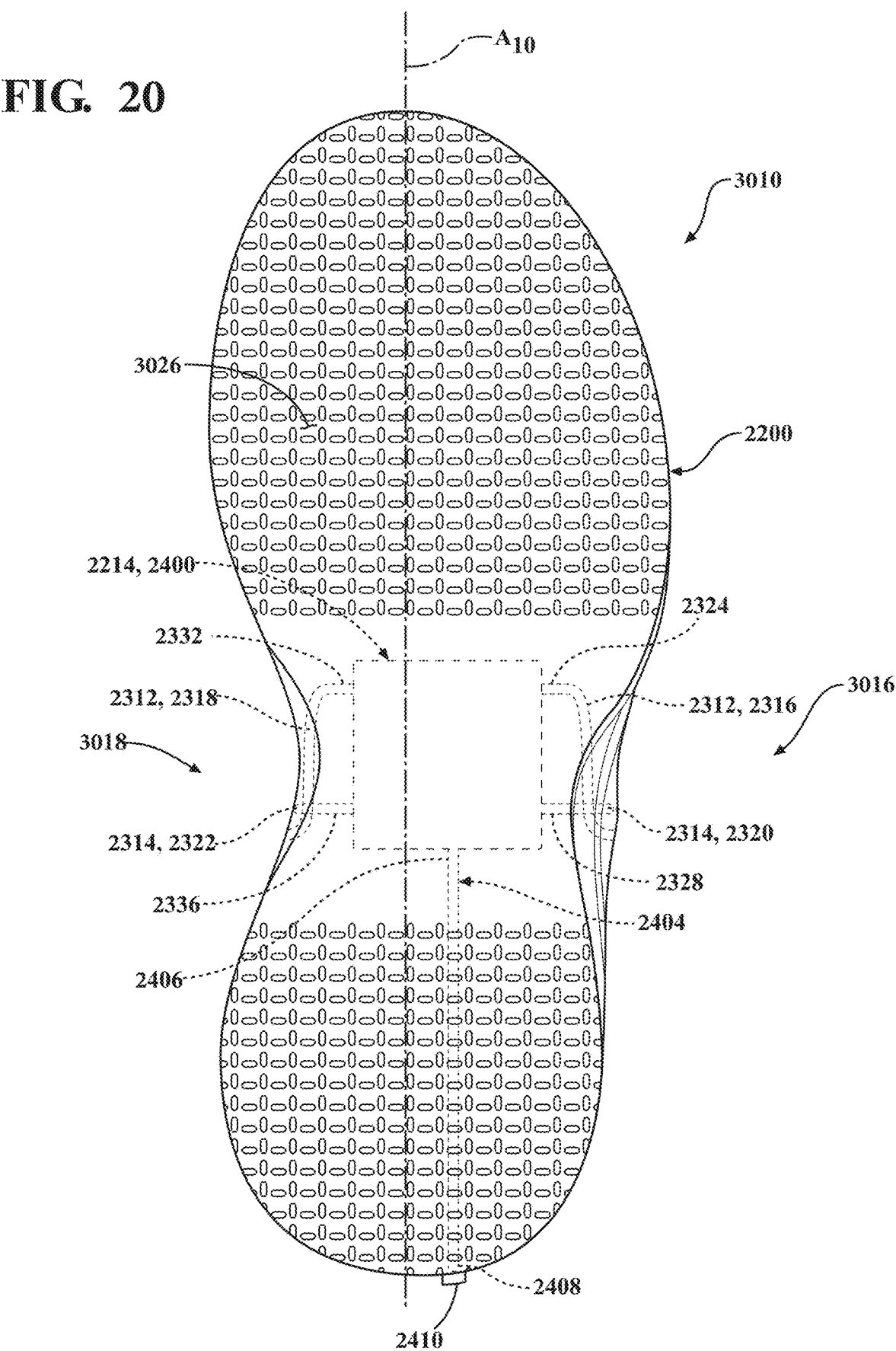
FIG. 20 is a bottom plan view of the article of footwear of FIG. 17A.

As best shown in FIGS. 18 and 19, the tensioning element 2312 and the control element 2314 may be described as including lateral strands 2316, 2320 and medial tensioning strands 2318, 2322. Thus, in addition to the lateral and medial tensioning strands 2316, 2318 of the tensioning element 2312, described above, the control element 2314 also includes a lateral control strand 2320 and a medial control strand 2322. In the illustrated example, the lateral tensioning strand 2316 of the tensioning element 2312 is connected to the lateral control strand 2320 of the control element 2314 through the tensioning device 2400a, 2400b, as shown in FIG. 20. Similarly, the medial tensioning strand 2318 of the tensioning element 2312 is connected to the medial control strand 2322 of the control element 2314 through the tensioning device 2400a, 2400b, as shown in FIG. 20. Accordingly, positions of the lateral and medial tensioning strands 2316, 2318 of the tensioning element 2312 may be adjusted by moving a respective one of the lateral and medial control strands 2320, 2322 of the control element 2314.

As described above and shown in FIG. 18, the lateral control strand 2320 of the control element 2314 is connected to the lateral tensioning strand 2316 of the tensioning element 2312 through the tensioning device 2400a, 2400b, and extends from a first end 2332 at the tensioning device 2400a, 2400b to a second end 2334 along the upper 2100. Likewise, as shown in FIG. 19, the medial control strand 2322 of the control element 2314 is connected to the medial tensioning strand 2318 of the tensioning element 2312 through the tensioning device 2400a, 2400b, and extends from a first end 2336 at the tensioning device 2400a, 2400b to a second end 2338 along the upper 2100. Referring to FIGS. 17A and 17B, the second end 2334 of the lateral control strand 2320 may be connected to the second end 2338 of the medial control strand 2322, such that the lateral control strand 2320 and the medial control strand 2322 form a continuous strand extending over the throat 2108 of the upper 2100. In other examples, the second ends 2334, 2338 of the lateral control strand 2320 and the medial control strand 2322 may be indirectly connected to each other by an intermediate connecting element (not shown).

A portion of the control element 2314 that extends around the upper 2100 may be enclosed within one or more of the sheaths 2310. Each sheath 2310 may be formed from a material and/or a weave that allows the sheath 310 and the control element 2314 to move from a relaxed state to a stretched or expanded state when the control element 2314 is moved in a direction away from the upper 2100 by way of the tightening force $F_T$ (i.e., when the control element 2314 is moved in the tightening direction $D_T$). When the tightening force $F_T$ is removed, the material and/or weave of the sheath 2310 automatically causes the sheath 2310 to contract to the relaxed state and accommodate bunching of the control element 2314 therein, as shown in FIG. 17B. As shown, the control element 2314 is routed through the sheath 2310 and over the throat 2108 of the upper 2100, adjacent to an anterior side of the ankle opening 2104. Accordingly, the control element 2314 extends across the upper 2100 in front of the ankle of the wearer.

With continued reference to FIG. 18, the sheath 2310 and the lateral control strand 2320 of the control element 2314 are routed up through the lateral quarter panel 2106 and exit the lateral quarter panel 2106 to extend over an exterior of the upper 2100 across the throat 108. Similarly, the medial control strand 2322 of the control element 2314 and the sheath 2310 are routed in a similar manner from the medial quarter panel 2106 to the throat 2108 of the upper 2100, whereby the second ends 2334, 2338 of the lateral control strand 2320 and the medial control strand 2322 are attached to each other, directly or indirectly, to form a continuous control element 2314 extending over the throat 2108 of the upper 2100.

In the example shown, a separate tightening grip 2340 may operatively connect to the sheath 2310 at an attachment location proximate to the throat 2108 to allow a user to apply the tightening force $F_T$ to pull the control element 2314 away from the upper 2100, thereby causing each of the control element 2314 and the tensioning element 2312 to move in the tightening direction $D_T$. Other configurations may include operatively connecting one or more tightening grips 2340 to other portions of the sheath 2310 along the length of the control element 2314. In some implementations, the tightening grip 2340 is omitted and the sheath 2310 is gripped directly by the user.

As discussed above with respect to the article of footwear 3010 and tensioning system 2300 of FIGS. 13A-16, the upper 2100 is moveable between a relaxed state and a tightened state by adjusting a position of the straps 2116, 2118 by applying or releasing a tightening force $F_T$ to the respective free ends 2124, 2126 of the straps 2116, 2118. In the example of FIGS. 17A-20, the upper 2100 is also moveable between the relaxed state and the tightened state by selectively applying and releasing the tightening force $F_T$ to the tensioning element 2312. However, unlike the previous example, where the tensioning force $F_T$ was applied by the tensioning device 2400, the example of FIGS. 17A-20 includes a manual tensioning system 2300a, where the tightening force $F_T$ can be applied to the tensioning element 2312 by the user.

As shown, the cable 2302a of the tensioning system 2300a can be moved in the tightening direction $D_T$ by applying a tightening force $F_T$ to the control element 2314. For instance, a user may apply the tightening force $F_T$ to the control element 2314 by pulling the tightening grip 2340 and the sheath 2310 away from the upper 2100, thereby moving the control element 2314 in the tightening direction $D_T$. Here, the tightening force $F_T$ is applied to each of the control strands 2320, 2322 and is transmitted to respective ones of the tensioning strands 2316, 2318 through the tensioning device 2400a, 2400b. The tightening force $F_T$ pulls the tensioning strands 2316, 2318 in the tightening direction to draw the free ends 2124, 2126 of the straps 2116, 2118 across the throat 2108 and towards the bite lines 3028.

As discussed above, the locking device or tensioning device 2400a, 2400b may be disposed within the cavity of the sole structure 2200, and may be biased to a locked state to restrict movement of the adjustment elements 2312, 2314 in their respective loosening directions $D_L$. The tensioning element 2312 and the control element 2314 each approach and pass through a housing 2402 of the tensioning device 2400a, 2400b from opposite directions. In some configurations, the tensioning device 2400a, 2400b permits movement of the adjustment elements 2312, 2314 in the tightening directions $D_T$ while in the locked state. The release mechanism 2404 may transition the tensioning device 2400a, 2400b from the locked state to an unlocked state to thereby permit the adjustment elements 2312, 2314 to move in both directions $D_T$, $D_F$.

The release mechanism 2404 is operable to transition the tensioning device 2400a from a locked state to an unlocked state to permit the adjustment elements 2312, 2314 to move in both directions $D_T$, $D_F$. For instance, the release mechanism 2404 may include a release cord or cable 2404 operable to transition the tensioning device 2400a, 2400b from the locked state to the unlocked state when the release cord 2404 is pulled. The release cord 2404 may extend from a first end 2406 attached to the tensioning device 2400a, 2400b to a distal end 2408 secured at the posterior end 3014 of the upper 2100, thereby permitting a user to grip and pull the release cord 2404 for moving the tensioning device 2400a, 2400b from the locked state to the unlocked state.

In some examples, the release cord 2404 includes a release grip 2410, such as a loop or sheath, located remotely from the tensioning device 2400a to allow a user to grip and pull the release cord 2404 when it is desirable to move the tensioning device 2400a, 2400b into the unlocked state and/or release the tensioning device 2400a, 2400b from the unlocked state. FIGS. 18 and 19 show the release grip 2410 formed at the posterior end of the ankle opening 2104, where the release cord 2404 extends from the sole structure 2200 and along the heel counter 2112.

Figure 21:
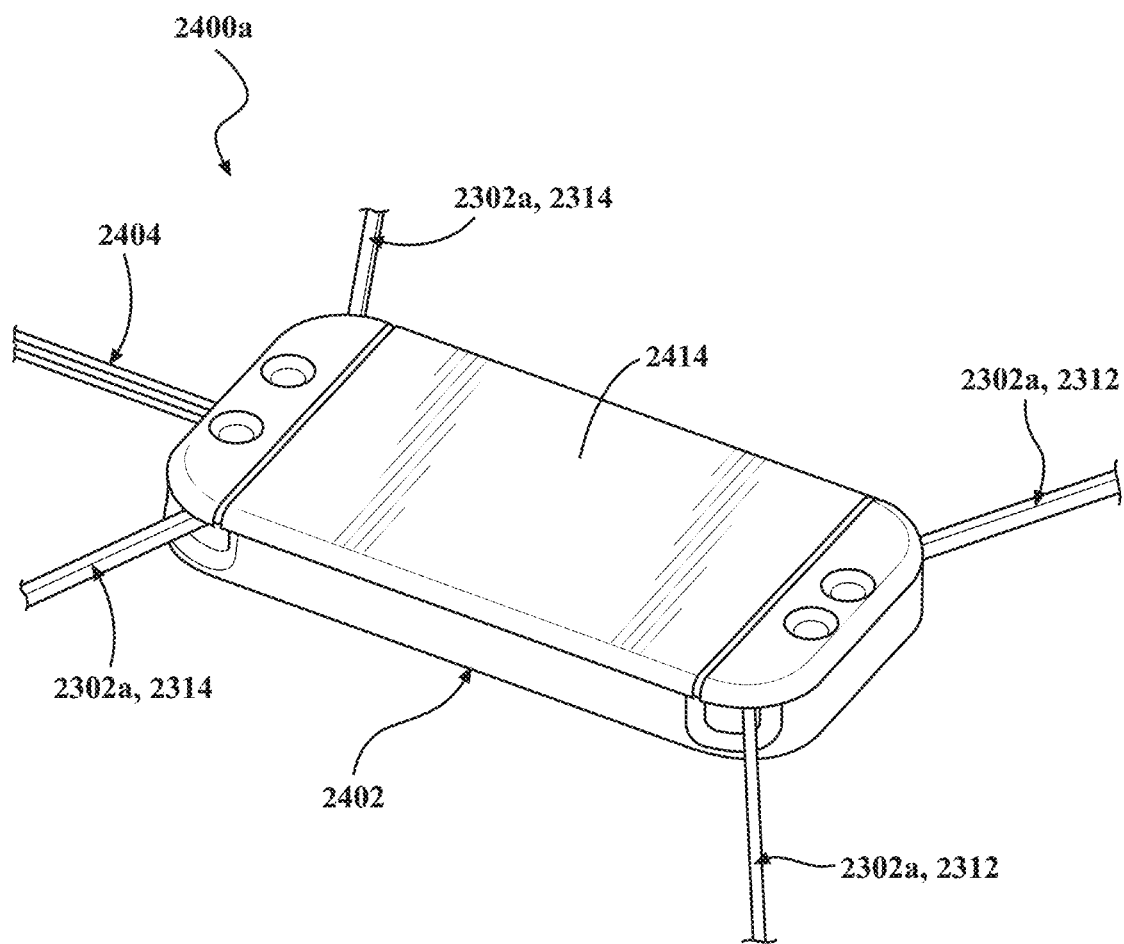
FIG. 21 is a perspective view of an example of a tensioning device according to the principles of the present disclosure.
Figure 22:
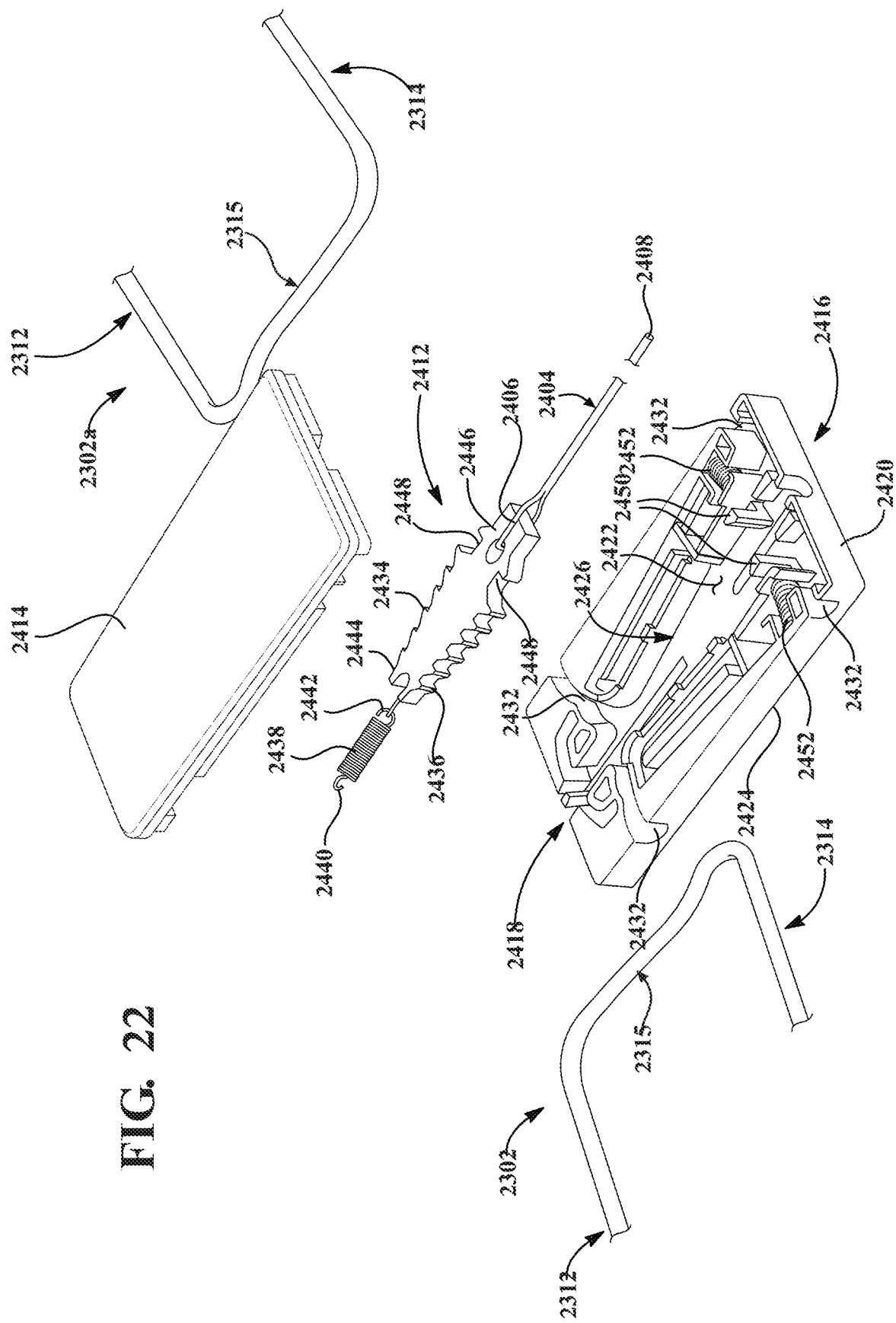
FIG. 22 is an exploded view of the tensioning device of FIG. 21.

Referring to FIGS. 21-24, in some implementations, the tensioning device 2400a includes the housing 2402a and a locking member or lock member 2412 slidably disposed within the housing 2402a and enclosed by a lid 2414 fastened to the housing 2402a. FIG. 22 provides an exploded view of the tensioning device 2400a of FIG. 21 showing the locking member 2412 and the lid 2414 removed from the housing 2402a. The housing 2402a defines a length extending between a first end 2416 and a second end 2418. The housing 2402a includes a base portion 2420 having a cable-receiving surface 2422 and a mounting surface 2424 disposed on an opposite side of the base portion 2420 than the cable-receiving surface 2422 and opposing the exterior surface of the upper 2100. The lid 2414 opposes the cable-receiving surface 2422 of the base portion 2420 to define a locking member cavity 2426 therebetween that is configured to receive the locking member 2412 and a portion of the tensioning system 2300a. In some configurations, the locking member cavity 2426 is bounded by a first engagement surface 2428 and a second engagement surface 2430 (FIGS. 23 and 24) that converge toward one another such that the locking member cavity 2426 is associated with a wedge-shaped configuration tapering toward the second end 2418 of the housing 2402a. Accordingly, the first engagement surface 2428 and the second engagement surface 2430 include corresponding sidewalls of the housing 2402a converging toward one another and extending between the lid 2414 and the cable-receiving surface 2422 of the base portion 2420 to define the locking member cavity 2426.

As discussed above, the cable 2302a of the tensioning system 2300a may include a tensioning element 2312 and a control element 2314, which are connected to each other by a locking element 2315 that extends through the locking member cavity 2426 and includes a first portion extending along the first engagement surface 2428 and a second portion extending along the second engagement surface 2430. The tensioning element 2312 exits out of corresponding slots 2432 (FIGS. 23 and 24) formed through opposing sidewalls of the housing 2402a proximate to the first end 2416. The control element 2314 exits out of corresponding slots 2432 (FIGS. 23 and 24) formed through the opposing sidewalls of the housing 2402a proximate to the second end 418.

In some implementations, the locking member 2412 includes a first lock surface 2434 opposing the first engagement surface 2428 of the housing 2402a and a second lock surface 2436 opposing the second engagement surface 2430 of the housing 2402a when the locking member 2412 is disposed within the locking member cavity 2426 of the housing 2402a. In some examples, the first lock surface 22434 and the second lock surface 2436 converge toward one another. Additionally or alternatively, the first lock surface 2434 may be substantially parallel to the first engagement surface 2428 and the second lock surface 2436 may be substantially parallel to the second engagement surface 2430. In the example shown, the lock surfaces 2434, 2436 include projections or teeth each having an angled surface to permit movement by tensioning system 2300a in the tightening direction $D_T$ (i.e., when the tightening force $F_T$ is applied to control element 2314) while restricting movement by the tensioning system 2300a by gripping the locking element 2315 in the loosening direction $D_L$ when the locking member 2412 is in the locked state. A biasing member 2438 (e.g., a spring) may include a first end 2440 attached to the second end 2418 of the housing 2402a and a second end 2442 attached to a first end 2444 of the locking member 2412 to attach the locking member 2412 to the housing 2402a.

In some implementations, the locking member 2412 is slidably disposed within the housing 2402a and is movable between a locked position (FIG. 23) associated with the locked state of the tensioning device 2400a and an unlocked position (FIG. 24) associated with the unlocked state of the tensioning device 2400a. In some examples, the release mechanism 2404 (e.g., release cord 2404) moves the locking member 2412 from the locked position (FIG. 23) to the unlocked position (FIG. 24). The locking member 2412 may include a tab portion 2446 extending from an opposite end of the locking member 2412 than the first end 2444. In one configuration, the first end 2406 of the release cord 2404 attaches to the tab portion 2446 of the locking member 2412. The tab portion 2446 may include a pair of retention features or recesses 2448 formed in corresponding ones of the first lock surface 2434 and the second lock surface 2436 and selectively receiving one or more retention features 2450 associated with the housing 2402a to maintain the tensioning device 2400a in the unlocked state. The retention features 2450 associated with the housing 2402a may include a first retention feature 2450 and a second retention feature 2450 disposed on opposite sides of the housing 2402a, whereby the retention features 2450 are biased inward toward the cavity 2426 and one another by corresponding biasing members 2452. The retention features 2450 may be projections that are integrally formed with the housing 2402a such that the retention features 2450 act as living hinges movable between a retracted state (FIG. 23) and an extended state (FIG. 24).

Figure 23:
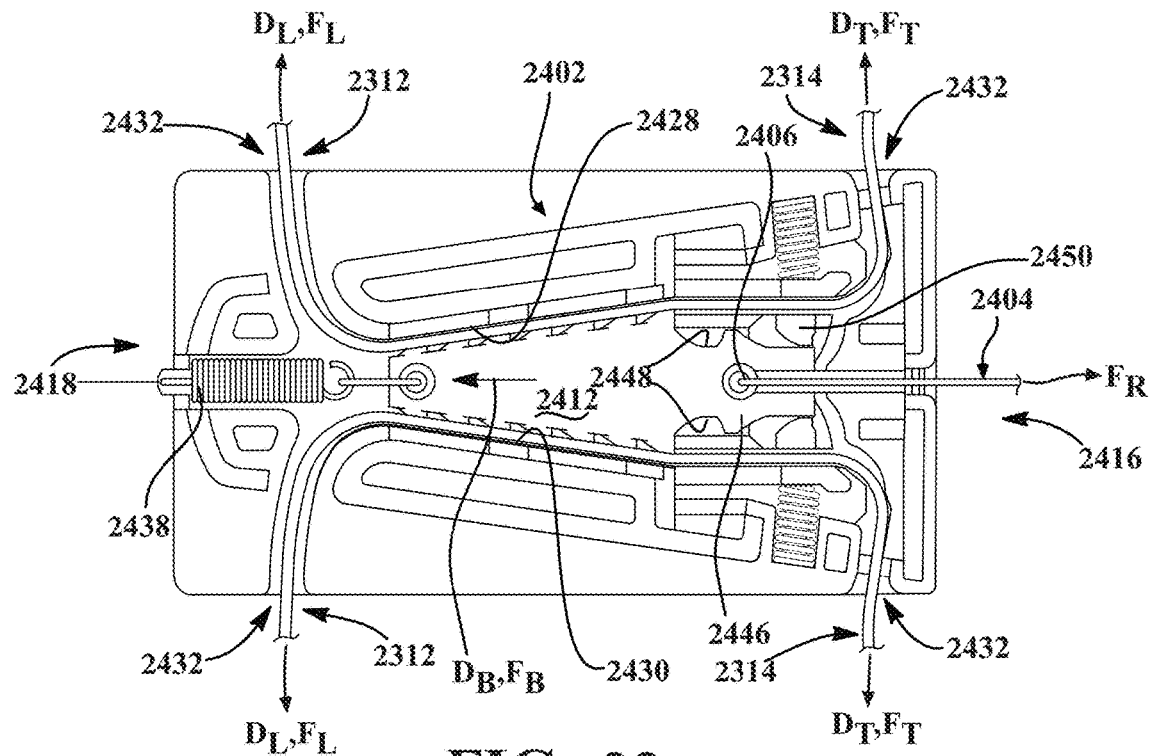
FIG. 23 is a top view of the tensioning device of FIG. 21, showing a housing having a lid removed to expose a locking member slidably disposed within the housing when the locking member is in a locked position.
Figure 24:
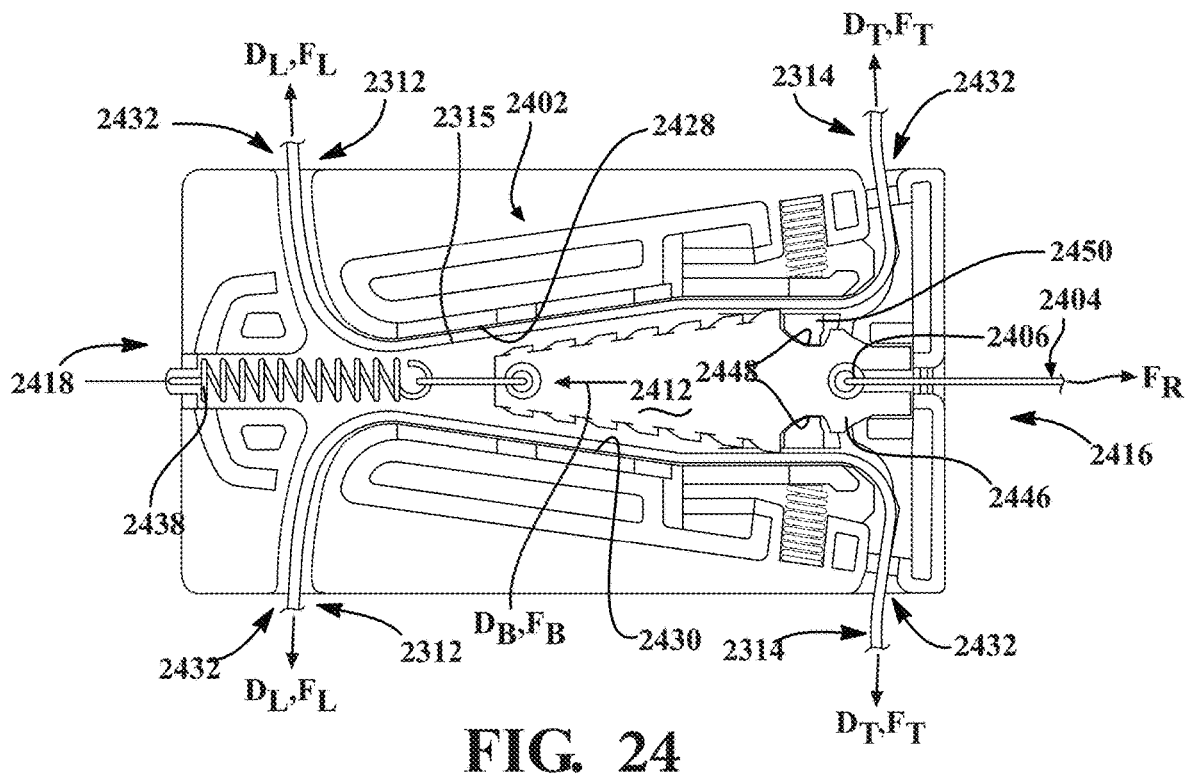
FIG. 24 is a top view of the locking device of FIG. 21, showing a housing having a lid removed to expose a locking member slidably disposed within the housing when the locking member is in an unlocked position.

FIG. 23 provides a top view of the tensioning device 2400a of FIG. 21 with the lid 2414 removed to show the locking member 2412 disposed within the cavity 2426 of the housing 2402a while in the locked position. In some examples, the locking member 2412 is biased into the locked position. For instance, FIG. 23 shows the biasing member 2438 exerting a biasing force $F_B$ (represented in a direction $D_B$) upon the locking member 2412 to urge the first end 2444 of the locking member 2412 toward the second end 2418 of the housing 2402a, and thereby bias the locking member 2412 into the locked position. While in the locked position, the locking member 2412 restricts movement of the tensioning system 2300a relative to the housing 2402a by pinching the locking element 2315 of the tensioning system 2300a between the lock surfaces 2434, 2436 and the engagement surfaces 2428, 2430. Accordingly, the locked position of the locking member 2412 restricts the tensioning system 2300a from moving in the loosening direction $D_L$. In the example shown, the locking member 2412 permits movement of the tensioning system 2300a when the tightening force $F_T$ is applied to the tightening grip 2340, as this direction causes the tensioning system 2300a to apply a force on the locking member 2412 due to the generally wedge shape of the locking member 2412, thereby moving the locking member 2412 into the unlocked state. The locking member 2412 automatically returns to the locked state once the force applied to the tightening grip 2340 is released due to the forces imparted on the locking member 2412 by the biasing member 2438.

FIG. 24 provides a top view of the tensioning device 2400a of FIG. 21 with the lid 414 removed to show the locking member 2412 disposed within the cavity 2426 of the housing 2402a while in the unlocked position. In some examples, the release cord 2404 attached to the tab portion 2446 of the locking member 2412 applies a release force $F_R$ upon the locking member 2412 to move the locking member 2412 away from the first engagement surface 2428 and the second engagement surface 2430 relative to the housing 2402a. Here, the release force $F_R$ is sufficient to overcome the biasing force $F_B$ of the biasing member 2438 to permit the locking member 2412 to move relative to the housing 2402a such that the pinching upon the locking element 2315 of the tensioning system 2300a between the lock surfaces 2434, 2436 and the engagement surfaces 2428, 2430 is released. In some examples, the biasing force $F_B$ causes the locking member 2412 to transition back to the locked position when the release force $F_R$ applied by the release cord 2404 is released. The release cord 2404 may apply the release force $F_R$ when a release force $F_R$ of sufficient or predetermined magnitude is applied to pull the release cord 2404 away from the upper 2100 relative to the view of FIG. 24.

While in the unlocked position, the locking member 2412 permits movement of the tensioning system 2300a relative to the housing 2402a by allowing the locking element 2315 of the tensioning system 2300a to freely move between the lock surfaces 2434, 2436 and the engagement surfaces 2428, 2430. The unlocked position of the locking member 2412 permits movement of the tensioning system 2300a in both the tightening direction $D_T$ and the loosening direction $D_L$ when the forces $F_T$, $F_L$ are applied to respective ones of the control element 2314 and the tensioning element 2312.

In some examples, a sufficient magnitude and/or duration of the release force $F_R$ applied to the release cord 2404 causes the release cord 2404 to apply the release force $F_R$ (FIG. 24) upon the locking member 2412 in a direction opposite the direction of the biasing force $F_B$ (FIG. 23) such that the locking member 2412 moves away from the engagement surfaces 2428, 2430 relative to the housing 2402a and toward the first end 2416 of the housing 2402a. At least one of the retention features 2450 of the housing 2402a may engage the retention feature 2448 of the locking member 2412 when release force $F_R$ moves the locking member 2412 a predetermined distance away from the first engagement surface 2428 and the second engagement surface 2430 of the housing 2402a. Here, engagement between the retention feature 2448 of the locking member 2412 and the at least one retention feature 2450 of the housing 2402a maintains the locking member 2412 in the unlocked position once the release force $F_R$ is released. The biasing force $F_B$ of the biasing member 2438 and the forces exerted by the pair of biasing members 2452 on the retention features 2450 lock the retention feature 2448 of the locking member 2412 into engagement with the retention features 2450 of the housing 2402a after the locking member 2412 moves the predetermined distance and the release force $F_R$ is no longer applied.

In some scenarios, a release force $F_R$ associated with a first magnitude may be applied to the release cord 2404 to move the locking member 2412 away from the engagement surfaces 2428, 2430 by a distance less than the predetermined distance such that the retention features 2448, 2450 do not engage. In these scenarios, the release force $F_R$ associated with the first magnitude can be maintained when it is desirable to move the tensioning system 2300a in the loosening direction $D_L$ or the tightening direction $D_T$ (e.g., by applying the tightening force $F_T$ to the tightening grip 2340) for adjusting the fit of the interior void 2102 around the foot. Once the desired fit of the interior void 2102 around the foot is achieved, the release force $F_R$ can be released to cause the locking member 2412 to transition back to the locked position so that movement of the tensioning system 2300a is restricted in the loosening direction $D_L$ and the desired fit can be sustained. It should be noted that even when the locking member 2412 is in the locked position, the tensioning system 2300a can be moved in the tightening direction $D_T$. As such, once the release force $F_R$ is released and a desired fit is achieved, the locking member 2412 automatically retains the desired fit by locking a position of the tensioning system 300a relative to the housing 2402a.

In other scenarios, a release force $F_R$ associated with a second magnitude greater than the first magnitude can be applied to the release cord 2404 to move the locking member 2412 the predetermined distance away from the engagement surfaces 2428, 2430 to cause the corresponding retention features 2448, 2450 to engage. Engagement of the retention features 2448, 2450 is facilitated by providing the retention features 2450 with a tapered edge that opposes the locking member 2412 to allow the locking member 2412 to more easily move the retention features 2450 against the biasing force $F_B$ imparted thereon by the biasing members 2452 when the release cord 2404 is pulled the predetermined distance. In these scenarios, engagement between the corresponding retention features 2448, 2450 maintains the locking member 2412 in the unlocked position when the release force $F_R$ is released.

The locking member 2412 is returned to the locked position when a tightening force $F_T$ is applied to the control element 2314. Namely, when a force is applied to the lateral and medial control strands 2320, 2322, these control strands 2320, 2322 are placed in tension which, in turn, exerts a force on the biasing members 2452 via the retention features 2450, as the control strands 2320, 2322 pass through a portion of the retention features 2450. In so doing, the retention features 2450 compress the biasing members 2452 and, as such, cause the retention features 2450 to move away from one another and disengage the retention features 2448 of the locking member 2412, thereby allowing the biasing member 2438 to return the locking member 2412 to the locked position.

In use, the article of footwear 3010 can be selectively moved between a relaxed state (FIG. 17A) and a tightened state (FIG. 17B) using the tensioning system 2300a. With the footwear 3010 initially provided in a relaxed state, an effective length of the tensioning strands 2316, 2318 of the tensioning element 2312 (i.e., the lengths from the first ends 2324, 2328 to the second ends 2326, 2330) will be maximized, such that the tensioning element 2312 and the straps 2116, 2118 are in a relaxed state about the upper 2100, while an effective length of the control strands 2320, 2322 of the control element 2314 (i.e., the lengths from the first ends 2332, 2336 to the second ends 2334, 2338) is minimized. Accordingly, a foot of a user can be inserted into the interior void 2102 of the footwear 3010 with the materials of the upper 2100 allowing the upper 2100 to stretch to accommodate the foot therein.

With the foot of the user inserted within the interior void 2102 of the upper 2100, the tensioning system 2300a can be moved to a tightened state by the user to secure the footwear 3010 to the foot. As discussed above, the tensioning system 2300a is moved to the tightened state by applying a tightening force $F_T$ to the tightening grip 2340 of the control element 2314, thereby causing the control element 2314 to move in the tightening direction $D_T$. As the control element 2314 moves in the tightening direction $D_T$, the cable 2302a is pulled through the housing 2402a of the tensioning device thereby causing the effective lengths of the tensioning strands 2316, 2318 of the tensioning element 2312 to be reduced. Accordingly, an effective length of the tensioning element 2312 is minimized around the upper 2100 to move the upper 2100 to a tightened state around the foot.

As discussed above, when the tensioning element 2312 is moved in the tightening direction $D_T$, the lateral and medial tensioning strands 2316, 2318 distribute the tightening force $F_T$ to the free ends 2124, 2126 of the straps 2116, 2118 to draw the straps 2116, 2118 tight over the throat 2108. The lateral and medial tensioning strands 2316, 2318 of the tensioning element 2312 distribute the tightening force $F_T$ to the ends 2344 of the heel strap 2308 to constrict the heel counter 2112 around the rear of the ankle of the user. Simultaneously, the effective length of the control element 2314 may be increased when the tensioning system 2300a is moved to the tightened state. However, as shown in FIG. 17B, the control element 2314 is maintained in a taut position against the upper 2100 by the elasticity of the sheath 2310, which accommodates the increased effective length of the control element 2314 by allowing the control element 2314 to "bunch" within the sheath 2306 when the sheath 2310 is contracted.

When a user desires to remove the article of footwear 3010 from the foot, the tensioning system 2300a may be moved to the loosened state to allow the upper 2100 to be relaxed around the foot. Initially, the tensioning device 2400a must be moved to the unlocked state by applying a sufficient release force $F_R$ to overcome the biasing force $F_B$ of the biasing member 2438, as discussed above. Once the tensioning device 2400a is moved to the unlocked state, the cable 2302a can be pulled in the loosening direction $D_L$ through the housing 2402a of the tensioning device by pulling the article of footwear 3010 from the foot of the user, which inherently causes the upper to expand and increases the effective lengths of the tensioning strands 2316, 2318 of the tensioning element 2312.

Figure 25:
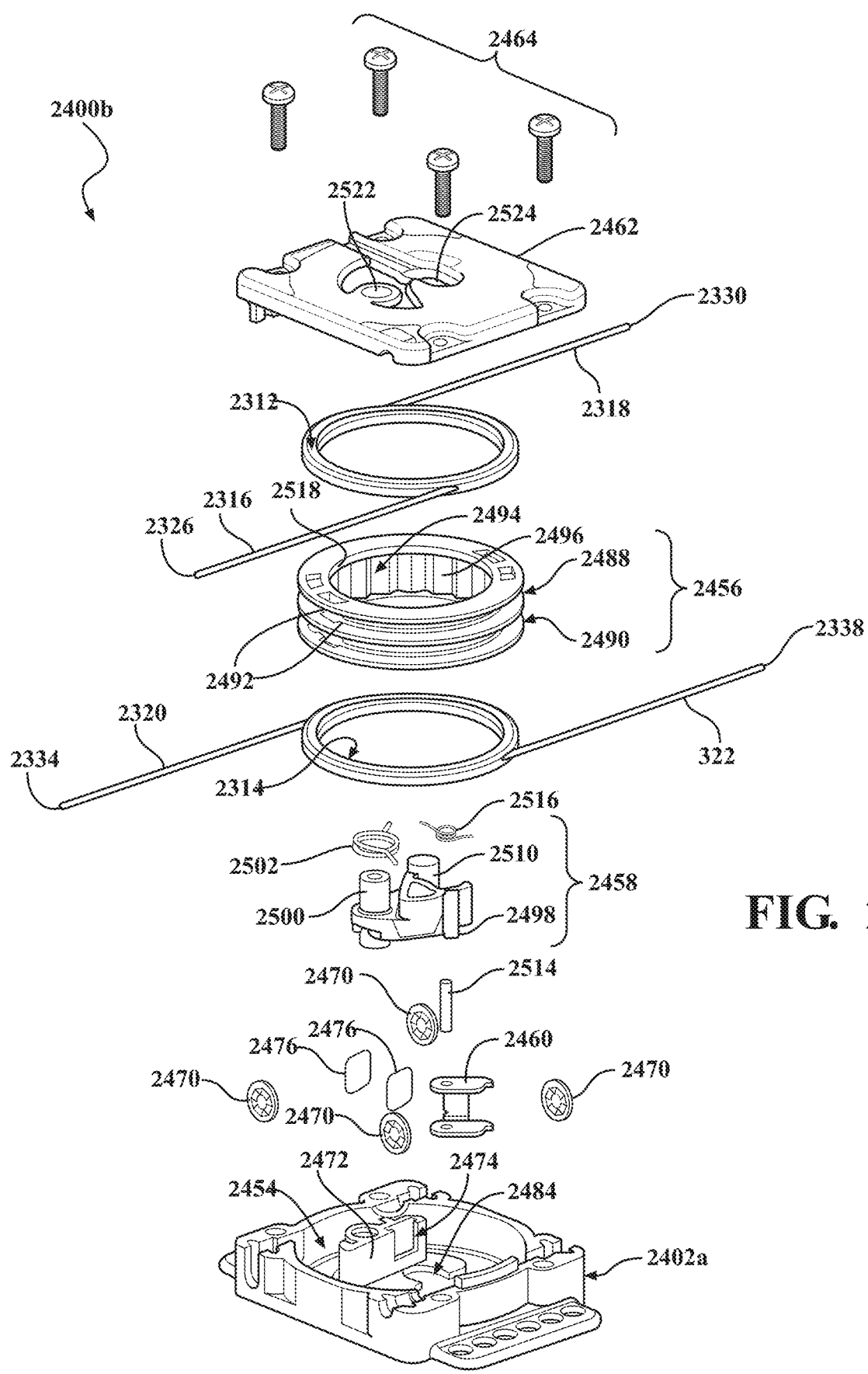
FIG. 25 is an exploded view of a tensioning device in accordance with the principles of the present disclosure.

With reference to FIGS. 25-29, another example of a manual tensioning device 2400b is shown, where the tensioning device 2400b is embodied as a rotary mechanism. FIG. 25 provides an exploded view of the tensioning device 2400b, showing a housing 2402b defining a cavity 2454 configured to rotatably receive a spool 2456, a first pawl 2458, and a second pawl 2460. The tensioning device 2400b may include a lid 2462 fastened to the housing 2402b to prevent access to the cavity 2454 when the lid 2462 is fastened to the housing 2402b and to allow access to the cavity 2454 when the lid 2462 is removed from the housing 2402b. One or more fasteners 2464 may extend through the lid 2462 and fasten with threaded holes 2466 in the housing 402b to secure the lid 2462 to the housing 2402b.

The housing 2402b defines a plurality of retainer slots 2468 each configured to receive and support a respective cable retainer 2470 through which the cable adjustment elements are routed into the cavity 2454 of the housing 2402b. The housing 2402b may support a plurality of the cable retainers 2470 such that the ends of the adjustment elements 2312, 2314 each extend through a respective one of the cable retainers 2470.

As described in greater detail below, the housing 2402b may further include a retaining wall 2472 disposed within the cavity 2454. The retaining wall 2472 is configured to cooperate with the first pawl 2458. The retaining wall 2472 may further include a tactile slot 2474 configured to receive one or more tactile domes 2476. Described in greater detail below with reference to FIGS. 26-29, the first pawl 2458 may engage the tactile dome(s) 2476 to provide a click or other sound that indicates the spool 2456 has changed positions relative to the housing 2402b and/or the tensioning device 2400b has transitioned from the locked state to the unlocked state.

Figure 27:
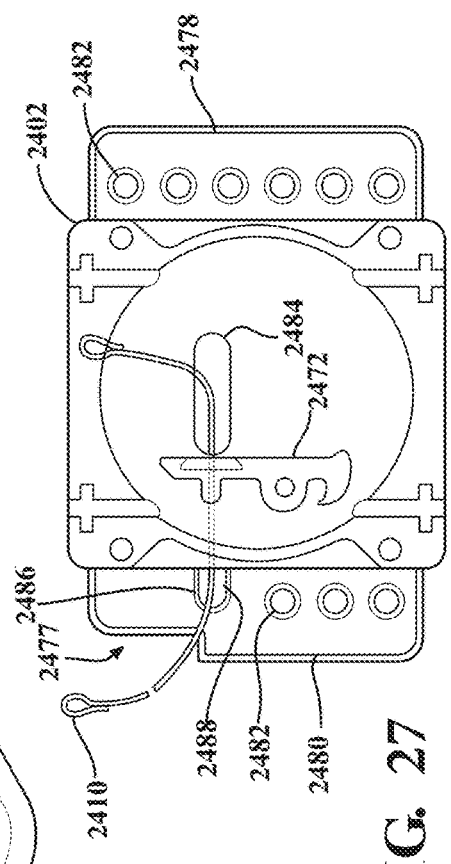
FIG. 27 is a top view of the tensioning device of FIG. 24, where internal components of the tensioning device are hidden to show a construction of a housing of the tensioning device.

FIG. 27 provides a top view of the housing 2402b showing a pair of mounting flanges 2478, 2480 disposed on opposite sides of the housing 2402b. The mounting flanges 2478, 2480 may rest upon an inner surface of the cavity 2214 of the sole structure 2200 to mount the tensioning device 2400b within the sole structure 2200. Alternatively, the flanges 2478, 2480 may attach to a strobel of the upper 2100. The strobel can be any support structure forming an underfoot portion of the footwear 3010 that is at least disposed between the sole structure 2200 and the void 2102. In some examples, bonding agents, such as adhesives and/or epoxies, may be applied to the contact surfaces of the mounting flanges 2478, 2480 and/or the inner surface of the cavity 2214 of the sole structure 2200 for attaching the housing 2402b within the cavity 2214. Additionally or alternatively, the mounting flanges 2478, 2480 may define one or more mounting holes 2482 formed therethrough and configured to receive a fastener (not shown) for mounting the housing 2402b to the sole structure 2200.

FIG. 27 shows the housing 2402b with the pawls 2458, 2460, adjustment elements 2312, 2314, and other components of the tensioning device 2400b removed to expose an elongate channel 2484 formed through the housing 2402b. As discussed in greater detail below, the elongate channel 2484 aligns with an attachment point of the first pawl 2458 and permits the release cord 2404 to pass underneath the housing 2402b and up through a feed slot 2486 defined by the mounting flange 2480. The mounting flange 2480 also defines a cut-out region 2477 proximate to the feed slot 2486 to provide more clearance for the release cord 2404 (and/or a conduit enclosing the release cord 2404) to extend from the housing 2402b. The mounting flanges 2478, 2480 may define a lip around the perimeter of the housing 2402b so that the housing 402b is spaced apart from the mounting surface of the cavity 2214 or the strobel, allowing the release cord 2404 to be routed between the housing 2402b and the mounting surface of the cavity 2214 or strobel. Thus, the release cord 2404 may freely extend underneath the housing 2402b between the elongate channel 2484 and the feed slot 2486. In some examples, the feed slot 2486 has a curved edge to prevent the release cord 2404 from catching or being restricted by the housing 2402b.

Figure 26:
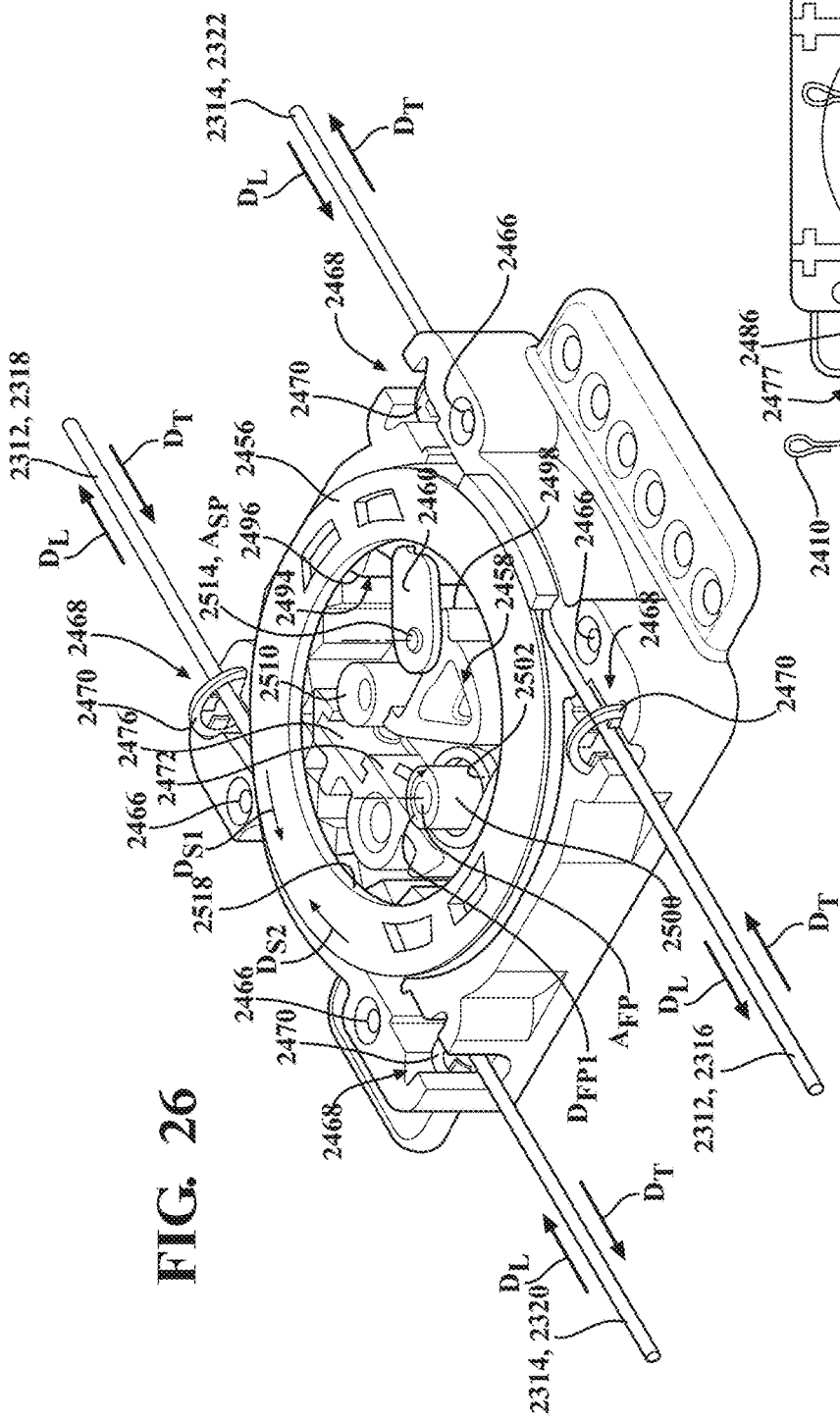
FIG. 26 is a perspective view of the tensioning device of FIG. 24.

Referring now to FIG. 26, the spool 2456 is supported within the cavity 2454 of the housing 2402b and may rotate relative to the housing 2402b. In some examples, the spool 2456 rotates relative to the housing 2402b in a first direction $D_{S1}$ when the adjustment elements 2312, 2314 move in the tightening direction $D_T$ and in an opposite second direction $D_{S2}$ when the adjustment elements 2312, 2314 move in the loosening direction $D_L$. The spool 2456 includes a first channel or annular groove 2488 configured to collect portions of the tensioning element 2312 and a second channel or annular groove 2490 configured to collect portions of the control element 2314. The spool 2456 may include one or more anchor slots 2492 formed through a divider wall separating the channels 2488, 2490 for fixing a rotational position of each of the adjustment elements 2312, 2314 relative to the spool 2456.

The tensioning device 2400b also includes a ratchet mechanism 2494 associated with the spool 2456 and having a plurality of teeth 2496 positioned circumferentially around an axis of the ratchet mechanism 2494 and protruding radially inward therefrom. In some implementations, the ratchet mechanism 2494 is integrally formed upon an inner circumferential wall of the spool 2456 such that the plurality of teeth 2496 protrude radially inward from the channels 2488, 2490. In other examples, the ratchet mechanism 2494 is supported for common rotation with the spool 2456.

The first pawl 2458 is disposed within the cavity 2454 of the housing 2402b and is configured to cooperate with the ratchet mechanism 2494 to selectively prevent and allow rotation of the spool 2456 and, consequently, movement of the adjustment elements 2312, 2314. In some examples, the first pawl 2458 includes one or more teeth 2498 configured to selectively and meshingly engage with the plurality of teeth 2496 of the ratchet mechanism 2494. In some implementations, the first pawl 2458 includes a first pawl axle 2500 configured to support the first pawl 458 within the housing 2402b to permit the first pawl 2458 to rotate relative to the housing 2402b about a first pawl axis of rotation $A_{FP}$.

A first pawl spring 2502 may operably connect to the first pawl axle 2500 and the retaining wall 2472 disposed within the cavity 2454 of the housing 2402b to bias the first pawl 2458 in a first direction $D_{FP1}$ about the pawl axis of rotation $A_{FP}$. The first pawl axis of rotation $A_{FP}$ may be substantially parallel to an axis of rotation of the spool 2456 when the spool 2456 is received by the cavity 2454. Accordingly, the first pawl spring 2502 may interact with the retaining wall 2472 and the first pawl 2516 to exert a biasing force that causes the first pawl 2458 to pivot about the pawl axis of rotation $A_{FP}$ in the first direction $D_{FP1}$ and into engagement with the plurality of teeth 2496 of the ratchet mechanism 2494, thereby causing the tensioning device 2400b to operate in the locked state to restrict movement by the adjustment elements 2312, 2314 in the loosening directions $D_L$.

Figure 28:
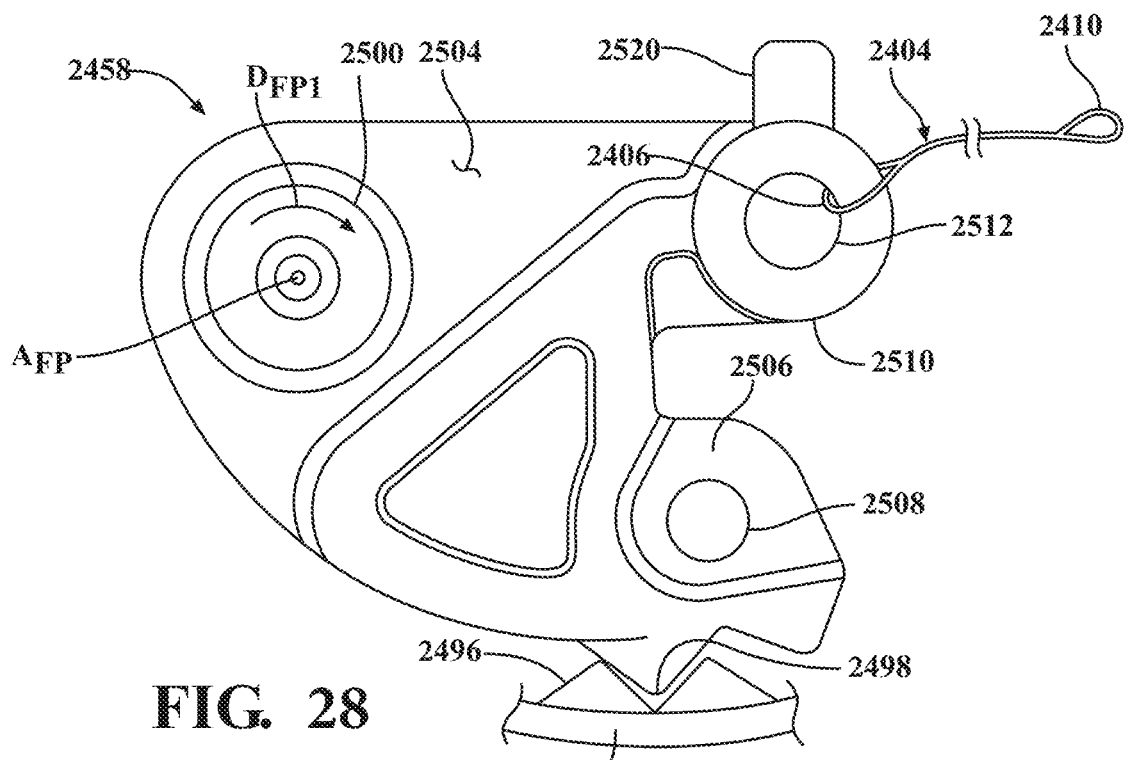
FIG. 28 is an enlarged fragmentary view of the tensioning device of FIG. 24, showing the tensioning device in a locked position.
Figure 29:
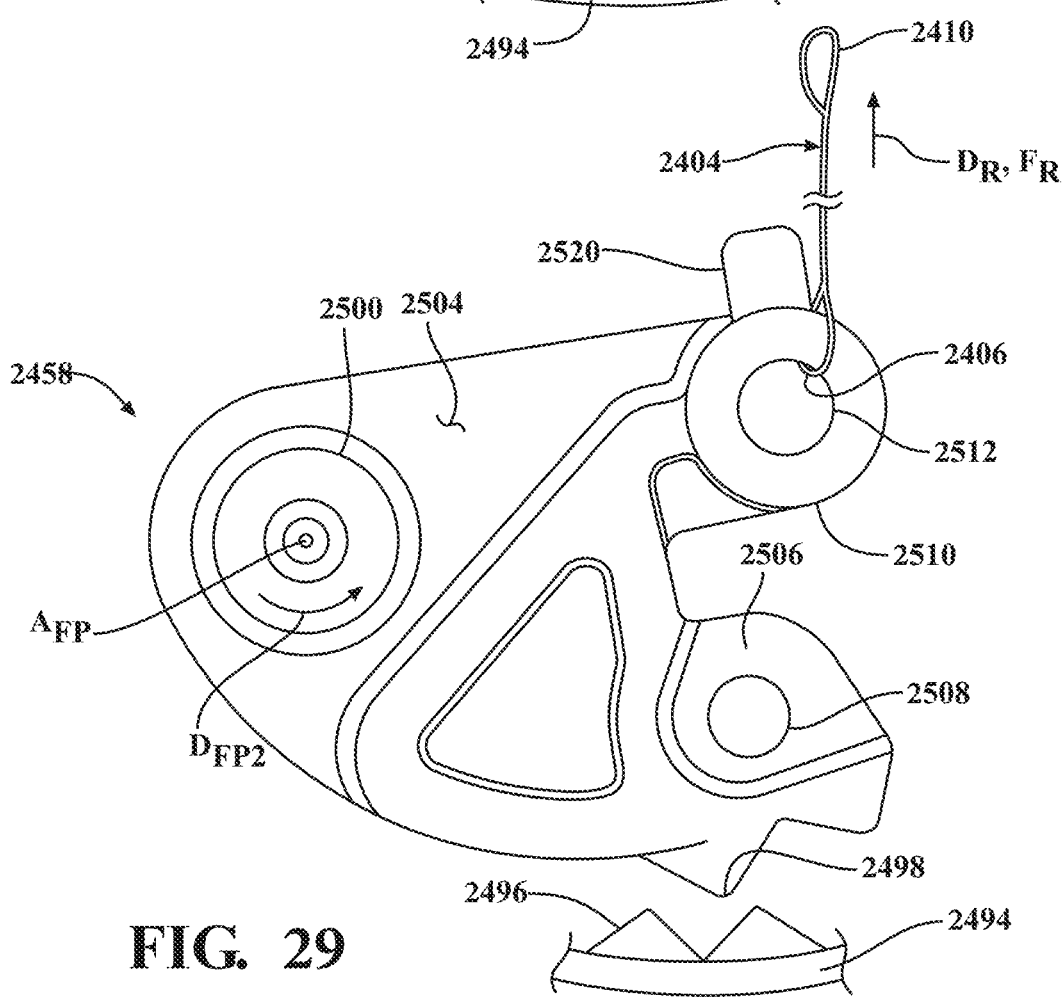
FIG. 29 is an enlarged fragmentary view of the tensioning device of FIG. 24, showing the tensioning device in an unlocked position.

FIGS. 28 and 29 each show a top view of the first pawl 2458 of the tensioning device 2400b. The first pawl 2458 defines a first receiving surface 2504 configured to support the first pawl spring 2502. The first pawl axle 2500 protrudes from the first receiving surface 2504 in a direction substantially perpendicular to the first receiving surface 2504. The first pawl axle 2500 may be integrally formed with the first pawl 2458. The first pawl 2458 also defines a second receiving surface 2506 configured to support a second pawl spring 2516. An aperture 2508 is formed through the second receiving surface 2506 and is configured to receive a second pawl axle 2514. An anchor post 2510 may protrude away from the receiving surfaces 2504, 2506 in a direction substantially parallel to the first pawl axle 2500. The anchor post 2510 may define an aperture 2512 to provide an attachment location for attaching the first end 2406 of the release cord 2404 to the anchor post 2510. The anchor post 2510 may be integrally formed with the first pawl 2458.

With reference to FIG. 26, the second pawl axle 2514 rotatably attaches the second pawl 2460 to the first pawl 2458 to permit the second pawl 2460 to rotate relative to both the first pawl 2458 and the housing 2402b about a second pawl axis of rotation $A_{SP}$. The second pawl axis of rotation $A_{SP}$ may extend substantially parallel to the first pawl axis of rotation $A_{FP}$ and the axis of rotation of the spool 2456. In some examples, the second pawl 2460 is associated with the second pawl spring 2516, which is configured to bias the second pawl 2460 into engagement with a control surface 2518 associated with an inner periphery of the spool 2456 when the first pawl 2458 is disengaged from the teeth 2496 of the ratchet mechanism 2494 to permit the spool 2456 to rotate in the second direction $D_{S2}$.

FIG. 26 provides a perspective view of the tensioning device 2400b while in the locked state with the first pawl teeth 2498 of the first pawl 2458 engaging the teeth 2496 of the ratchet mechanism 2494 to selectively restrict the spool 2456 from rotating in the second direction $D_{S2}$ and thereby restrict the adjustment elements 2312, 2314 from moving in their respective loosening directions $D_L$. In some examples, the plurality of the teeth 2496 are sloped to permit the spool 2456 to rotate in the first direction $D_{S1}$ when the teeth 2498 of the first pawl 2458 are engaged with the teeth 2496 of the ratchet mechanism 2494, thereby permitting the tensioning element 2312 to move in the tightening direction $D_T$ and the control element 2314 to move in the tightening direction $D_T$ responsive to the tightening force $F_T$ being applied to the tightening grip 2340.

When the spool 2456 rotates in the first direction $D_{S1}$, the control element 2314 is unreeled from the second channel 2490 of the spool 2456 while the first channel 2488 of the spool 2456 simultaneously retracts the tensioning element 2312 as the spool 2456 rotates in the first direction $D_{S1}$. Accordingly, movement by the adjustment elements 2312, 2314 in their respective tightening directions $D_T$ causes an effective length of the control element 2314 to increase, while simultaneously causing an effective length of the tensioning element 2312 to decrease, thereby moving the upper 2100 into a tightened state for closing the interior void 2102 around a foot of a user. Here, the control element 2314 incrementally moves in the tightening direction $D_T$ during each successive engagement between the first pawl 2458 (e.g., first pawl teeth 2498) and the teeth 2496 of the ratchet mechanism 2494 to thereby incrementally increase the tension applied to lateral and medial tensioning strands 2316, 2318 of the tensioning element 2312 for tightening the fit of the interior void 2102 around the foot as the upper 2100 moves into the tightened state. More particularly, because each of the lateral tensioning strand 2316 and the medial tensioning strand 2318 of the tensioning element 2312 is connected to and disposed within the first channel 2488 of the spool 2456, each of the tensioning strands 2316, 2318 will be wound and unwound by the spool 2456 at the same rate, providing substantially uniform tightness of the upper 2100 around the foot.

In some examples, the release cord 2404 operably connects to the anchor post 2510 of the first pawl 2458 to selectively disengage the first pawl 2458 from the teeth 2496 of the ratchet mechanism 2494 when a predetermined release force $F_R$ is applied to the release cord 2404. When the second pawl 2460 is engaged with the control surface 2518, the second pawl 2460 is operative to control the rotational speed of the spool 2456 in the second direction $D_{S2}$ such that the adjustment elements 2312, 2314 do not become tangled when collected (e.g., wound) or released (e.g., unwound) from respective ones of the first channel 2488 and the second channel 2490 of the spool 2456 during rotation in the second direction $D_{S2}$. In some configurations, the second pawl 2460 includes two cam surfaces that remain engaged with respective ones of two control surfaces 2518 when the first pawl 2458 remains disengaged from the teeth 2496 (i.e., when the tensioning device 2400b is operable in the unlocked state). Each control surface 2518 may be axially disposed on an opposite side of the ratchet mechanism 2494 such that the teeth 2496 are disposed between the control surfaces 2518 and protrude radially inward therefrom.

Referring to FIG. 28, the first pawl 2458 is biased into engagement with the plurality of teeth 2496 of the ratchet mechanism 2494 when the tensioning device 2400b is in the locked state. Here, the first pawl 2458 pivots and rotates about the first pawl axis of rotation $A_{FP}$ in the first direction $D_{FP1}$ such that the teeth 2498 of the first pawl 2458 engage with the teeth 2496 of the ratchet mechanism 2494. In some examples, the first pawl 2458 includes a tactile protrusion 2520 configured to engage with the tactile domes 2476 to provide the "click" indicating the incremental change of position in the spool 2456 during each successive engagement between the first pawl 2458 and the teeth 2496.

Referring to FIG. 29, a first end 2406 of the release cord 2404 is attached to the anchor post 2510 of the first pawl 2458 to allow the release cord 2404 to selectively disengage the first pawl 2458 from the teeth 2496 of the ratchet mechanism 2494 when the predetermined release force $F_R$ is applied to the release cord 2404. For example, a user may grasp the release grip 2410 of the release cord 2404 and apply the predetermined force $F_R$ to disengage the first pawl 2458 from the teeth 2496 of the ratchet mechanism 2494. Here, the predetermined force $F_R$ overcomes the biasing force of the first pawl spring 2502 to allow the first pawl 2458 to rotate about the first pawl axis of rotation $A_{FP}$ in a second direction $D_{FP2}$. Additionally, the tactile protrusion 2520 may engage with the tactile dome 2476 to provide the "click" when the predetermined force $F_R$ moves to the first pawl 2458 out of engagement with the teeth 2496 to transition the tensioning device 2400b to the unlocked state.

FIG. 29 shows the tensioning device 2400b in the unlocked state responsive to the release cord 2404 selectively disengaging the first pawl 2458 from the teeth 2496 of the ratchet mechanism 2494 when the predetermined force $F_R$ is applied to the release cord 2404. While the tensioning device 2400b is in the unlocked state with the first pawl 2458 disengaged from the teeth 2496 of the ratchet mechanism 2494, the spool 2456 is permitted to rotate in the second direction $D_{S2}$ to allow the tensioning element 2312 to move in the loosening direction $D_L$ when the loosening force $F_L$ is applied to the tensioning element 2312. In some examples, the first channel 2488 of the spool 2456 collects the tensioning element 2312 while the second channel 2490 of the spool 2456 simultaneously releases the control element 2314 as the spool 2456 rotates in the second direction $D_{S2}$. Accordingly, movement of the control element 2314 in the loosening direction $D_L$ allows an effective length of the tensioning element 2312 to increase to allow the tensioning strands 2316, 2318 to relax and thereby facilitate a transition of the upper 2100 from the tightened state to the loosened state such that a foot can be removed from the interior void 2102.

Referring back to FIG. 25, the lid 2462 and the housing 2402b of the tensioning device 2400b may each include a hub 2522 configured to support the first pawl axle 2500 of the first pawl 2458. The lid 2462 may also each include an elongate channel 2524 that cooperates with the elongate channel 2484 of the housing 2402b to allow the anchor post 2510 of the first pawl 2458 to freely rotate relative to the housing 2402b and the lid 2462 when the first pawl 2458 pivots about the first pawl axis of rotation $A_{FP}$ in either the first direction $D_{FP1}$ or the second direction $D_{FP2}$.

In use, the article of footwear 3010 can be selectively moved between a tightened state and a relaxed state using the tensioning system 2300a. With the footwear 3010 initially provided in a relaxed state, an effective length of the tensioning element 2312 will be maximized, such that the first cable is in a relaxed state about the upper 2100, while an effective length of the control element 2314 is minimized as the control element 2314 is wound about the spool 2456 of the tensioning device 2400b. Accordingly, a foot of a user can be inserted into the interior void 2102 of the footwear 3010 with the materials of the upper 2100 allowing the upper 2100 to stretch to accommodate the foot therein.

With the foot of the user inserted within the interior void 2102 of the upper 2100, the tensioning system 2300a can be moved to a tightened state by the user to secure the footwear 3010 to the foot. As discussed above, the tensioning system 2300a is moved to the tightened state by applying a tightening force $F_T$ to the tightening grip 2340, thereby causing the control element 2314 to move in the tightening direction $D_T$. As the control element 2314 moves in the tightening direction $D_T$, the spool 2456 rotates in the first direction $D_{S1}$ and the control element 2314 is unwound from the second channel 2490. Simultaneously, the tensioning element 312 is wound up within the first channel 2488, thereby causing the tensioning element 2312 to be retracted within the tensioning device 2400b. Accordingly, an effective length of the tensioning element 2312 is minimized around the upper 2100 to move the upper 2100 to a tightened state around the foot.

Prior to, during, or after movement of the tensioning system 2300a to the tightened state, the biasing force of the first pawl spring 2502 may move the first pawl 2458 to the locked position when the release force $F_R$ applied to the release cord 404 is overcome by the first pawl spring 2502. When the tensioning device 2400b is in the locked state, the teeth 2496 of the spool 2456 are engaged by the teeth 2498 of the first pawl 2458 to prevent the spool 2456 from rotating in the second direction $D_{S2}$ (i.e., the loosening direction $D_L$). Accordingly, the tensioning device 2400b maintains the tensioning system 2300a in the tightened state as long as the tensioning device 2400b remains in the locked position.

When a user desires to remove the article of footwear 3010 from the foot, the tensioning system 2300a may be moved to the loosened state to allow the upper 2100 to be relaxed around the foot. Initially, the tensioning device 2400b must be moved to the unlocked state by applying a sufficient release force $F_R$ to overcome the biasing force of the first pawl spring 2502. When the release force $F_R$ overcomes the biasing force, the teeth 2498 of the first pawl 2458 will disengage from the teeth 2496 of the spool 2456, thereby allowing the spool 2456 to rotate in the second direction $D_{S2}$.

A loosening force $F_L$ may be applied to the tensioning element 2312 by the user to move the first cable in the loosening direction $D_L$, thereby maximizing the effective length of the tensioning element 2312 to allow the upper 2100 to be relaxed. In the illustrated example, the loosening force $F_L$ may be applied indirectly to the tensioning element 2312 by pulling the anterior end 3012 of the upper 2100 in a downward direction, whereby the interior void 2102 is forced open to remove the foot. Alternatively, the tensioning element 2312 may be provided with one or more loosening grips (not shown) to allow the user to apply the loosening force $F_T$ directly to the tensioning element 2312.

As the tensioning element 2312 moves in the loosening direction $D_L$, the spool 2456 rotates in the second direction $D_{S2}$ and the tensioning element 2312 is unwound from the first channel 2488. As the tensioning element 2312 is unwound, the effective length of the tensioning element 2312 increases and the tensioning strands 2316, 2318 are relaxed, allowing the first strap 2116 and the second strap 2118 to relax about the upper 100. Simultaneously, the control element 2314 is wound up within the second channel 2490, thereby causing the control element 2314 to be retracted within the tensioning device 2400b. Accordingly, an effective length of the control element 2314 is minimized.

Figure 30:
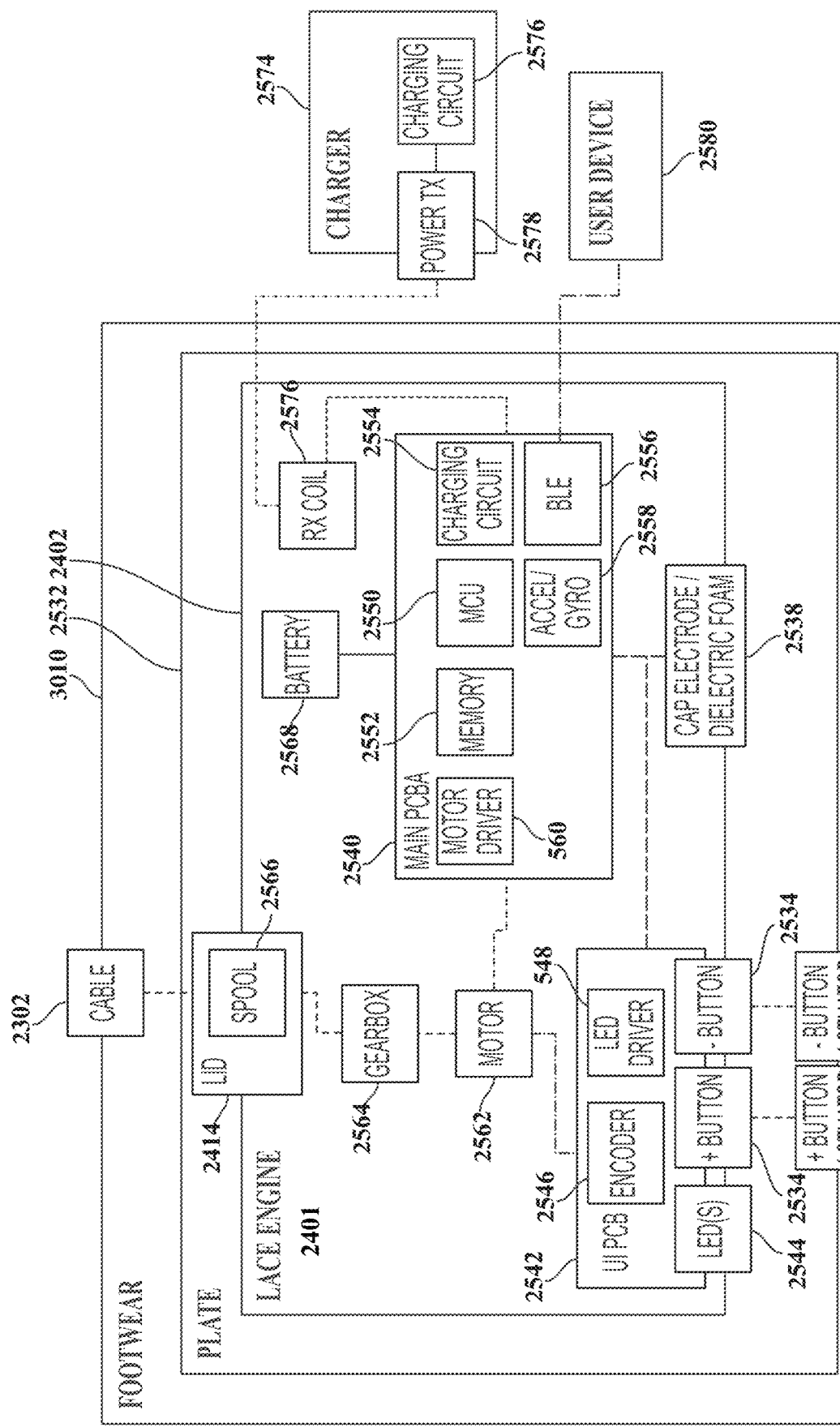
FIG. 30 is a schematic view of components of a motorized lacing system for an article of footwear according to the principles of the present disclosure.

FIG. 30 illustrates generally a block diagram of components of an example of a motorized tensioning device 2400 of the article of footwear 3010 of FIGS. 13-16. The schematic includes some, but not necessarily all, components of a motorized tensioning system, including a lacing engine 2401, a receptacle 2532 (FIG. 34), and the underlying footwear 3010. The motorized tensioning device 2400 as illustrated includes interface buttons 2534, interface button actuators 2536, a foot presence sensor 2538, and a lacing engine housing 2402 enclosing a main PCB 2540 and a user interface PCB 2542. The user interface PCB 2542 includes the buttons 2534, one or more light emitting diodes (LEDs) 2544 which may illuminate the button actuators 2536 or otherwise provide illumination visible outside of the article of footwear 3010, an optical encoder unit 2546, and an LED driver 2548 which may provide power to the LEDs 2544. The main PCB 2540 includes a processor circuit 2550, electronic data storage 2552, a battery charging circuit 2554, a wireless transceiver 2556, one or more sensors 2558, such as accelerometers, gyroscopes, and the like, and a motor driver 2560.

The lacing engine 2401 further includes the foot presence sensor 2538, such as a capacitive sensor, a motor 2562, a transmission 2564, a spool 2566, a battery or power source 2568, and a charging coil 2570. The processor circuit 2550 is configured with instructions from the electronic data storage 2552 to cause the motor driver 2560 to activate the motor 2562 to turn the spool 2566 by way of the transmission 2564 in order to place a desired amount of tension on a cable 2302 wound about the spool 2566. The processor circuit 2550 may receive inputs from a variety of sources, including the foot presence sensor 2538, the sensors 2558, and the buttons 2534 to decide, according to the instructions, to increase or decrease the tension on the cable 2302. For instance, the foot presence sensor 2538 may detect the presence of a foot in the footwear 3010, and the processor circuit 2552 may set the tension to a present tension level. The sensors 2558 may detect movement consistent with a particular activity level, e.g., causal walking, a vigorous physical activity, etc., and the processor circuit 2550 may cause the tension to be set to a level consistent with that activity level, e.g., relatively loose for casual walking and relatively tight for vigorous physical activity. A user may press the button actuators 2536 to manually command an incremental or linear increase or decrease in tension, as desired.

The battery 2568 provides power for the components of the lacing engine 2401 in general and is, in the example embodiment, a rechargeable battery. However, alternative power sources, such as non-rechargeable batteries, super capacitors, and the like, are also contemplated. In the illustrated example, the battery 2568 is coupled to the charging circuit 2554 and the recharge coil 2570. When the recharge coil 2570 is placed in proximity of an external charger 2574, a charging circuit 2576 may energize a transmit coil 2578 to inductively induce a current in the recharge coil 2570, which is then utilized by the charging circuit 2554 to recharge the battery 2568. Alternative recharging mechanisms are contemplated, such as a piezoelectric generator located within the footwear 3010.

The wireless transceiver 2556 is configured to communicate wirelessly with a remote user device 2580, such as a smartphone, wearable device, tablet computer, personal computer, and the like. In the illustrated example, the wireless transceiver 2556 is configured to communicate according to the Bluetooth Low Energy modality, though the wireless transceiver 2556 may communicate according to any suitable wireless modality, including near field communication (NFC), 802.11 WiFi, and the like. Moreover, the wireless transceiver 2556 may be configured to communicate with multiple external user devices 2580 and/or according to multiple different wireless modalities. The wireless transceiver 2556 may receive instructions from the user device 2580, e.g., using an application operating on the user device 2580, for controlling the lacing engine 2401, including to enter pre-determined modes of operation or to incrementally or linearly increase or decrease the tension on the cable 2302. The wireless transceiver 2556 may further transmit information about the lace engine 2401 to the user device 2580, e.g., an amount of tension on the cable 2302 or otherwise an orientation of the spool 2566, an amount of charge remaining on the battery 2234, and any other desired information about the lacing engine 2401 generally.

Figure 31:
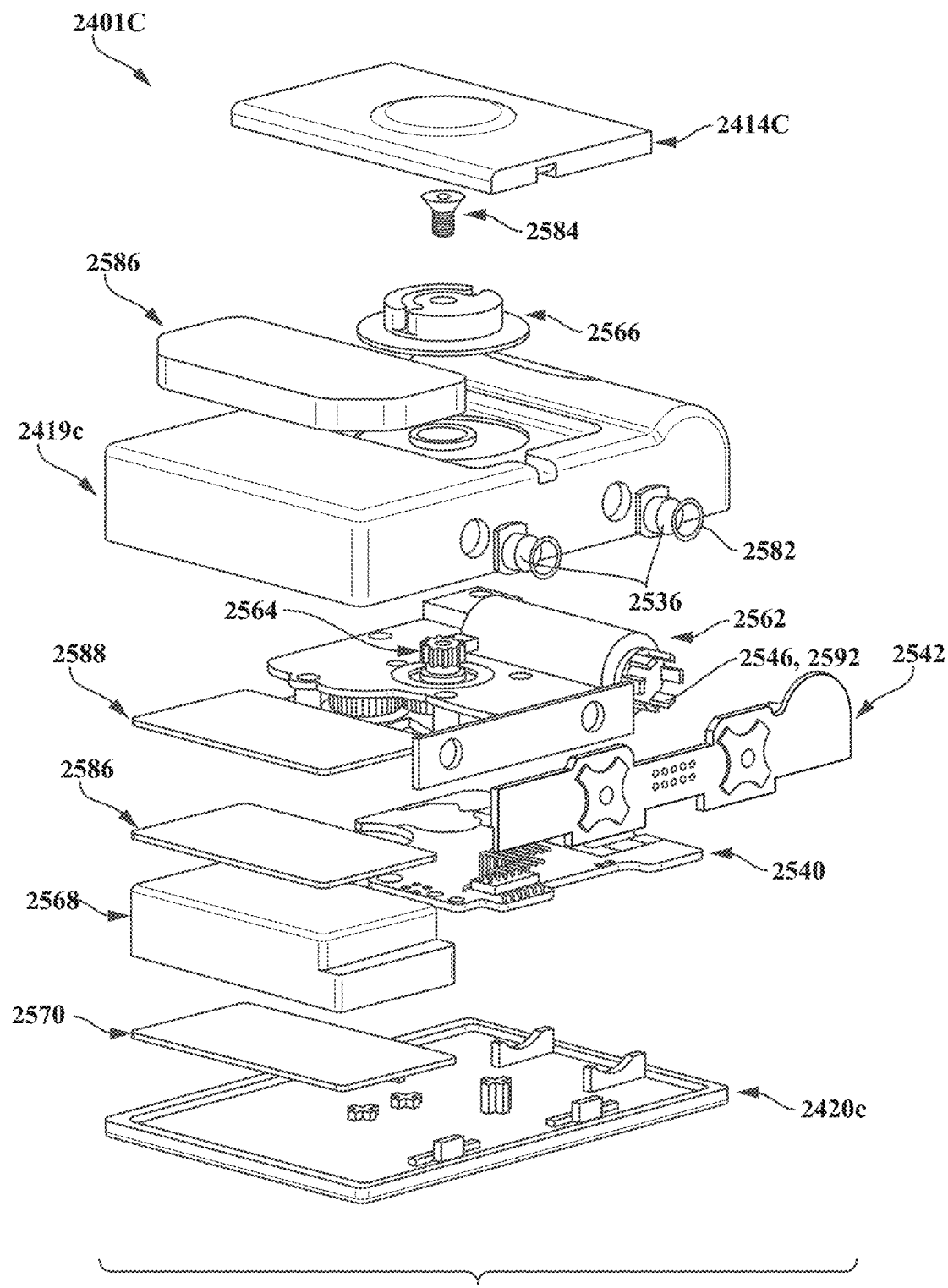
FIG. 31 is an exploded view of an example of a lacing engine of the motorized lacing system of FIG. 30.

FIG. 31 is an exploded view of an example of a lacing engine 2401c for a motorized tensioning device. The lacing engine 2401c includes the housing 2402, which includes an upper portion 2419 and a base portion 2420, which enclose the lacing engine 2401c generally, except for certain components which are exterior of the housing 2402. Those components include the button actuators 2536 (and related O-rings 2582 for protecting the lacing engine 2401c against environmental conditions, such as moisture), the spool 2566, which is secured to the transmission 2564 via a setscrew 2584 and which is enclosed with the lid 2414c, and a dielectric foam 2586 of the foot presence sensor 538. Enclosed within the housing 2402 is the main PCB 2540, the user interface PCB 2542, the motor 2562, the transmission 2564, the battery 2568, the recharge coil 570, and an electrode 2588 and foam 2590 of the foot presence sensor 2538. The optical encoder unit 546 is shown in FIG. 31, and is partially visible in the exploded view of FIG. 32. Specifically, a three-dimensional encoder 2592 of the optical encoder unit 2546 is coupled to the motor 2562 and turns with the turning of the motor 2562.

Figure 32A:
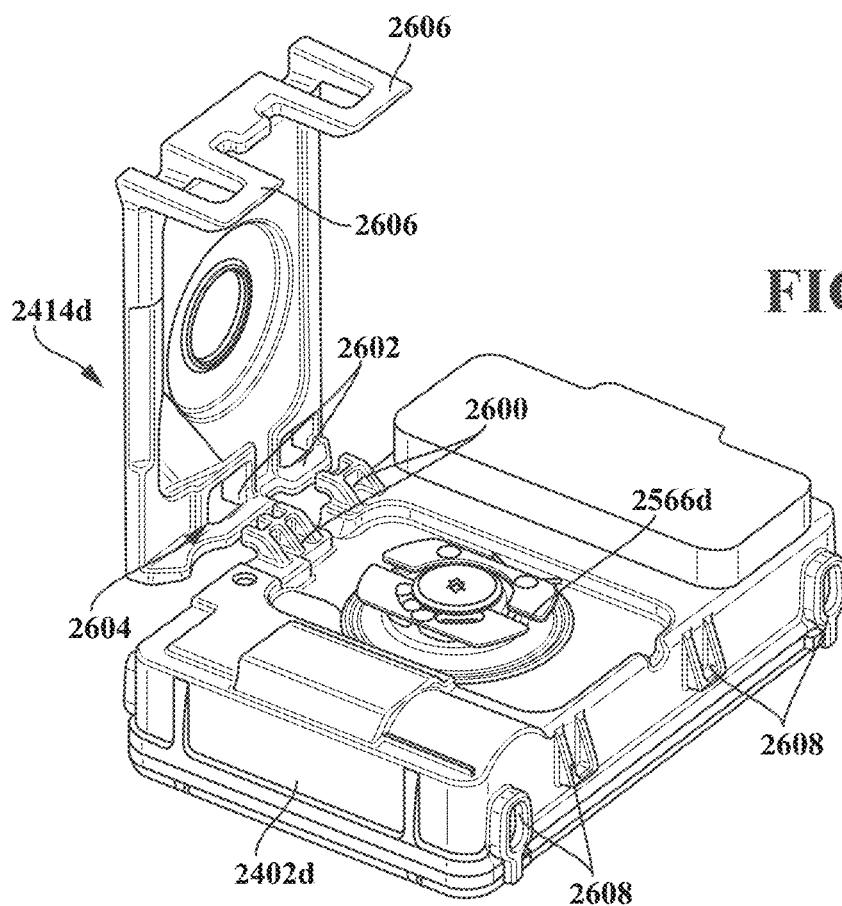
FIGS. 32A and 32B are perspective view of another example of a lacing engine of the motorized lacing system of FIG. 30.
Figure 32B:
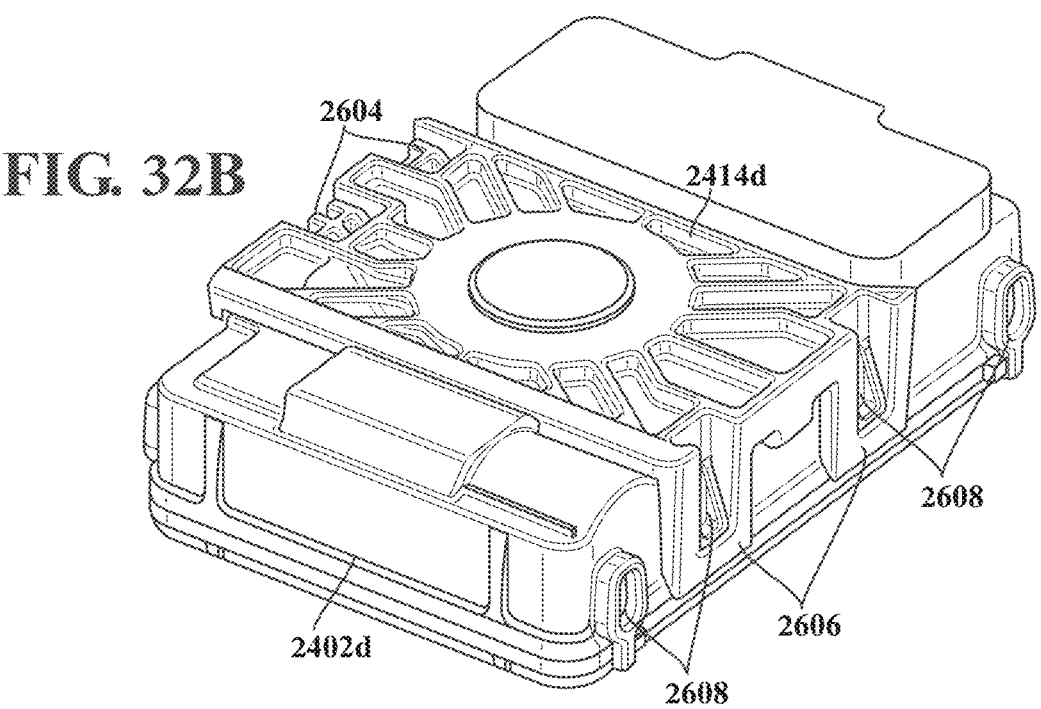

FIGS. 32A and 32B are a depiction of a lace engine housing 2402d and lid 2414d for another example of a lace engine 2401d. The lace engine housing 2402d and the lid 2414d may be utilized as the housing 2402 and the lid 2414, respectively, in the block diagram of FIG. 30. The lace engine housing 2402d may be sized to enclose the lace engine 2401d or any suitable lace engine. The lace engine housing 2402d includes tabs 2600 that mate, e.g., via snap-fit, with pins 2602 on the lid 2414d to form hinges 2604 about which the lid 2414d may rotate relative to the housing 2402d.

FIG. 32A illustrates the lid 2414d in an open configuration, with the spool 2566d exposed and the cable 2302 (not pictured) either accessible or able to be placed in the lace groove. FIG. 32B illustrates the lid 2414d in a closed configuration, with the tabs 2606 snapped into place on a side 2608 of the housing 2402d. In the closed configuration, the lid 2414d may tend to restrain the cable 2302 within the lace groove.

The housing 2402d and lid 2414d may be made of any suitable material, including plastic or other polymer and metal, as appropriate. The housing 2402d and/or the housing 2402d and lid 2414d together may provide at least some isolation for the lace engine 2401d against environmental conditions, such as moisture or sweat, as well as against forces that may be exerted against the housing 2402d, including impacts and mechanical stresses. The housing 2402d may also be placed within a sleeve or other structure that may provide for environmental isolation.

As illustrated, the housing 2402d includes apertures 2608 to allow light emitted from the LEDs 2208 to be visible outside of the housing 2402d. In the illustrated example, two of the apertures 2608 align with the tabs 2606.

Figure 33A:
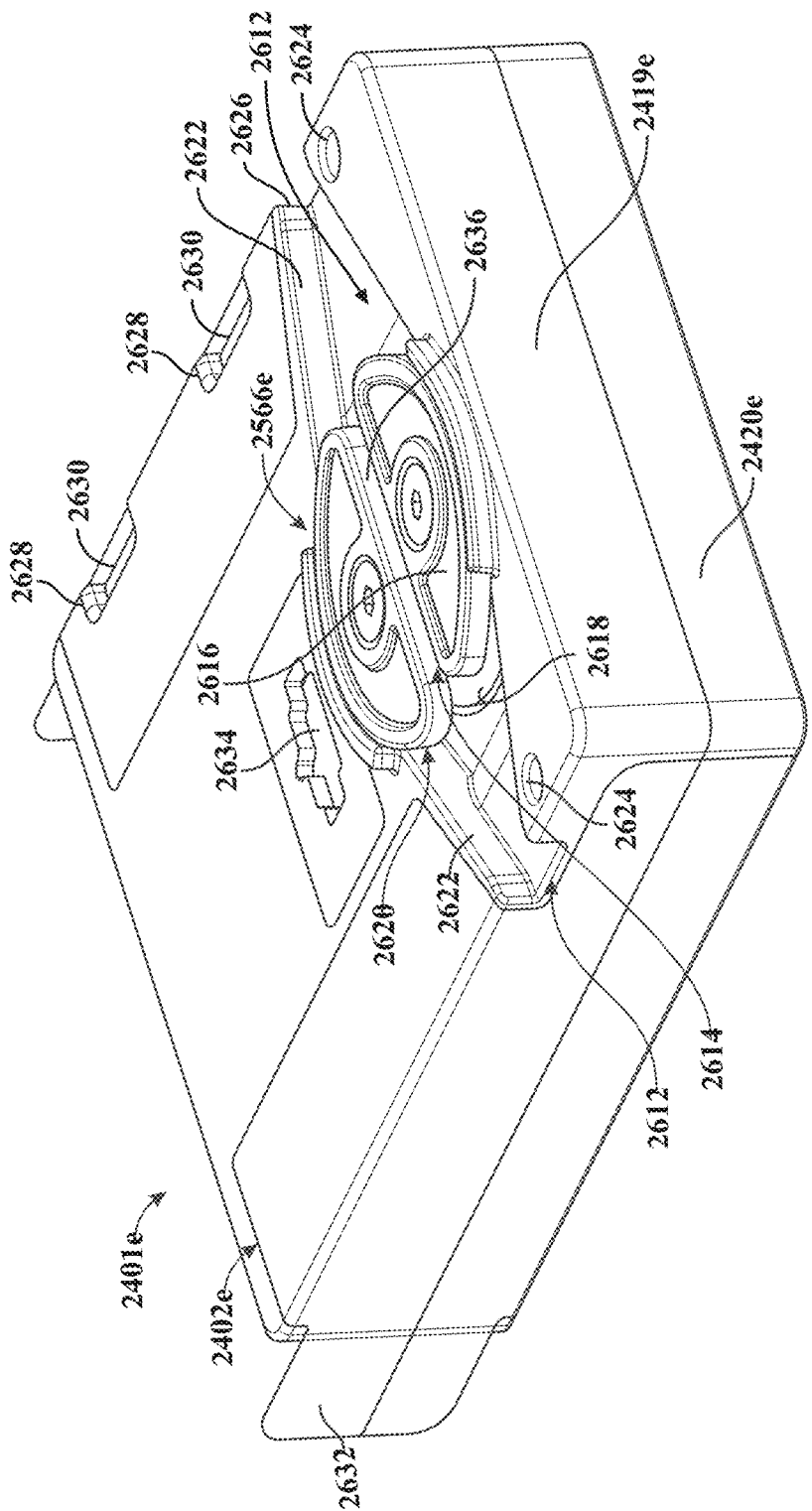
FIG. 33A is a perspective view of another example of a lacing engine of the motorized lacing system of FIG. 30.
Figure 33B:
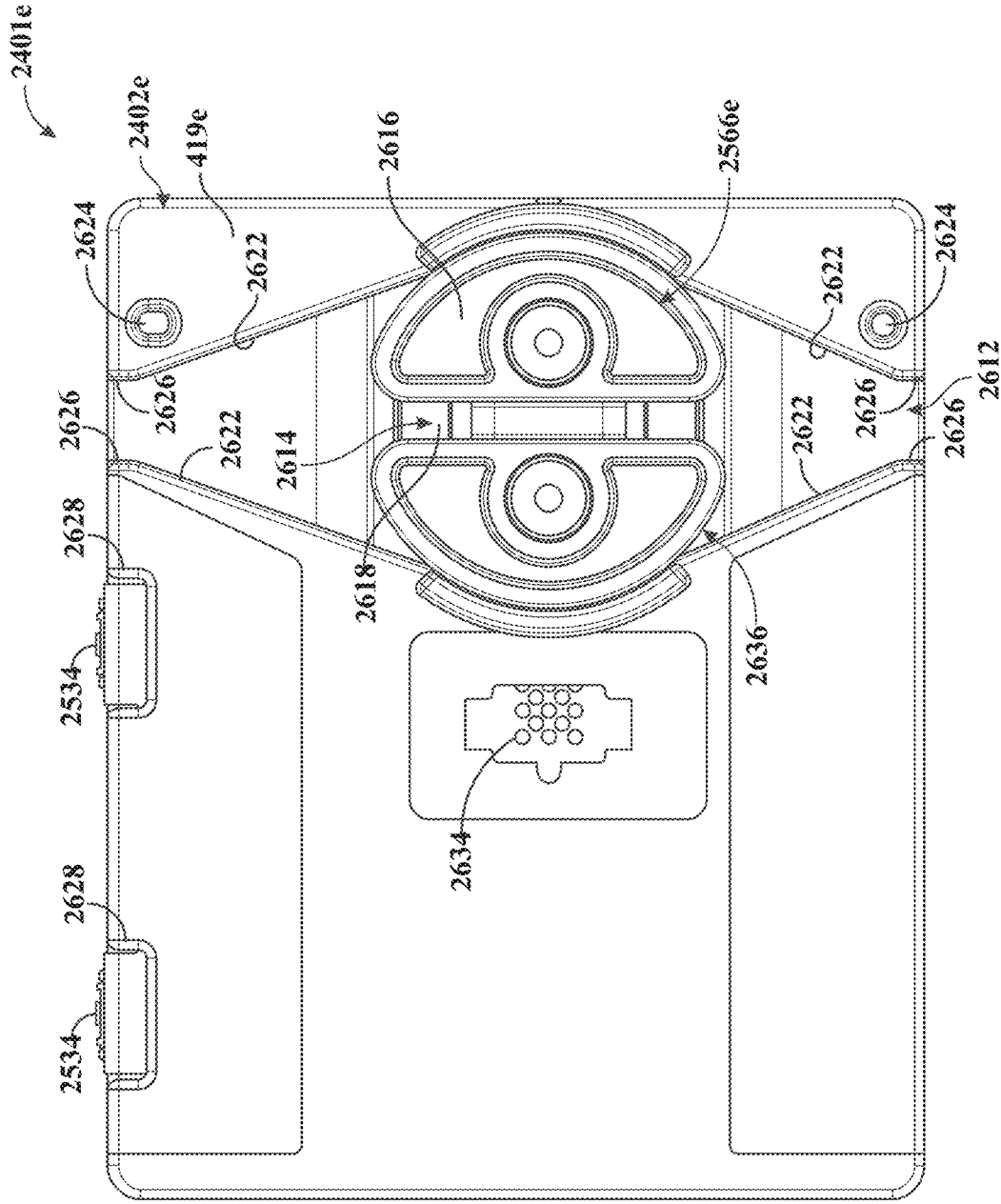
FIG. 33B is a top plan view of the lacing engine of FIG. 33A.

FIG. 33A is a perspective view illustration of a motorized tensioning device 2400e having anti-tangle lacing channel 2612, for the lace engine 2401e in an example embodiment. FIG. 33B is a top view of the motorized tensioning device 2400e of FIG. 33A showing a winding channel 2614 extending through a modular spool 2566e and aligned with lacing channel 2612 through housing structure 2402e. Similar to the spool 566 discussed above, the modular spool 2566e provides a storage location for a lace, such as cable 302, when modular spool 2566e is wound to cinch the cable 2302 down on an article of footwear upper. The modular spool 2566e can be assembled from an assortment of components, such as an upper plate 2616 and a lower plate 2618.

The modular spool 2566e can be positioned within a spool recess 2620 of the lacing channel 2612. The lacing channel 2612 is shaped to optimize or improve performance of modular spool 2566e in winding and unwinding cable 2302 from housing structure 2402e. In particular, as discussed below, the lacing channel 2612 can include lace channel transitions 2622, and other shapes, geometries and surfaces, that can help prevent cable 2302 from jamming within the spool recess 2620, such as by bird's nesting. The lace channel transitions 2622 can provide lacing channel 2612 with adequate volume to store the cable 2302 without having to compress or entangle the cable 2302.

An example lacing engine 2401e can include an upper component 2419e and a lower component 2420e of housing structure 2402e, case screws 2624, the lacing channel 2612 (also referred to as lace guide relief 2612), lace channel walls 2626, lace channel transitions 2622, a spool recess 2620, button openings 2628, the buttons 2534, a button membrane seal 2632, a programming header 2634, modular spool 2566e, and the winding channel (lace grove) 2614.

The housing structure 2402e is configured to provide a compact lacing engine for insertion into a sole of an article of footwear, as described herein, for example. The case screws 2624 can be used to the hold upper component 2419e and the lower component 2420e in engagement. Together, upper component 2419e and lower component 2420e provide an interior space for placement of components of the motorized tensioning device 2400, such as components of the modular spool 2566e and motor 2562. The lace channel walls 2626 can be shaped to guide the cable 2302 into and out of the housing structure 2402e and the lace channel transitions 2622 can be shaped to guide lace into and out of modular spool 2566e. In an example, the lace channel walls 2626 extend generally parallel to the major axis of the lacing channel 2612, while the lace channel transitions 2622 extend oblique to the major axis of the lacing channel 2612 in extending between the lace channel walls 2626 and the spool recess 2620. The spool recess 2620 can comprise a partial cylindrical socket for receiving modular spool 2566e.

The cable 2302 can be positioned to extend into the lacing channel 2612 and the winding channel 2614. As the modular spool 2566e is rotated by the motor 2562, the cable 2302 is wound around a drum 2636 between the upper plate 2616 and the lower plate 2618. The buttons 2534 can extend through the button openings 2628 and can be used to actuate the motor 2562 to rotate the modular spool 2566e in clockwise and counterclockwise directions. The programming header 2634 can permit the main circuit board 2540 of the lacing engine 2401e to be connected to external computing systems in order to characterize the lacing action provided by the buttons 2534 and the operation of motor 2562, for example.

Figure 34:
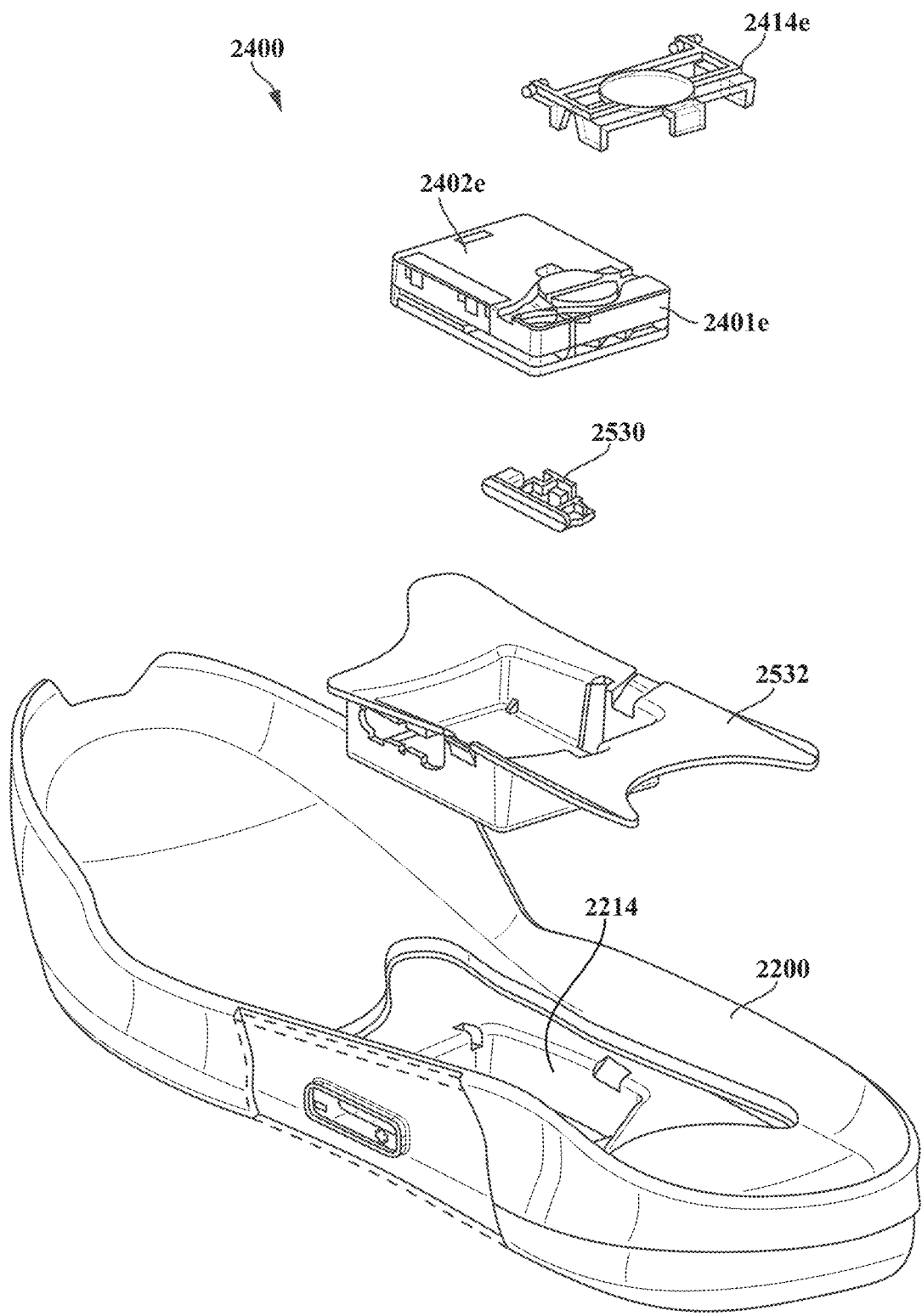
FIG. 34 is an exploded view of components of a motorized lacing system incorporated into a sole structure of article of footwear according the principles of the present disclosure.

FIG. 34 is an exploded view illustration of components of a motorized tensioning device 400 for the article of footwear 3010 of FIGS. 13-16. While the motorized tensioning device 2400 is described with respect to the article of footwear 3010, it is to be recognized and understood that the principles described with respect to the article of footwear 3010 apply equally well to any of a variety of wearable articles. The tensioning device 2400 illustrated in FIG. 34 includes a lacing engine 2401e having the housing 2402e, the lid 2414e, an actuator 2530, and a receptacle 2532. However, other examples of the lacing engine 2401c, 2401d may also be incorporated in the tensioning device 2400.

FIG. 34 illustrates the basic assembly sequence of components of the motorized tensioning device 2400 in conjunction with an example of the sole structure 2200 of the article of footwear 3010. The tensioning device 2400 starts with the receptacle 2532 being secured within the cavity 2214 of the sole structure 2200. Next, the actuator 2530 is inserted into an opening in the lateral side of the receptacle 2532 opposite to the interface buttons 2534 that can be embedded in the sole structure 2200. Next, the lacing engine 2401c-2401e is dropped into a lacing engine cavity of the receptacle 2532. In various examples that do not include the receptacle 2532, the lacing engine 2401c-2401e may be received directly in the cavity 2214 of the sole structure 2200. In an example, the tensioning device 2400 is inserted under a continuous loop of the cable 2302 and the cable 2302 is aligned with a spool in the lacing engine 2401. Finally, the lid 2414c-2414e is inserted into grooves in the receptacle 2532, secured into a closed position, and latched into a recess in the receptacle 2532. The lid 2414c-2414e can capture the lacing engine 2401 and can assist in maintaining alignment of a lacing cable during operation.

The following Clauses provide an exemplary configuration for an article of footwear described above.

Clause 1: An article of footwear including an upper, a first strap extending from a first fixed end attached at a first side of the upper to a first free end on a second side of the upper, and a second strap extending from a second fixed end attached at the second side of the upper to a second free end on the first side of the upper, a first portion of the first strap overlapping a first portion of the second strap and a second portion of the first strap overlapped by a second portion of the second strap.

Clause 2: The article of footwear of Clause 1, wherein the first portion of the first strap is parallel to the second portion of the first strap.

Clause 3: The article of footwear of Clause 1 or 2, wherein the first portion of the second strap is parallel to the second portion of the second strap.

Clause 4: The article of footwear of any one of Clauses 1-3, wherein the first portion of the first strap is a first band extending from a first end at the first fixed end to a second end at the first free end, and the second portion of the first strap is a second band extending from a first end at the first fixed end to a second end at the first free end.

Clause 5: The article of footwear of Clause 4, wherein the second end of the first band is attached to the second end of the second band at the first free end of the first strap.

Clause 6: The article of footwear of Clause 4, wherein the first end of the first band and the first end of the second band are separately attached at the first side of the upper.

Clause 7: The article of footwear of any one of Clauses 1-6, wherein the first free end of the first strap and the first free end of the second strap are each attached to a tensioning element operable to selectively apply a tightening force to the first free end of the first strap and the first free end of the second strap.

Clause 8: The article of footwear of any one of Clauses 1-7, wherein the first fixed end and the second fixed end are attached in a mid-foot region of the upper.

Clause 9: The article of footwear of any one of Clauses 1-8, wherein the first strap and the second strap extend over a mid-foot region of the upper.

Clause 10: The article of footwear of any one of Clauses 1-8, wherein a width of the first strap tapers from the first fixed end to the first free end.

Clause 11: An article of footwear including an upper, a cable routed along the upper and operable between a tightened state and a loosened state, a first strap including a first plurality of bands each extending from a first end attached at a first side of the upper to a second end attached to a first portion of the cable on a second side of the upper, and a second strap including a second plurality of bands each extending from a first end attached at the second side of the upper to a second end attached to a second portion of the cable on the first side of the upper, the first plurality of bands of the first strap interweaved with the second plurality of bands of the second strap and operable to move through the second plurality of bands when the cable is moved between the tightened state and the loosened state.

Clause 12: The article of footwear of Clause 11, wherein bands of the first plurality bands are parallel to each other.

Clause 13: The article of footwear of Clause 11 or 12, wherein bands of the second plurality of bands are parallel to each other.

Clause 14: The article of footwear of any one of Clauses 11-13, wherein the second ends of the first plurality of bands are attached to each other.

Clause 15: The article of footwear of any one of Clauses 11-14, wherein the first ends of each of the first plurality of bands are separately attached at the first side of the upper.

Clause 16: The article of footwear of any one of Clauses 11-15, wherein the first ends of the first plurality of bands and the first ends of the second plurality of bands are attached in a mid-foot region of the upper.

Clause 17: The article of footwear of any one of Clauses 11-16, wherein the first strap and the second strap extend over a mid-foot region of the upper.

Clause 18: The article of footwear of any one of Clauses 11-17, wherein a width of the first strap tapers from the first ends to the second ends.

Clause 19: The article of footwear of any one of Clauses 11-18, further comprising a sole structure attached to the upper and tensioning device disposed within the sole structure and operable to selectively move the cable between the tightened state and the loosened state.

Clause 20: The article of footwear of Clause 19, wherein the cable includes a first strand forming the first portion of the cable and a second strand forming the second portion of the cable, the first strand and the second strand routed through the tensioning device.

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

The present disclosures provide technical advantages. In one example, the gesture recognition device 700 may be configured to recognize a user input with enhanced accuracy than that of a conventional sensor device. In addition, the gesture recognition device 700 may be configured to provide enhanced gesture recognition capability while maintaining low power consumption. In one specific example, the gesture recognition device 700 utilizes the analysis unit 732 to achieve enhanced gesture recognition accuracy while maintaining low power consumption by selectively setting the analysis unit 732 to operate in a low power mode. Accordingly, the gesture recognition device 700 may be configured to provide for enhanced interface between a human user and an electro-mechanical device configured to tighten or loosen a closure mechanism of an article a footwear. In one specific example, the gesture recognition device 700 may be configured to recognize with enhanced accuracy and reduced power consumption, a double tap gesture executed by a user on a portion of an article a footwear, with said double tap gesture transduced into a signal configured to actuate a motor, such as motor 760.

The various embodiments described herein may be implemented by general-purpose or specialized computer hardware. In one example, the computer hardware may comprise one or more processors, otherwise referred to as microprocessors, having one or more processing cores configured to allow for parallel processing/execution of instructions. As such, the various disclosures described herein may be implemented as software coding, wherein those of skill in the computer arts will recognize various coding languages that may be employed with the disclosures described herein. Additionally, the disclosures described herein may be utilized in the implementation of application-specific integrated circuits (ASICs), or in the implementation of various electronic components comprising conventional electronic circuits (otherwise referred to as off-the-shelf components). Furthermore, those of ordinary skill in the art will understand that the various descriptions included in this disclosure may be implemented as data signals communicated using a variety of different technologies and processes. For example, the descriptions of the various disclosures described herein may be understood as comprising one or more streams of data signals, data instructions, or requests, and physically communicated as bits or symbols represented by differing voltage levels, currents, electromagnetic waves, magnetic fields, optical fields, or combinations thereof.

One or more of the disclosures described herein may comprise a computer program product having computer-readable medium/media with instructions stored thereon/therein that, when executed by a processor, are configured to perform one or more methods, techniques, systems, or embodiments described herein. As such, the instructions stored on the computer-readable media may comprise actions to be executed for performing various steps of the methods, techniques, systems, or embodiments described herein. Furthermore, the computer-readable medium/media may comprise a storage medium with instructions configured to be processed by a computing device, and specifically a processor associated with a computing device. As such the computer-readable medium may include a form of persistent or volatile memory such as a hard disk drive (HDD), a solid state drive (SSD), an optical disk (CD-ROMs, DVDs), tape drives, floppy disk, ROM, RAM, EPROM, EEPROM, DRAM, VRAM, flash memory, RAID devices, remote data storage (cloud storage, and the like), or any other media type or storage device suitable for storing data thereon/therein. Additionally, combinations of different storage media types may be implemented into a hybrid storage device. In one implementation, a first storage medium may be prioritized over a second storage medium, such that different workloads may be implemented by storage media of different priorities.

Further, the computer-readable media may store software code/instructions configured to control one or more of a general-purpose, or a specialized computer. Said software may be utilized to facilitate interface between a human user and a computing device, and wherein said software may include device drivers, operating systems, and applications. As such, the computer-readable media may store software code/instructions configured to perform one or more implementations described herein.

Those of ordinary skill in the art will understand that the various illustrative logical blocks, modules, circuits, techniques, or method steps of those implementations described herein may be implemented as electronic hardware devices, computer software, or combinations thereof. As such, various illustrative modules/components have been described throughout this disclosure in terms of general functionality, wherein one of ordinary skill in the art will understand that the described disclosures may be implemented as hardware, software, or combinations of both.

The one or more implementations described throughout this disclosure may utilize logical blocks, modules, and circuits that may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. Functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

In one aspect, an article of footwear may include a motor configured to actuate a lacing system of an article a footwear. The article of footwear may additionally include a gesture recognition device configured to detect a gesture performed by a user to actuate the motor. The gesture recognition device may include a sensor unit that has an accelerometer sensor and a buffer module, and an analysis unit in operative communication with the sensor unit. The analysis unit may be configured to execute a gesture confirmation algorithm to confirm or reject possible gesture event data received from the buffer module as a true gesture event. If the gesture confirmation algorithm confirms the possible gesture event data as a true gesture event, the analysis unit may output a signal to actuate the motor.

The sensor unit may additionally include a processor, and a non-transitory computer-readable medium comprising computer-executable instructions that when executed by the processor are configured to receive an operational mode signal and selectively set, in response to receipt of the operational mode signal, an operational mode of the sensor unit to be a continuous mode or a first-in first-out mode. The computer-executable instructions may additionally include receiving accelerometer data from the accelerometer sensor, storing the received accelerometer data in the buffer module, executing an algorithm to detect a possible gesture event in the received accelerometer data, and outputting, in response to detection of the possible gesture event in the received accelerometer data, an interrupt signal. When the sensor unit is set to the continuous mode, a most recent datum of the received accelerometer data may be stored in a vacant memory unit in the buffer or replace an oldest datum stored in the buffer. When the sensor unit is set to the first-in first-out mode, the received accelerometer data is stored in the buffer module until the buffer module is full.

The previously described processor of the article of footwear may be a first processor, and the non-transitory computer-readable medium may be a first non-transitory computer-readable medium. The analysis unit may additionally include a hardware interrupt input, configured to receive an interrupt signal from the sensor unit, a second processor, and a second non-transitory computer-readable medium comprising computer-executable instructions, that when executed by the second processor are configured to initiate, upon receipt of the interrupt signal at the hardware interrupt input, a timer with a predetermined timer duration. The computer-executable instructions may additionally include outputting, upon elapse of the predetermined timeout duration, the operational mode signal of the sensor unit to be set to be the first-in first-out mode. The computer-executable instructions may additionally include receiving from the buffer module, the stored accelerometer data as the possible gesture event data, executing the gesture confirmation algorithm to confirm or reject the possible gesture event data as a true gesture event, and outputting the operational mode signal to the sensor unit to set the operational mode of the sensor to be the continuous mode.

The true gesture event may be a double tap by the user of a structure to which the sensor unit is coupled. This structure to which the sensor unit is coupled may form a portion of the article of footwear.

The gesture confirmation algorithm may confirm the possible gesture event as a true gesture event upon an identification within the received accelerometer data of a first impulse response, a low variance state following the first impulse response and lasting between a lower time threshold and an upper time threshold, and a second impulse response following the low variance state.

The buffer module may be a first buffer module, and the analysis unit may additionally include a second buffer module.

The identification of the first impulse response or the second impulse response by the gesture confirmation algorithm may additionally include identifying an incidence of high variance in the possible gesture event data, storing a subset of the possible gesture event data in the second buffer module, executing a Fast Fourier Transform operation to determine a frequency content of the subset of the possible gesture event data and the second buffer module, and identifying a threshold amount of energy of the frequency content within a predetermined impulse frequency band.

The Fast Fourier Transform operation may be a partial Fast Fourier Transform that evaluates the frequency content of the subset of the possible gesture event data across a frequency range of 0-100 Hz.

The threshold amount of energy may be 70% on the impulse frequency band may range between 10 and 100 Hz.

The impulse frequency band may include a natural frequency/damped natural frequency of the sensor unit.

The subset of the possible gesture event data may be stored in the second buffer as a rolling window through the received possible gesture event data.

The lower time threshold may be 0.05 seconds and the upper time threshold may be 1.0 seconds.

In another aspect, a non-transitory computer-readable medium comprising computer-executable instructions that when executed by a processor may be configured to perform at least initiating, upon receipt of an interrupt signal from a sensor unit, a timer with a predetermined timeout duration, outputting, upon elapse of the predetermined timer duration, an operational mode signal to the sensor unit to set an operational mode of the sensor unit to be a first-in first-out mode, such that when the sensor unit is set to the first-in first-out mode, accelerometer data generated by the sensor unit is stored in a buffer module until the buffer module is full. The computer-executable instructions may additionally receive from the buffer module, accelerometer data stored in the buffer module as possible gesture event data, execute a gesture confirmation algorithm to confirm or reject the possible gesture event data as a true gesture event, and output at a hardware output signal port, in response to confirming the possible event data as a true gesture event, a signal indicating that a user has executed the true gesture event.

The true gesture event may be a double tap, by the user, of a structure to which the sensor unit is coupled.

The gesture confirmation algorithm may confirm the possible gesture event data as the true gesture event upon an identification within the possible gesture event data of a first impulse response, a low variance state following the first impulse response and lasting between a lower time threshold and an upper time threshold, and a second impulse response following the low variance state.

The identification of the first impulse response or the second impulse response by the gesture confirmation algorithm may additionally include identifying an incidence of high variance in the possible gesture event data, storing a subset of the possible gesture event data in a buffer module, executing a Fast Fourier Transform operation to determine a frequency content of the subset of possible gesture event data in the buffer module, and identifying a threshold amount of energy of the frequency content within a predetermined impulse frequency band.

The Fast Fourier Transform operation may be a partial Fast Fourier Transform that evaluates the frequency content of the subset of possible gesture event data across a frequency range of 0-100 Hz.

The threshold amount of energy may be 70% on the impulse frequency band may be 10-100 Hz.

The impulse frequency band may include a damped natural frequency/a natural frequency of the sensor unit.

The subset of the possible gesture event data may be stored in the buffer as a rolling window through the possible gesture event data.

The lower time threshold may be 0.05 seconds and the upper time threshold may be 1.0 seconds.

The signal indicating that the user has executed the true gesture event may actuate an external motor device.

In yet another aspect, a gesture recognition device may include an analysis unit, with the analysis unit additionally including a hardware interrupt input, a hardware output signal port, a processor, and a non-transitory computer-readable medium comprising computer-executable instructions that are executed by the processor. The computer-executable instructions may be configured to initiate, upon receipt of the interrupt signal at the hardware interrupt input, a timer with a predetermined timer duration. The instructions may additionally include outputting, upon elapse of the predetermined timer duration, an operation mode signal to a sensor unit to set an operational mode of the sensor to be a first-in first-out mode, such that when the sensor unit is set to the first-in first-out mode, the accelerometer data generated by the sensor unit may be stored in a buffer module until the buffer module is full. The computer-executable instructions may additionally include receiving, from the buffer module, stored accelerometer data as possible gesture event data, executing a gesture confirmation algorithm to confirm or reject the possible gesture event data as a true gesture event, and outputting, at the hardware output signal port, in response to confirming the possible gesture event data as a true gesture event, a signal indicating that a user has executed a true gesture event.

CONCLUSION

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments.

Accordingly, it will be understood that the invention is not to be limited to the embodiments disclosed herein, but is to be understood from the following claims, which are to be interpreted as broadly as allowed under the law.

We claim:
1. An article of footwear, comprising:
a motor configured to actuate a lacing system of the article of footwear;
a sensor unit comprising an accelerometer sensor and a sensor unit buffer module;
an analysis unit in operative communication with the sensor unit, the analysis unit further comprising:
a hardware interrupt input, configured to receive an interrupt signal from the sensor unit;
a hardware output signal port;
a processor; and
a non-transitory computer-readable medium comprising computer-executable instructions, that when executed by the processor are configured to:
output an operational mode signal to the sensor unit to set an operational mode of the sensor unit, wherein the outputted operational mode signal extends the saving history of the sensor unit;
receive from the sensor unit buffer module, stored accelerometer data as possible gesture event data;
execute a gesture confirmation algorithm to confirm or reject the possible gesture event data as a true gesture event; and
output, at the hardware output signal port, in response to confirming the possible event data as a true gesture event, a signal to actuate the motor.

2. The article of footwear of claim 1, wherein the processor is a first processor, the non-transitory computer-readable medium is a first non-transitory computer-readable medium, and wherein sensor unit further comprises:
a second processor; and
a second non-transitory computer-readable medium comprising computer-executable instructions that when executed by the second processor, are configured to:
receive the operational mode signal and selectively set, in response to receipt of the operational mode signal, an operational mode of the sensor unit to be a continuous mode or a first-in first-out mode;
receive accelerometer data from the accelerometer sensor;
store the received accelerometer data in the buffer module;
execute an algorithm to detect a possible gesture event in the received accelerometer data; and
output, in response to detection of the possible gesture event in the received accelerometer data, an interrupt signal,
wherein when the sensor unit is set to the continuous mode, a most recent datum of the received accelerometer data is stored in a vacant memory unit in the buffer module or replaces an oldest datum stored in the buffer module,
wherein when the sensor unit is set to the first-in first-out mode, the received accelerometer data is stored in the buffer module until the buffer module is full.

3. The article of footwear of claim 1, wherein the true gesture event is a double tap, by the user, of a structure to which the sensor unit is coupled.

4. The article of footwear of claim 1, wherein upon elapse of a predetermined time duration, the sensor unit is set to a first-in first-out operational mode.

5. The article of footwear of claim 1, wherein the gesture confirmation algorithm confirms the possible gesture event data as the true gesture event upon identification within the received stored accelerometer data of:
a first impulse response;
a low variance state following the first impulse response and lasting between a lower time threshold and an upper time threshold; and
a second impulse response following the low variance state.

6. The article of footwear of claim 5, wherein the lower time threshold is 0.05 seconds and the upper time threshold is 1.0 seconds.

7. The article of footwear of claim 1, wherein analysis unit further comprises an analysis unit buffer module.

8. The article of footwear of claim 7, wherein the identification of the first impulse response or the second impulse response by the gesture confirmation algorithm further comprises:
identifying an incidence of high variance in the possible gesture event data;
storing a subset of the possible gesture event data in the analysis unit buffer module;
executing a Fast Fourier Transform operation to determine a frequency content of the subset of the possible gesture event data in the analysis unit buffer module; and
identifying a threshold amount of energy of the frequency content within an impulse frequency band.

9. The article of footwear of claim 8, wherein the Fast Fourier Transform operation is a partial Fast Fourier Transform that evaluates the frequency content of the subset of the possible gesture event data across a frequency range of 0-100 Hz.

10. The article of footwear of claim 9, wherein the threshold amount of energy is 70% and the impulse frequency band is 10-100 Hz.

11. The article of footwear of claim 9, wherein the impulse frequency band includes a damped natural frequency of the sensor unit.

12. The article of footwear of claim 9, wherein the subset of the possible gesture event data is stored in the second buffer module as a rolling window through the possible gesture event data.

13. A non-transitory computer-readable medium comprising computer-executable instructions that when executed by a processor is configured to perform at least:
output an operational mode signal to the sensor unit to set an operational mode of the sensor unit to be a first-in first-out mode, wherein when the sensor unit is set to the first-in first-out mode, accelerometer data generated by the sensor unit is stored in a buffer module until the buffer module is full;
receive from the buffer module, accelerometer data stored in the buffer module as possible gesture event data;
execute a gesture confirmation algorithm to confirm or reject the possible gesture event data as a true gesture event; and
output, at a hardware output signal port, in response to confirming the possible gesture event data as a true gesture event, a signal indicating that a user has executed the true gesture event.

14. The non-transitory computer-readable medium of claim 13, wherein the true gesture event is a double tap, by the user, of a structure to which the sensor unit is coupled.

15. The non-transitory computer-readable medium of claim 14, wherein the gesture confirmation algorithm confirms the possible gesture event data as the true gesture event upon identification within the possible gesture event data of:
a first impulse response;
a low variance state following the first impulse response and lasting between a lower time threshold and an upper time threshold; and
a second impulse response following the low variance state.

16. The non-transitory computer-readable medium of claim 15, wherein the identification of the first impulse response or the second impulse response by the gesture confirmation algorithm further comprises:
identifying an incidence of high variance in the possible gesture event data;
storing a subset of the possible gesture event data in a buffer module;
executing a Fast Fourier Transform operation to determine a frequency content of the subset of the possible gesture event data in the buffer module; and
identifying a threshold amount of energy of the frequency content within an impulse frequency band.

17. The non-transitory computer-readable medium of claim 16, wherein the Fast Fourier Transform operation is a partial Fast Fourier Transform that evaluates the frequency content of the subset of the possible gesture event data across a frequency range of 0-100 Hz.

18. The non-transitory computer-readable medium of claim 16, wherein the threshold amount of energy is 70% and the impulse frequency band is 10-100 Hz.

19. The non-transitory computer-readable medium of claim 15, wherein the lower time threshold is 0.05 seconds and the upper time threshold is 1.0 seconds.

20. A gesture recognition device, comprising:
an analysis unit, the analysis unit further comprising:
a hardware interrupt input;
a hardware output signal port;
a processor; and
a non-transitory computer-readable medium comprising computer-executable instructions, that when executed by the processor are configured to:
output an operational mode signal to a sensor unit to set an operational mode of the sensor unit to be a first-in first-out mode, wherein when the sensor unit is set to the first-in first-out mode, accelerometer data generated by the sensor unit is stored in a buffer module until the buffer module is full;
receive from the buffer module, stored accelerometer data as possible gesture event data;
execute a gesture confirmation algorithm to confirm or reject the possible gesture event data as a true gesture event; and
output, at the hardware output signal port, in response to confirming the possible gesture event data as a true gesture event, a signal indicating that a user has executed the true gesture event.

* * * * *